(12) United States Patent
Rumer et al.

(10) Patent No.: US 10,057,965 B2
(45) Date of Patent: Aug. 21, 2018

(54) LED DRIVER AND LIGHTING SYSTEMS TECHNOLOGIES

(71) Applicant: Fulham Company Limited, an exempted Co. Inc'd w/ limited liability under the laws of the Cayman Islands, George Town, Grand Cayman (KY)

(72) Inventors: Mark Rumer, Portland, OR (US); Chunyan Han, Beijing (CN); Xu Wang, Shanghai (CN); Duoping Wang, Shanghai (CN); Colin Whittaker, Santa Barbara, CA (US); Brad Hubbard, S. San Francisco, CA (US); Zhonghua Shi, Shanghai (CN)

(73) Assignee: Fulham Company Limited, George Town, Grand Cayman (KY)

( * ) Notice: Subject to any disclaimer, the term of this patent is extended or adjusted under 35 U.S.C. 154(b) by 0 days.

(21) Appl. No.: 15/146,393

(22) Filed: May 4, 2016

(65) Prior Publication Data
US 2017/0064796 A1  Mar. 2, 2017

Related U.S. Application Data

(60) Provisional application No. 62/156,338, filed on May 4, 2015, provisional application No. 62/156,821, filed on May 4, 2015.

(51) Int. Cl.
| | |
|---|---|
| H05B 37/02 | (2006.01) |
| H05B 33/08 | (2006.01) |
| H04L 12/46 | (2006.01) |

(52) U.S. Cl.
CPC ....... *H05B 37/0272* (2013.01); *H04L 12/462* (2013.01); *H05B 33/0845* (2013.01);
(Continued)

(58) Field of Classification Search
CPC ........ H05B 37/00; H05B 37/02; H05B 33/08; H05B 33/0803; H05B 33/0806; H05B 33/0833
See application file for complete search history.

(56) References Cited

U.S. PATENT DOCUMENTS

| | | | |
|---|---|---|---|
| 8,994,279 B2 * | 3/2015 | Raval .................... | H02M 3/156 |
| | | | 315/186 |
| 2009/0079357 A1 * | 3/2009 | Shteynberg ........ | H05B 33/0818 |
| | | | 315/291 |

(Continued)

*Primary Examiner* — Jason M Crawford
(74) *Attorney, Agent, or Firm* — Womble Bond Dickinson (US) LLP

(57) ABSTRACT

A driver for a lighting device includes a light emitting diode (LED) driver circuit utilizing interface elements for supporting multiple control connectivity options, the LED driver circuit utilizing a processor having a physical layer interfaces coupled to the interface elements and configured to operatively support a plurality of network protocols, the processor being configured to perform a plurality of functions, including a function of providing a bridge or gateway between network protocols of the plurality of network protocols, the processor being configured to: detect available network protocols of the plurality of network protocols; select, for a physical layer interface, a mode of operation (from modes of operation including, for example: an inactive mode, a monitoring mode, a gateway mode, and a primary mode) appropriate to ensure interoperability and backward compatibility for the available network protocols; and assign one or more of the available network protocols to the physical layer interface(s).

8 Claims, 51 Drawing Sheets

(52) U.S. Cl.
CPC ..... *H05B 37/0218* (2013.01); *H05B 37/0227* (2013.01); *Y02B 20/348* (2013.01); *Y02B 20/46* (2013.01)

(56) References Cited

U.S. PATENT DOCUMENTS

| | | | | |
|---|---|---|---|---|
| 2010/0283322 | A1* | 11/2010 | Wibben | H02M 3/158 307/31 |
| 2011/0227492 | A1* | 9/2011 | Du | H05B 33/0818 315/186 |
| 2013/0119875 | A1* | 5/2013 | Dearborn | H05B 33/0815 315/186 |
| 2013/0147375 | A1* | 6/2013 | Williams | H05B 33/0827 315/192 |
| 2014/0128941 | A1* | 5/2014 | Williams | A61N 5/06 607/88 |

* cited by examiner

To wireless
W_10VIN
W_INTI
W_RSETIN
W_SPICS1
W_10VPWM
W_SETH
W_SETRX
W_SETTX
W_ACIN
W_D RST
W_PSL
W_SETH To power measure
W_INT2
W_P_RST
W_SPICS2
W_SCK
W_MOSI
W_MISO To dsp
NTC

LED DRIVER AND LIGHTING SYSTEMS TECHNOLOGIES

CROSS-REFERENCE TO RELATED APPLICATIONS

This application claims priority from U.S. provisional Application No. 62/156,338, filed on May 4, 2015, and from U.S. provisional Application No. 62/156,821, filed on May 4, 2015, which are hereby incorporated by reference.

TECHNICAL FIELD

The present invention relates generally to lighting and lighting systems and devices and, in particular, light emitting diode (LED) drivers and lighting systems management and control.

BACKGROUND ART

A great variety of lighting devices—including LED lamps—are known, as are drivers (e.g., driver circuits) for such devices.

Conventional light source drive utilizes a switch-mode power supply (analog switch mode control device, power switch transistor, low pass filter and current monitor) and a separate power switch transistor to act as a pulse-width modulated dimmer to the light source. While inexpensive, this approach is inflexible, as operational parameters such as drive voltage and current must be programmed either with analog components (resistors) at build time, or with a programmable current source (Digital to Analog Converter or DAC) and the parametric range is limited by circuit topology and processing capability. Since the light source characteristics change over the life of the device, existing systems make it difficult to adapt to changing light source characteristics, limiting their useful life.

It would be useful to be able to provide LED driver and lighting systems and methodologies that facilitate one or more of improved, advantageous, or otherwise desirable or useful qualities, functionalities and/or performance and/or technologies/methodologies providing of beneficial features.

SUMMARY OF THE INVENTION

In an example embodiment, a driver for a lighting device includes: a light emitting diode (LED) driver circuit including interface elements for supporting multiple control connectivity options, the LED driver circuit including a processor having a plurality of physical layer interfaces coupled to the interface elements and configured to run an operating system that supports a plurality of network protocols, said processor being configured to have a plurality of functions, including a function of providing a bridge (i.e., Gateway) between network protocols of said plurality of network protocols, wherein said processor is configured to perform the functions of:
  detecting available network protocols of said plurality of network protocols;
  selecting, for a physical layer interface, a mode of operation appropriate to ensure interoperability and backward compatibility for said available network protocols, said modes of operation including
    an inactive mode, wherein the network protocol is inactive;
    a monitoring mode, wherein the network protocol is listening, and the processor is configured to receive signals representing the status of a network;
    a gateway mode, wherein the network protocol is active, and the processor takes a role of a master network controller over a subordinate network for the purposes of bridging said network protocol to another higher priority network protocol; and
    a primary mode, wherein the network protocol is active, and the processor participates as a node on the network; and
  assigning (one or more of) said available network protocols to said physical layer interface(s).

In an example embodiment involving (digital) independent channel control, a driver for a lighting device including at least one light emitting diode (LED) includes: a lighting driver configured to drive LED(s) of the lighting device, the lighting driver being configured to independently control multiple independent drive channels.

In an example embodiment, a light emitting diode (LED) driver with advanced diagnostic and reporting capabilities includes: a light emitting diode (LED) driver circuit including a processor configured to integrate driver functions and management control functions and monitor a plurality of operational characteristics.

In an example embodiment, a light emitting diode (LED) driver energy management and error reporting system includes: a light emitting diode (LED) driver with advanced diagnostic and reporting capabilities, and the LED driver comprises a light emitting diode (LED) driver circuit including a processor configured to integrate driver functions and management control functions and monitor a plurality of operational characteristics, the LED driver circuit being operatively connected to a short-term statistical history database, and the LED driver being operatively connected to a long-term history database.

In an example embodiment, a cloud-based lighting control and management system includes: a plurality of distinct lighting systems, each of said lighting systems including a lighting device comprising a light emitting diode (LED) driver circuit including interface elements for supporting multiple control connectivity options; and a remote management entity configured to receive data from said plurality of distinct lighting systems and to delegate control of (one or more of) said lighting systems to one of the lighting systems.

In an example embodiment, a remote management entity for a cloud-based lighting control and management system including a plurality of distinct lighting systems, each of the lighting systems including a lighting device comprising a light emitting diode (LED) driver circuit including interface elements for supporting multiple control connectivity options, the remote management entity including: means for receiving data from said plurality of distinct lighting systems, delegating control of (one or more of) said lighting systems to one of the lighting systems, and reclaiming control from said one of the lighting systems that currently retains control.

In an example embodiment, a (remote) lighting control system includes: one or more of a processor, a controller, a memory and a communications apparatus configured to produce a graphical user interface (GUI) (e.g., a dashboard); wherein the system is configured to facilitate discovery and provisioning of one or more network elements in the system, the network elements including a plurality of distinct lighting systems.

In an example embodiment, a remote system controller configured to control a plurality of distinct lighting systems, the remote system controller including: a processor, a memory, a communications apparatus and a controller configured to produce a graphical user interface; wherein the system is configured to control a first lighting system, to receive data from the first lighting system, and to control a second lighting system, and wherein the system is configured to assign control of the second lighting system to a second controller in the second lighting system, and to receive data from the second lighting system.

In an example embodiment, a cloud-based lighting control and management system includes: a light emitting diode (LED) driver circuit comprising a processor configured to integrate driver functions and management control functions and monitor a plurality of operational characteristics.

DISCLOSURE OF INVENTION

LED Driver Integrating Multiple Control Methods

Building lighting systems possess controls, from as simple as on/off switches and circuit breakers, dimmers, to systems of increasing complexity including time controls, occupancy sensing, and adjusting the light level based upon the amount of daylight available. The greater degrees of control increase system complexity accordingly, and solutions are typically purpose-built for that level of automation. This creates a problem where the system must be overhauled or replaced when a new level of controls capability is introduced, resulting in excessive installation costs. The present inventions provide a solution where the light source (LED) driver is intelligent, and possesses multiple network interfaces to current and future lighting control systems, and may be upgraded to new communication protocols and capabilities while avoiding physical changes to the installed system.

Figure 1:
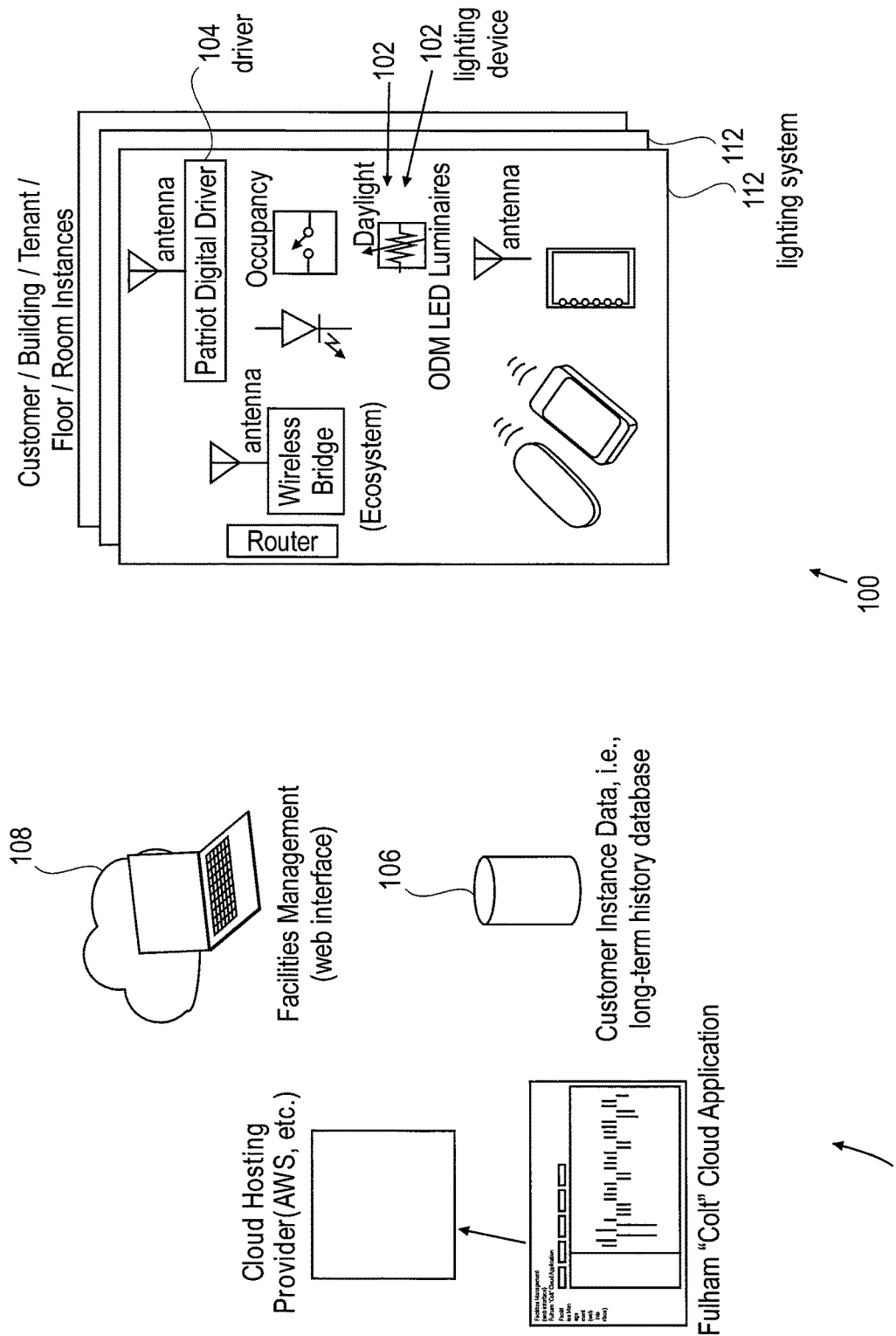
FIG. 1 is a system diagram of the lighting control and management system of the present invention.

Referring now to the drawings and the characters of reference marked thereon, FIG. 1 is a system diagram of the lighting control and management system of the present invention, designated generally as 100. The lighting control and management system 100 can be used to control/manage a number of lighting devices 102. Each lighting device 102 includes a driver 104. The lighting control and management system 100 may or may not include a variety of other components shown in FIG. 1, explained below in detail.

Figure 2:
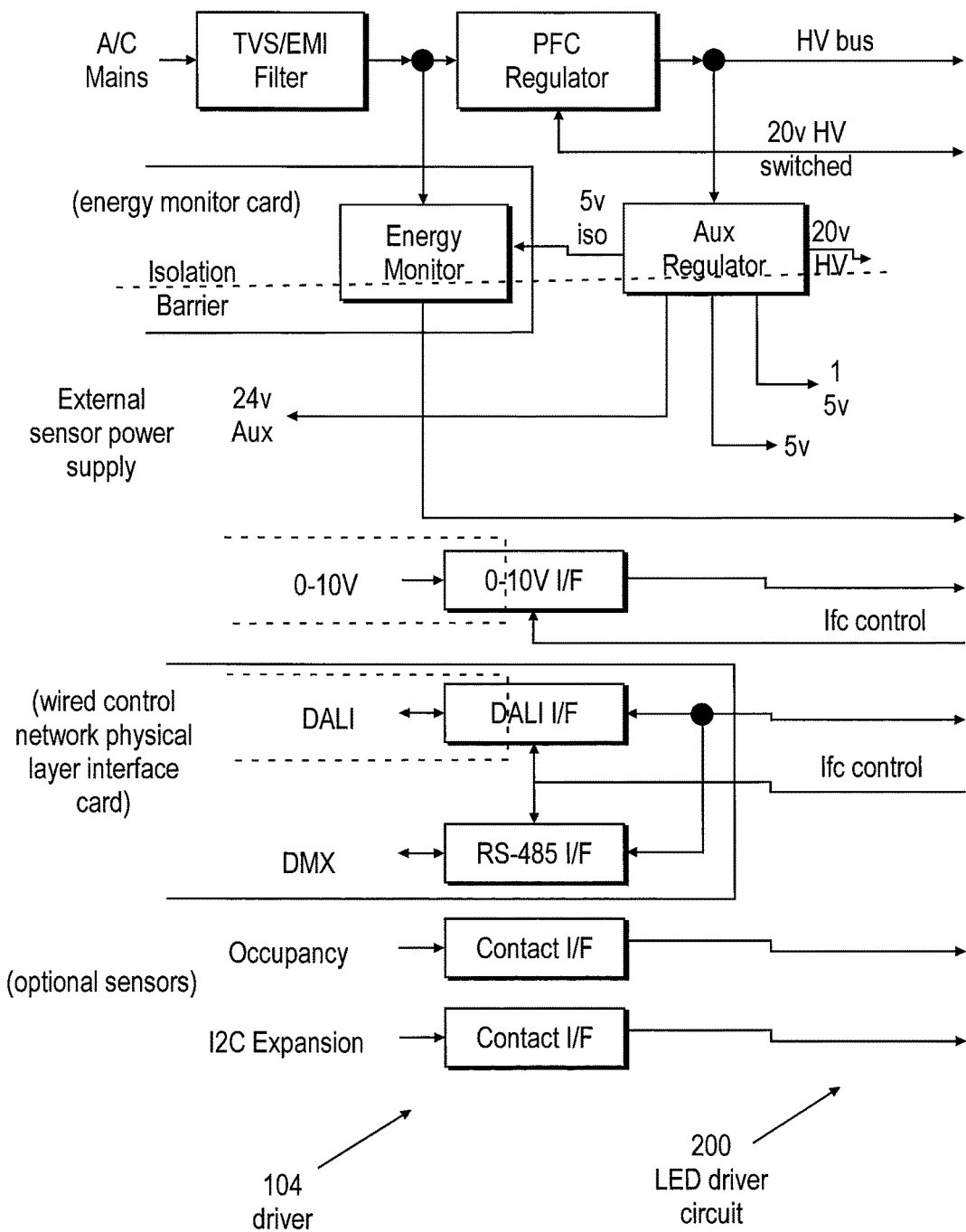
FIG. 2 is a system block diagram of the LED driver circuit of the present invention.
Figure 2:
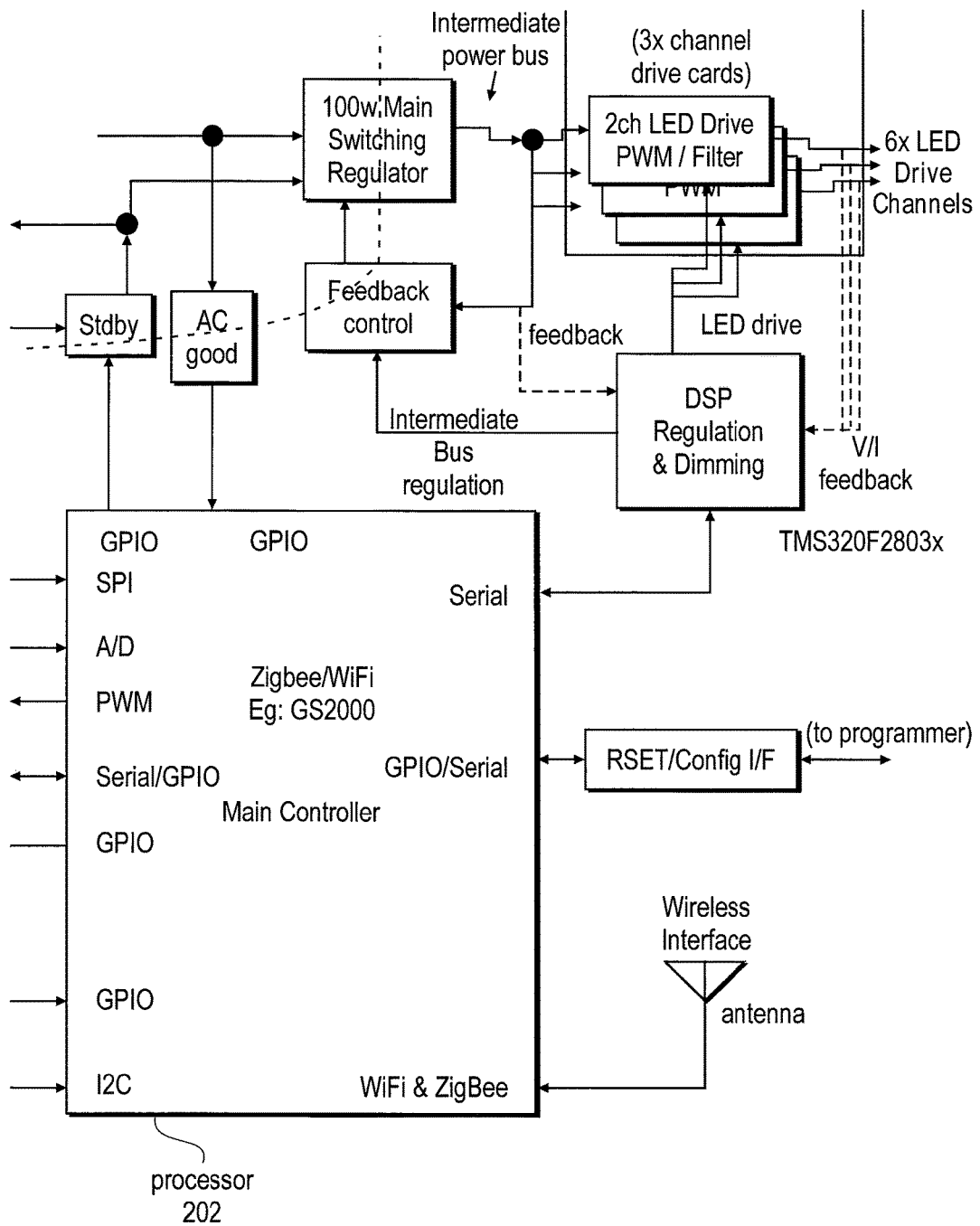

Referring now to FIG. 2, each driver 104 includes a light emitting diode (LED) driver circuit 200. The LED driver circuit 200 includes a number of interface elements, as will be discussed below, for supporting multiple control connectivity options.

The LED driver circuit 200 includes a processor 202 that has a plurality of physical layer interfaces 204. These physical layer interfaces 204 may provide connections such as GPIO, SPI, A/D, PWM, Serial/GPIO, 12C, GPIO/Serial, Serial, WiFi, and ZigBee, as shown.

The physical layer interfaces 204 are coupled to the interface elements and are configured to run an operating system that supports a plurality of network protocols.

The processor 202 is configured to have a plurality of functions, some of which are discreet and can be applied independently or in combination with one or more other functions. These functions include the function as a bridge (i.e. Gateway) between network protocols. The processor 202 can be configured to perform the functions, as follows:

The processor 202 detects, among other things, available network protocols of the plurality of network protocols.

It selects, for a physical layer interface, the appropriate mode of operation to ensure interoperability and backward compatibility for the available network protocols. As used herein, the term "mode of operation" can also be referred to as "mode of control". Thus, as discussed below the term "control" may be referring to control from an external source, such as a "system control". Alternatively, the driver 104 can operate alone, or in combination with other drivers and/or systems. It may have default settings/instructions for operating when no external "system control" is detected, as will be discussed below. Based on the control signals, or lacking external control signals, based on firmware, the driver 104 will make the appropriate settings for its interface (on an interface-by-interface basis) to ensure interoperability and backward compatibility for the available network protocols.

The modes of operation include the following:
1. an inactive mode, wherein the network protocol is inactive;
2. a monitoring mode, wherein the network protocol is listening, and the processor is configured to receive signals representing the status of a network;
3. a gateway mode, wherein the network protocol is active, and the processor takes a role of a master network controller over a subordinate network for the purposes of bridging that network protocol to another higher priority network protocol; and
4. a primary mode, wherein the network protocol is active, and the processor participates as a node on that network.

After selecting the appropriate mode of operation, the available network protocols are assigned.

Figures 3, 4:
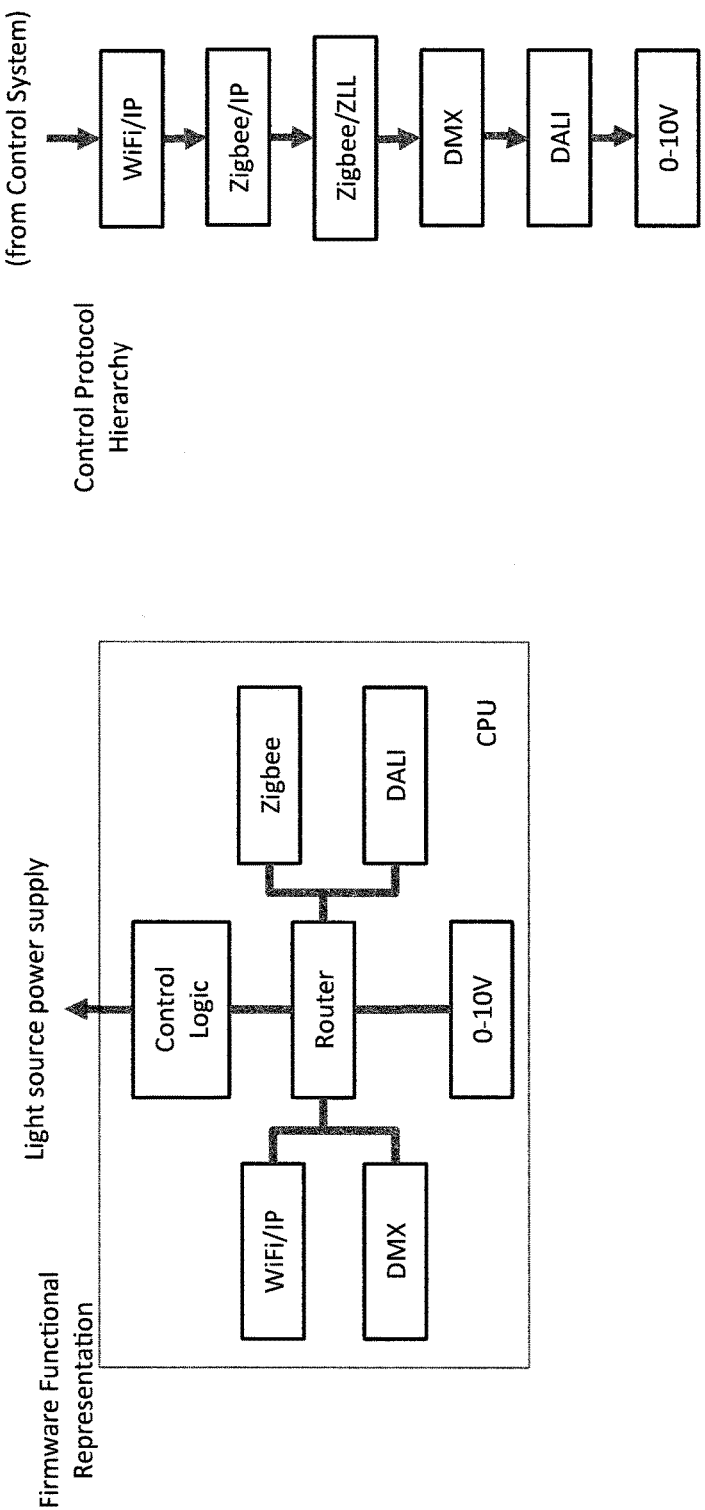
FIG. 3 is a firmware functional representation of a processor.
FIG. 4 illustrates a representative control protocol hierarchy.

Referring now to FIG. 3, a firmware functional representation of a processor 202 is illustrated and that is included in an intelligent driver. The central processor 202 includes multiple physical layer interfaces: WiFi, Zigbee, RS-485, DMX, DALI, and 0-10V (analog). The processor 202 runs an operating system, and supports several network protocols: IP, Ethernet, DMX, and DALI, and may function as a bridge or gateway between systems using the various protocols, without requiring an upgrade of those other systems. In another example, a system installed with wired 0-10V control may be upgraded to Zigbee or WiFi controls without changing or removing the wired network. In the same manner, a building lighting controls system based upon a wired DALI control network also may be upgraded to a wireless system, with the added benefit that the existing DALI control elements (switches, occupancy sensors, daylight sensors) may be reported and managed by the wireless controls network.

Firmware running on the central processor is responsible for detecting the available network protocol(s) and selecting the appropriate mode of operation to ensure interoperability and backward compatibility (much in the way an Internet router enables communication between various interfaces and protocols). Once the available networks have been determined, the processor assigns them by weight and selects the highest priority interface as primary.

FIG. 4 illustrates a representative control protocol hierarchy. WiFi is at the highest level, followed by Zigbee/IP, Zigbee/ZLL, DMX, DALI, and 0-10V (analog). Other control protocol hierarchies can also be used.

Interfaces with subordinate priority are placed in a mode where they are inactive (i.e., Standby) until their operational mode is confirmed by the primary controls network, these operational modes include Disabled, Monitoring, and Gateway. In the Disabled mode, the interface is passive, and other devices on that network may communicate as they previously did. In Monitoring mode, the primary control network receives notification of the state of communications on the monitored network, allowing the primary to update building maps and statistics with the operational state of the legacy network. In Gateway mode, the interface is placed in an active state and typically operates as a host to a network coupled to the interface, which other network would be a subordinate network, with the present processor 202 offering complete control of it from the primary network. Ultimately, device commands from the primary and/or other networks in the hierarchy drive changes to the light source power supply, changing characteristics of the light source (intensity, color temperature, angle of emission, etc.).

Figure 5A:
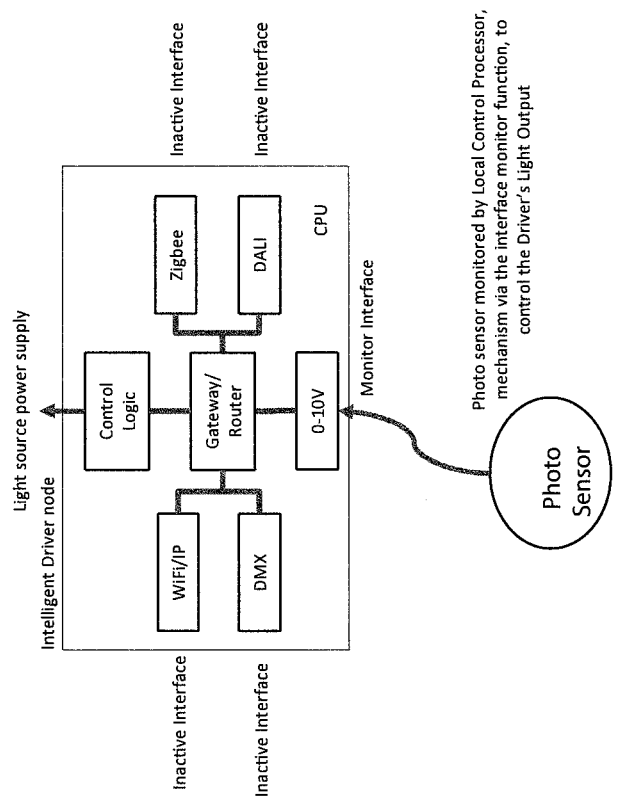
FIG. 5A illustrates a minimal configuration of the per-interface control modes where the processor had detected a photo sensor and the processor has assigned other interfaces as inactive.

FIGS. 5A-5D illustrate various example configurations that can be established or set in an LED driver such as those described herein, based on the information developed by the processor while scanning its interfaces and determining any connections thereto and the characteristics of any circuits or networks associated with the connections. These are examples for illustration, and it should be understood that many other configurations are possible for any lighting device having a driver such as any of those described herein. FIG. 5A illustrates a configuration in which the processor has determined that the WiFi/IP, DMX, Zigbee, and DALI interfaces are not being used or any connections thereto are not functioning, and the processor has assigned those interfaces as inactive. However, the processor has detected a photo sensor coupled to the analog interface "0-10 V", and the processor has set the interface in the monitor mode. The photo sensor is monitored by the processor (i.e. a Local Control Processor, mechanism via the interface monitor function, to control the driver's light output, for example based in part on signals from the photosensor). In this configuration, the processor is serving as its own controller, and controls its associated lighting device based on firmware used by the processor. In this exemplary configuration, no other networks are associated with the LED driver, until such time, if any, the processor senses other networks on others of the interfaces.

Figure 5B:
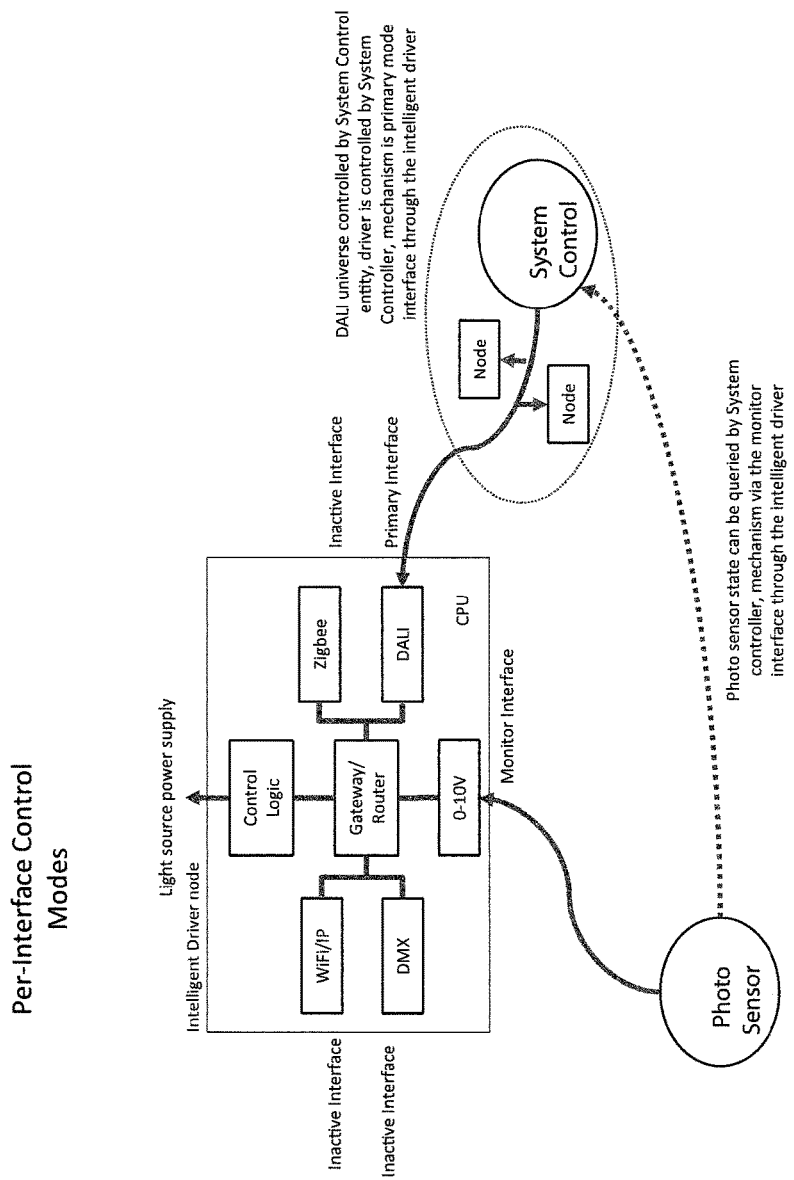
FIG. 5B illustrates another configuration of the per-interface control modes in which the processor has assigned a primary mode to the DALI interface.

In another configuration illustrated in FIG. 5B, for example where the processor identifies another network associated with one of its interfaces, in this example the processor identifies a Dali network coupled to the Dali interface, and evaluates what mode should be assigned to the interface. Based on the hierarchy established for the processor, the processor assigns "primary mode" to the Dali interface. The DALI universe is controlled by a System Control entity. In the primary mode, the present driver is controlled by the System Controller associated with the Dali universe. There is a primary mode interface through the intelligent driver. Additionally, with the present driver and processor, and the Dali interface in primary mode, the photo sensor state can be queried by System controller. The mechanism is via the monitor interface through the intelligent driver.

Figure 5C:
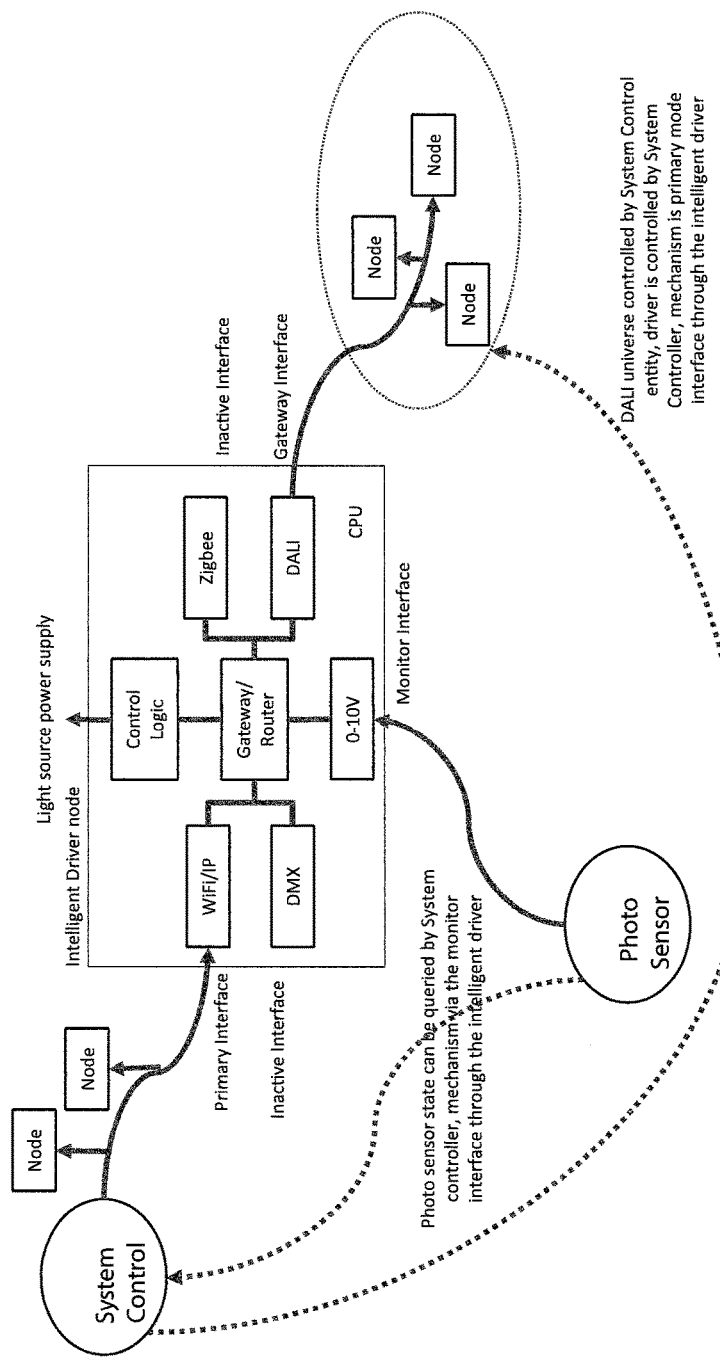
FIG. 5C illustrates another configuration of the per-interface control modes.

FIG. 5C shows an intermediate configuration for the present processor with a gateway configuration. For example, while scanning its interfaces, the processor determines the existence of a Photo Sensor on its analog interface, a Dali network on its Dali interface, and a Wi-Fi or IP network on its Wi-Fi/IP interface. The processor assigns to the analog interface a monitoring mode, a primary mode to the Wi-Fi/IP interface, and takes commands from a System Control associated with the Wi-Fi/IP network. In one example, signals from the System Control instructs the present processor to assign primary mode to the Wi-Fi/IP interface. Additionally, signals from the System Control instruct the present processor to assign Gateway mode to the Dali interface, so that the System Control can control not only the present processor, but also receive input from and control the Dali network by way of the present processor. Additionally, the System Control can query the present processor, including received information associated with the Photo Sensor. In this example, the DALI interface is a gateway. The DALI universe is controlled by the System Control entity. The driver is controlled by the System Controller. The mechanism is a primary mode interface through the intelligent driver.

There is a monitor interface to the photo sensor. The photo sensor state can be queried by the System Controller. The mechanism is via the monitor interface through the intelligent driver. The DMX interface is inactive. The WiFi/IP is primary.

Figure 5D:
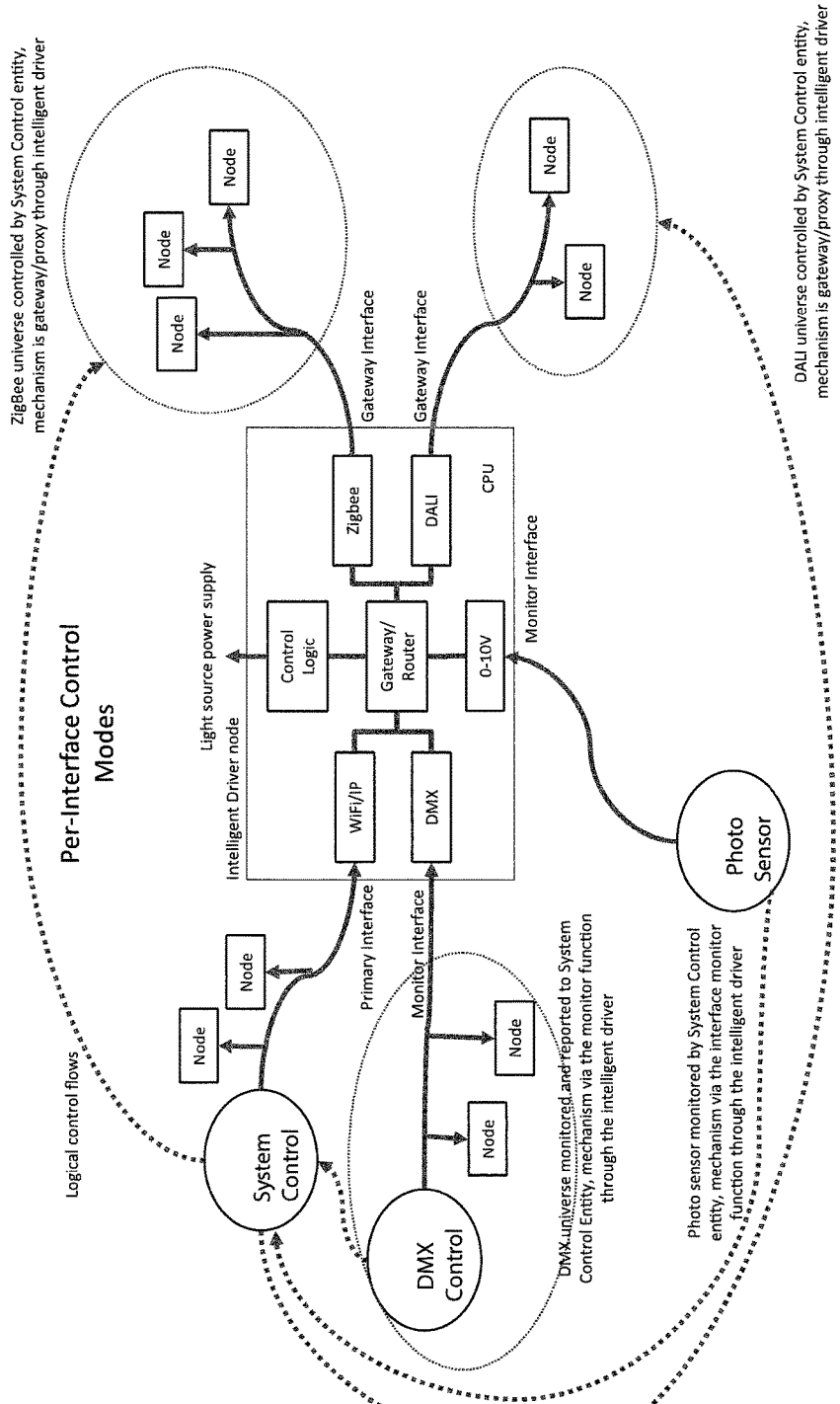
FIG. 5D illustrates another configuration of the per-interface control modes.

In the configuration shown in FIG. 5D, the WiFi/IP interface is primary. The DALI and Zigbee interfaces are gateway. The photo sensor and DMX interfaces are in the monitor mode.

Figure 6A:
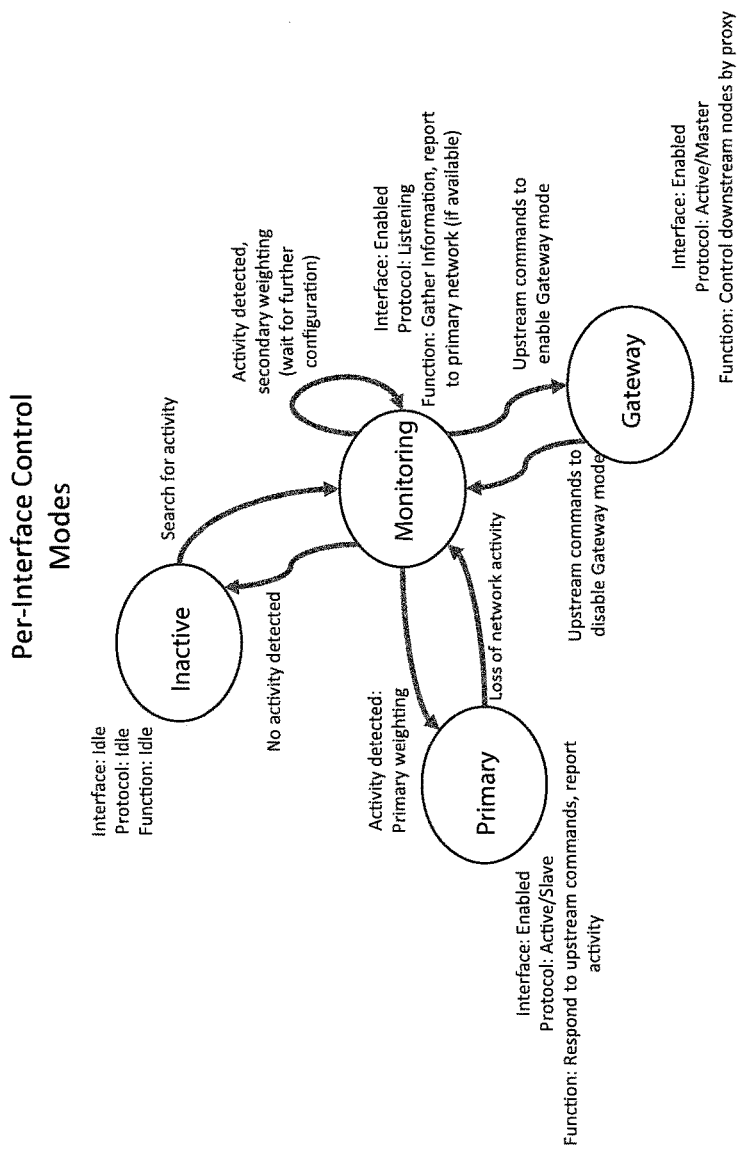
FIGS. 6A and 6B are schematic illustrations summarizing the various modes.
Figure 6B:
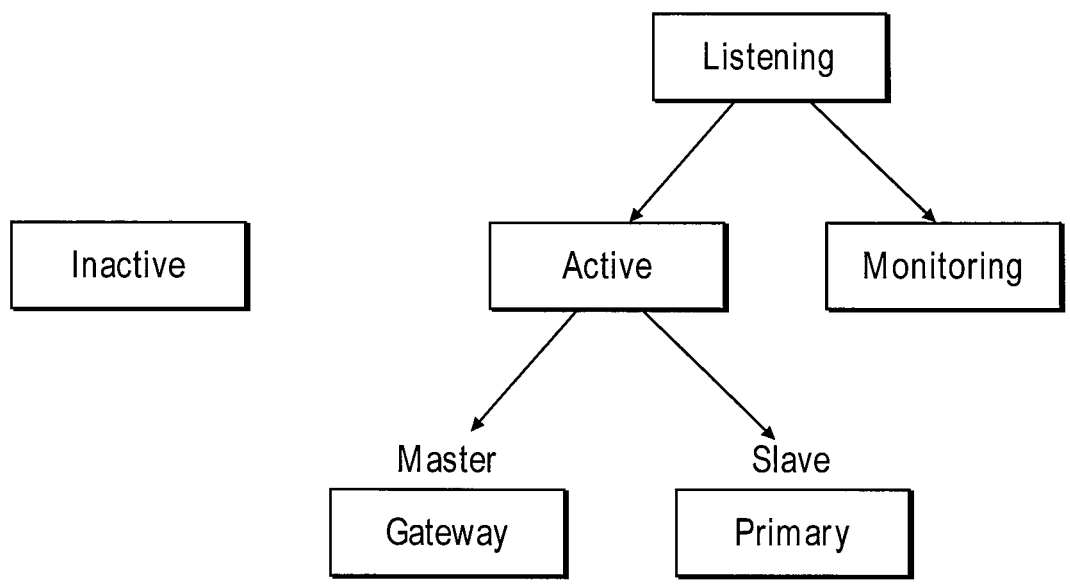

FIGS. 6A and 6B summarize the various modes, designating the state of the interface, the protocol, and the function. In FIG. 6A, the driver processor scans, determines and assigns a status to a given driver interface. For each interface, on a schedule determined by the processor or an external control, the processor checks the status of the interface. Where an interface is in an "Inactive" mode, the processor checks for activity on the interface. If there is no activity detected, the processor assigns a status of "Inactive". The interface is idle, the protocol associated with the interface is idle, and the function of the interface is idle, namely no activity is occurring on the interface. However, if activity is detected on the interface, the status of the interface is pending further configuration, depending on information received by the processor regarding the connection made at the interface and its configuration. With detected activity unless otherwise assigned, the interface is in a "Monitoring" configuration where the Interface is enabled, the protocol is in a listening mode, and the processor in combination with the interface is gathering information, and if applicable reports to a primary network regarding status. If, during monitoring, the processor detects activity, and such activity is a primary waiting, the processor will assign, either based on its own instructions or instructions from a System Controller, a status to the interface of "Enabled", and assigns an active/slave protocol, whose function is to respond to upstream commands and to report activity. If, afterward, there is a loss of network activity on the interface, as sensed by the processor, the processor returns the interface to a monitoring status, and the process continues. If from the monitoring configuration the processor or a System Controller determines that the interface is connected to a further network, upstream commands are received, for example from a System Controller, to assign a Gateway configuration to the interface, where the interface is enabled, assigned an active/master protocol, for purposes of controlling a downstream node or nodes by proxy. Thereafter, if the processor or an upstream command sequence determines that the interface should be disabled from the Gateway mode, the processor returns the interface to a Monitoring configuration, and the process repeats.

Figure 7:
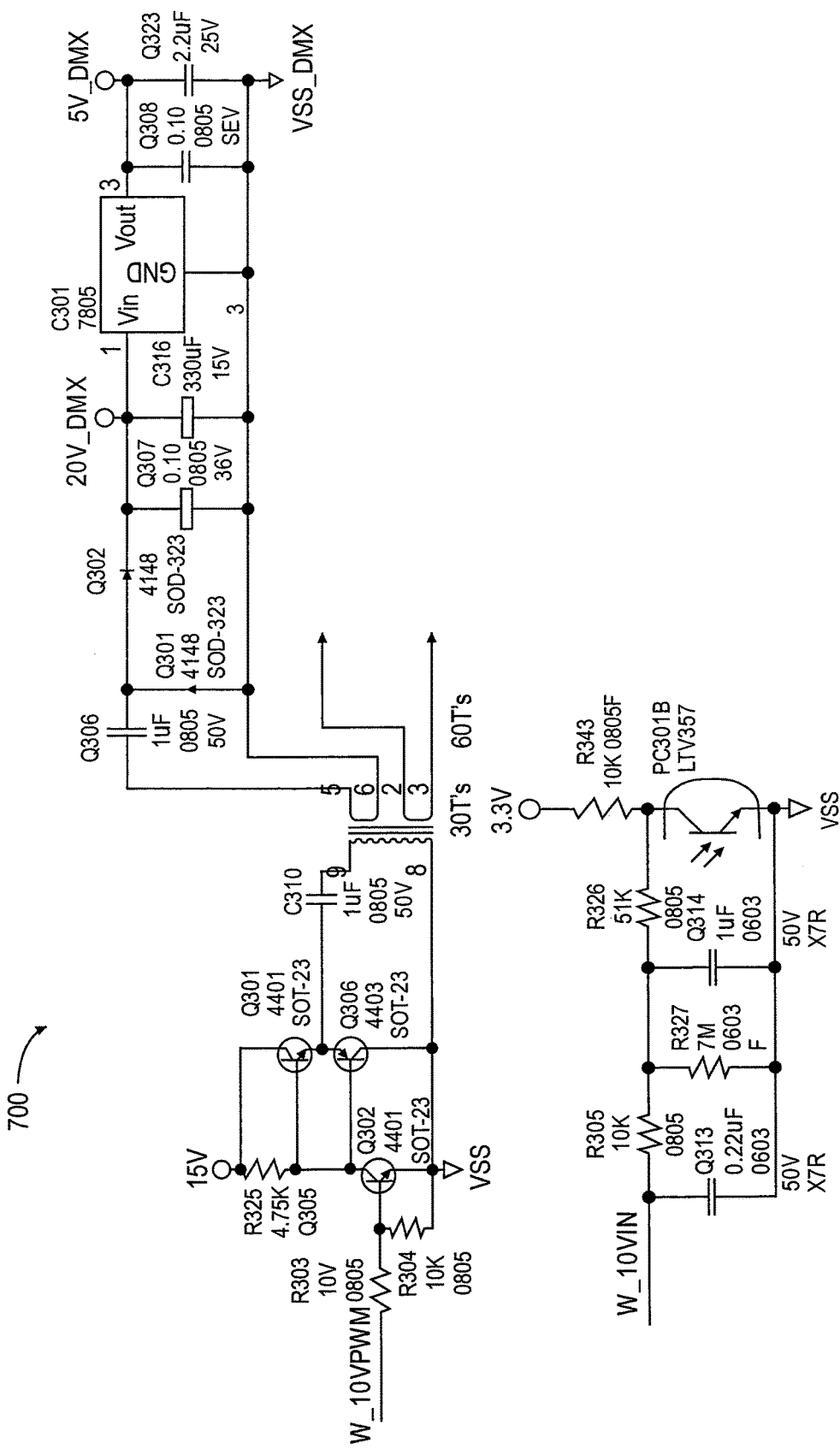
FIG. 7 is a schematic illustration of the dimming related circuitry.
Figure 7:
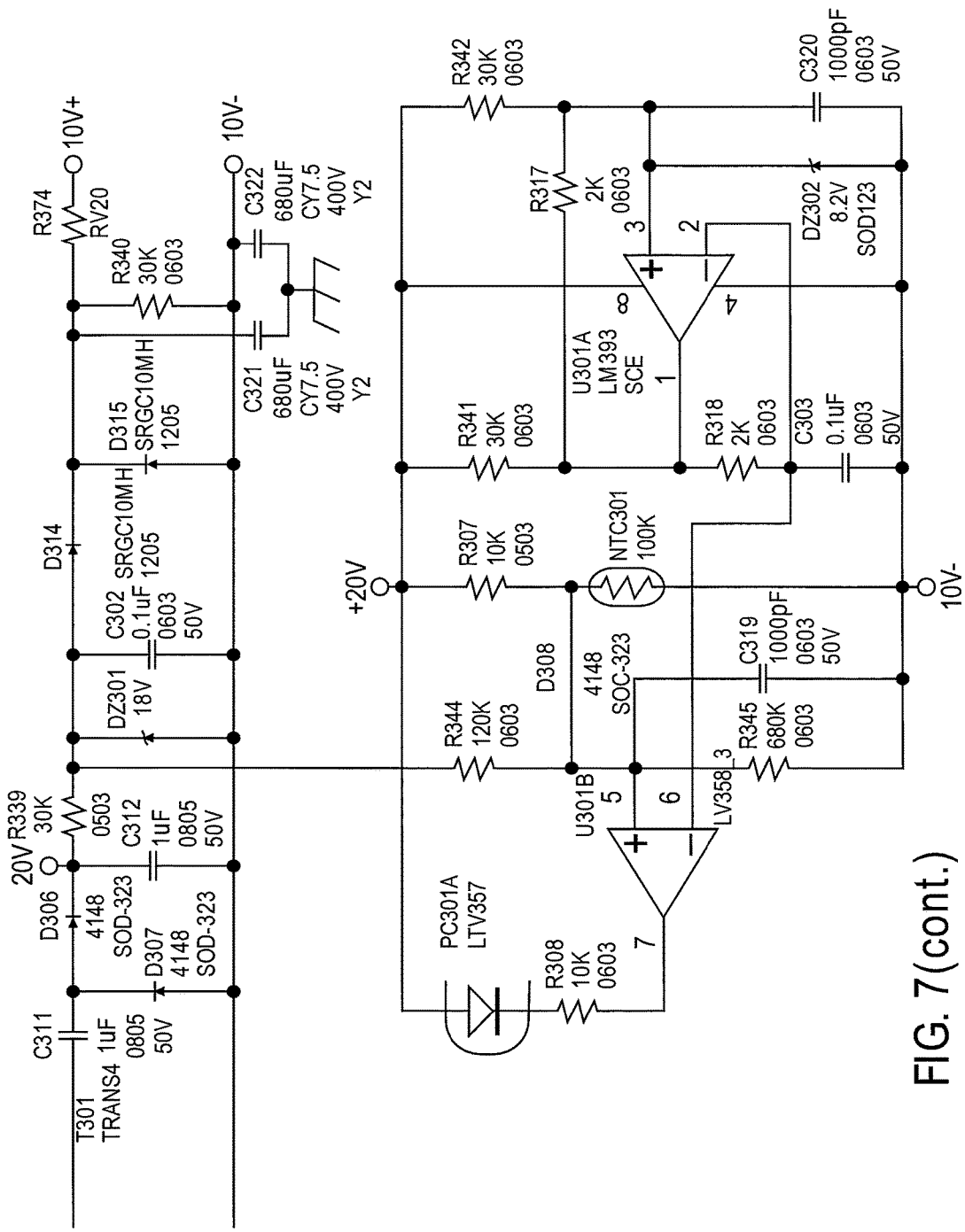

Referring now to FIG. 7, the 0-10V dimming related circuitry is illustrated, designated generally as 800. The processor (i.e. Wireless module MCU GS2011, as will be discussed below in detail) sends a PWM signal W_10VPWM. After adjust and amplified by Q301, Q302 and Q306 this PWM signal is passed to secondary of T301. The external applied 0-10V signal is fed through terminal to node 10V+ and 10V−. The real applied 0-10V signal is sensed and coupled to W_10VIN and then fed to wireless module MCU GS2011. R344, R345, U301B, PC301A, PC301B, R305, R326, R327, R343, C313, C314 form the voltage feedback loops and filters circuit to generate W_10VIN. R301, NTC301, D308 form the temperature compensation circuits. U301A generate a reference to U301B.

Figure 8:
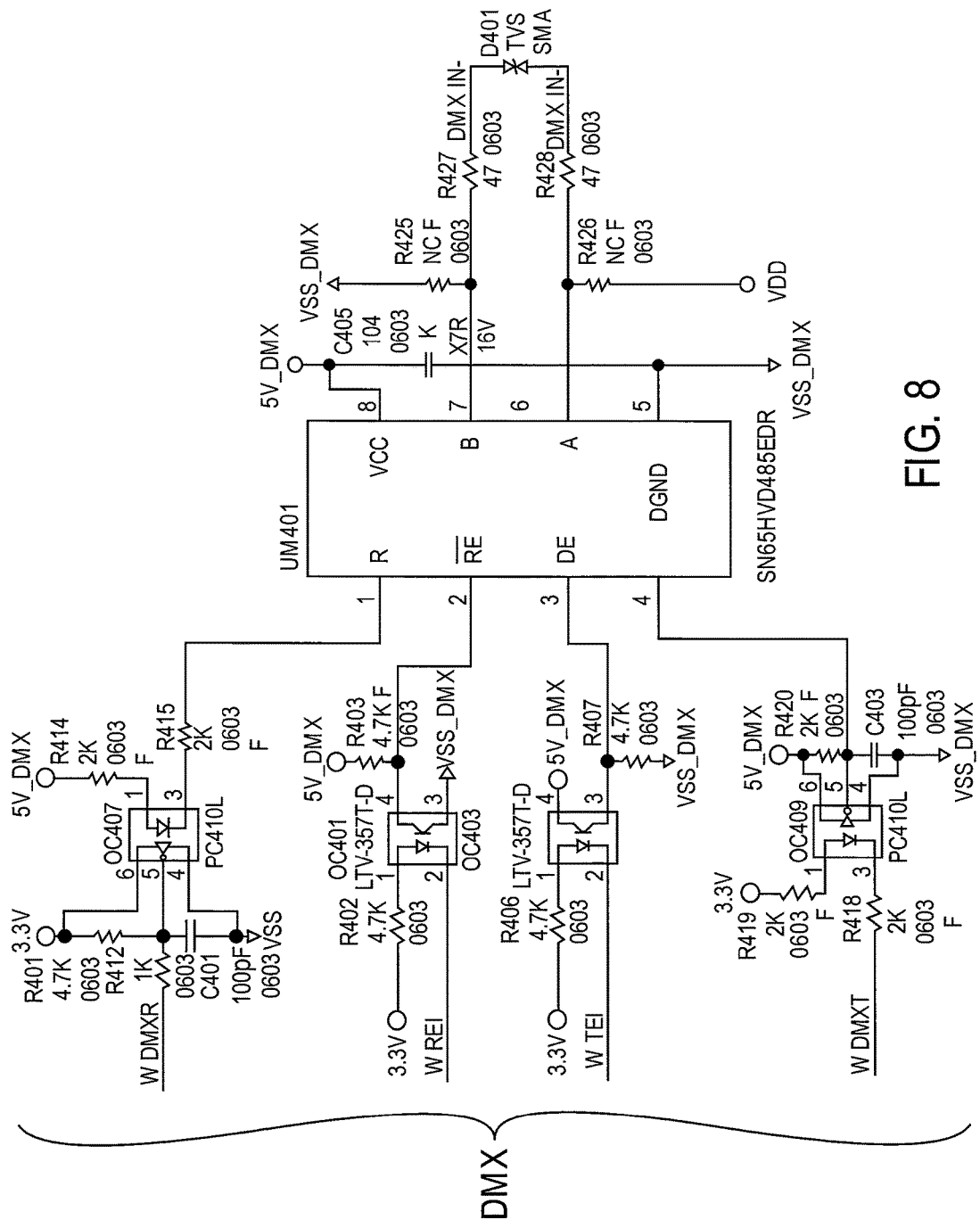
FIG. 8 is a schematic illustration of the DALI and DMX circuits.
Figure 8:
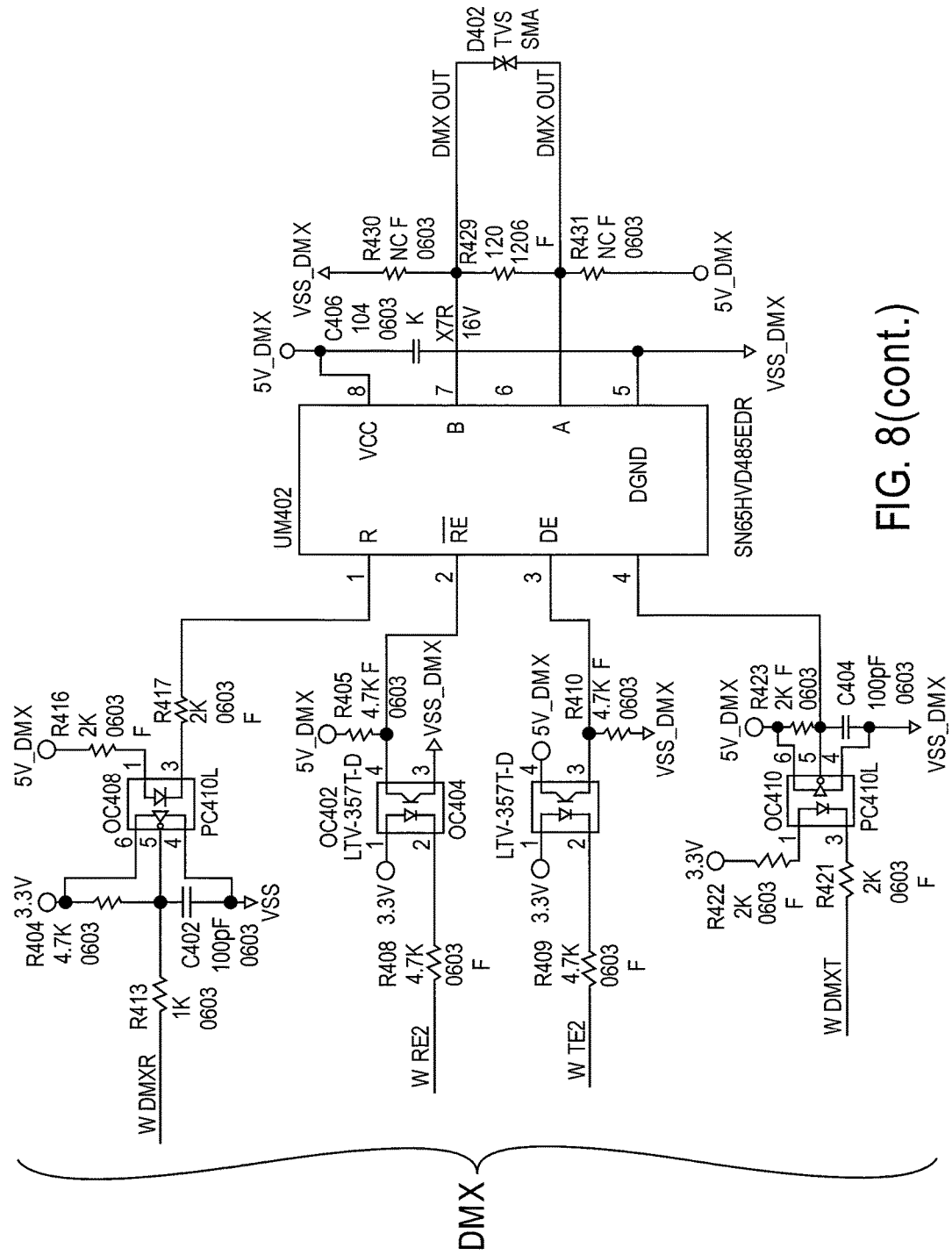
Figure 8:
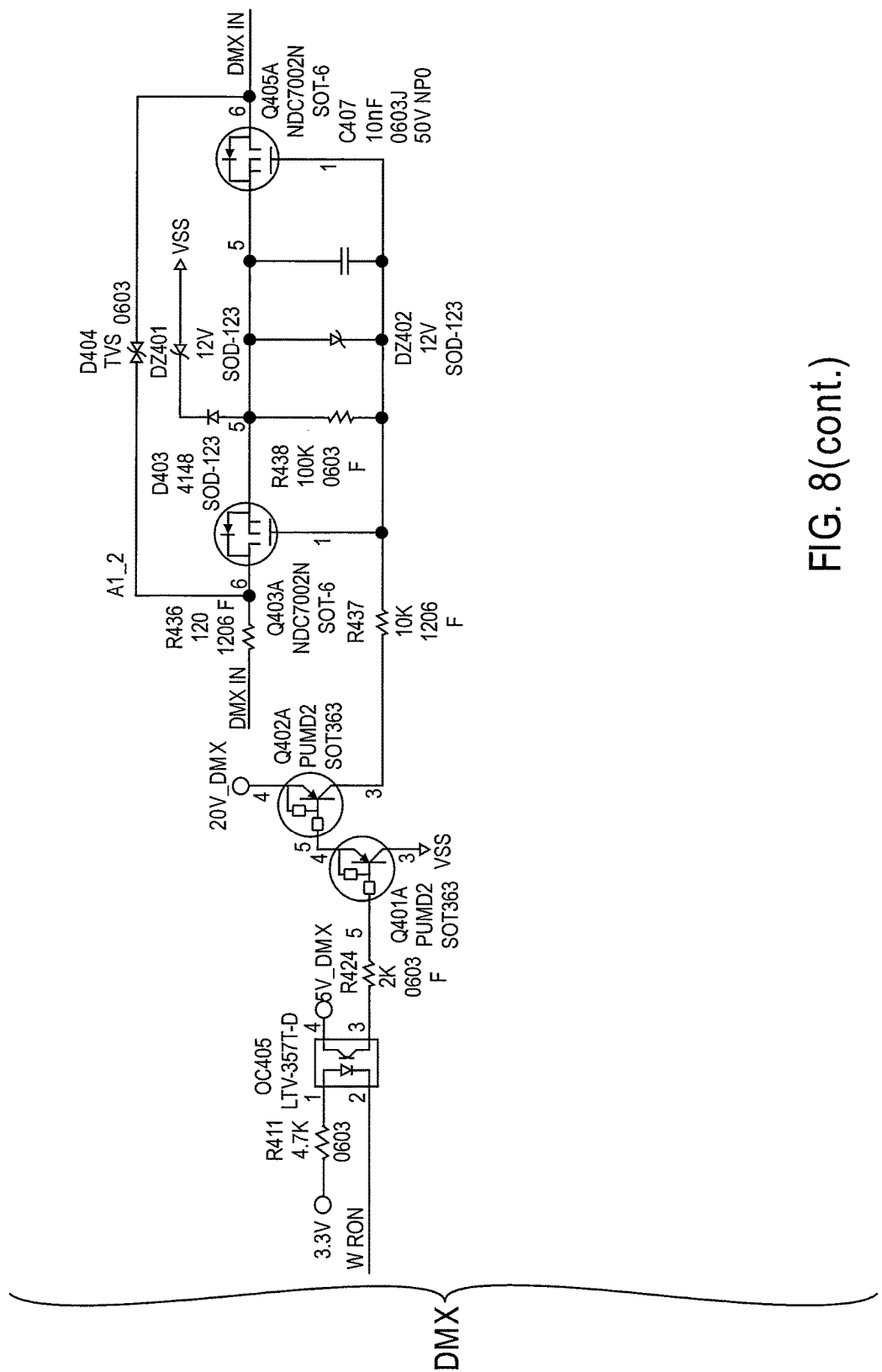
Figure 8:
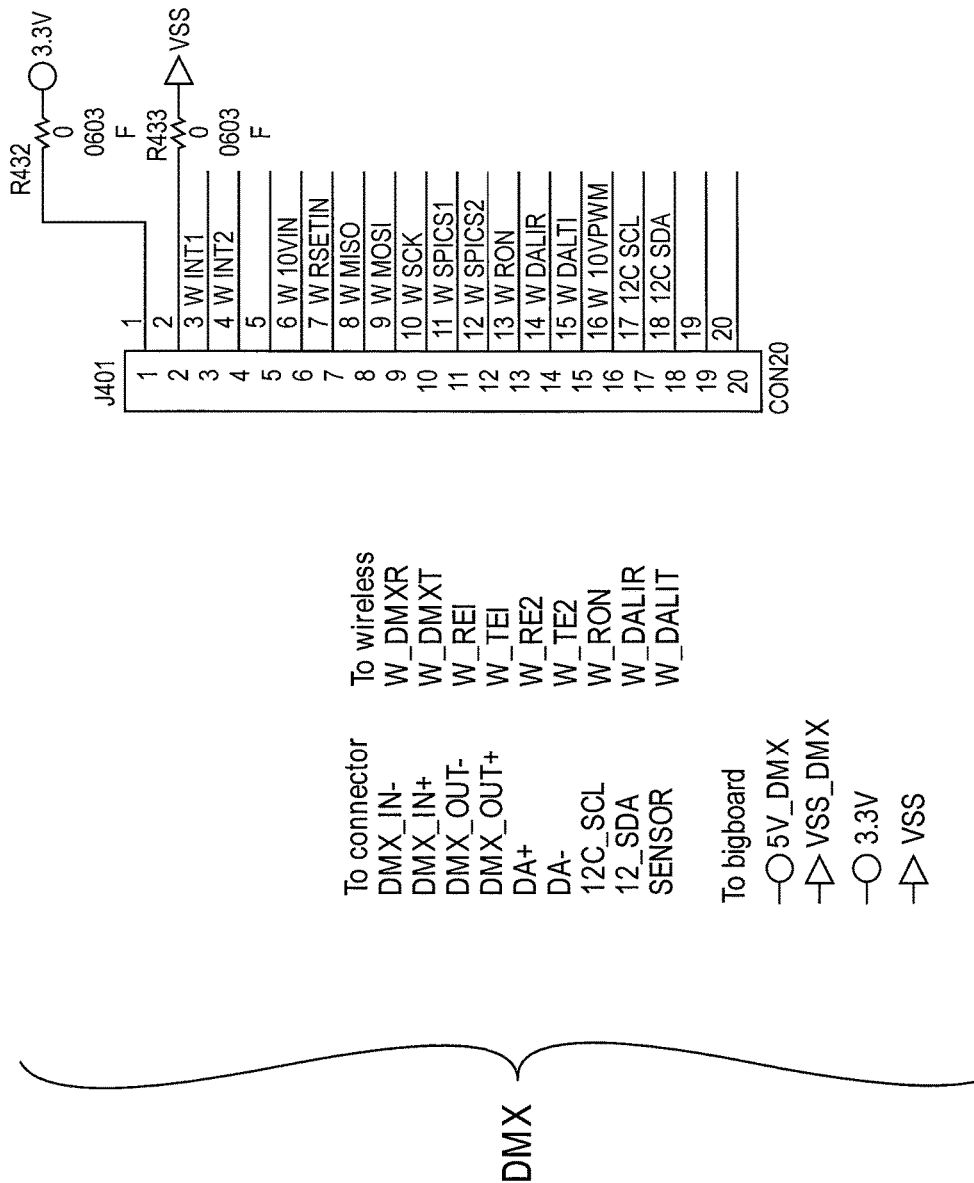
Figure 8:
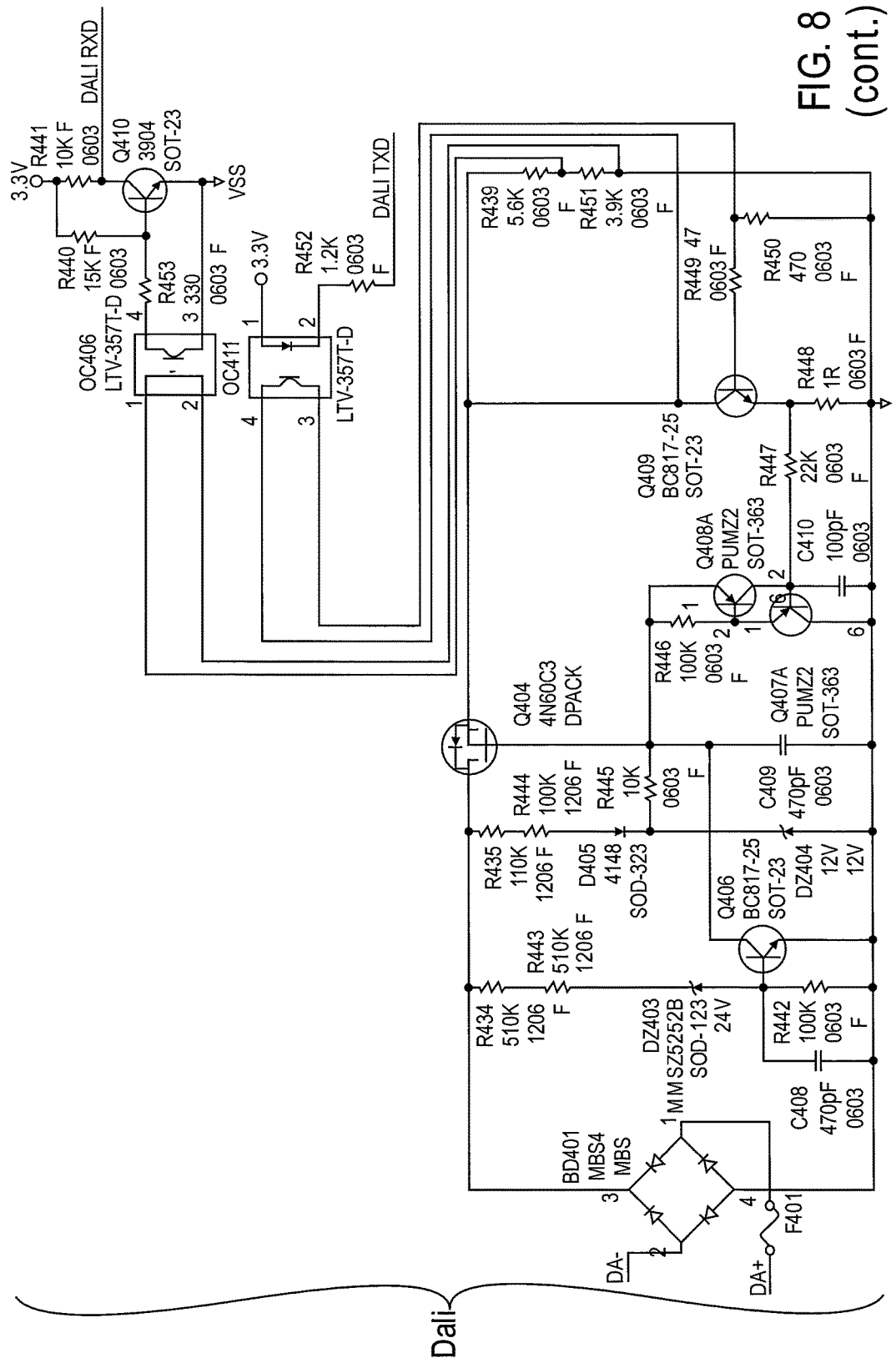
Figure 8:
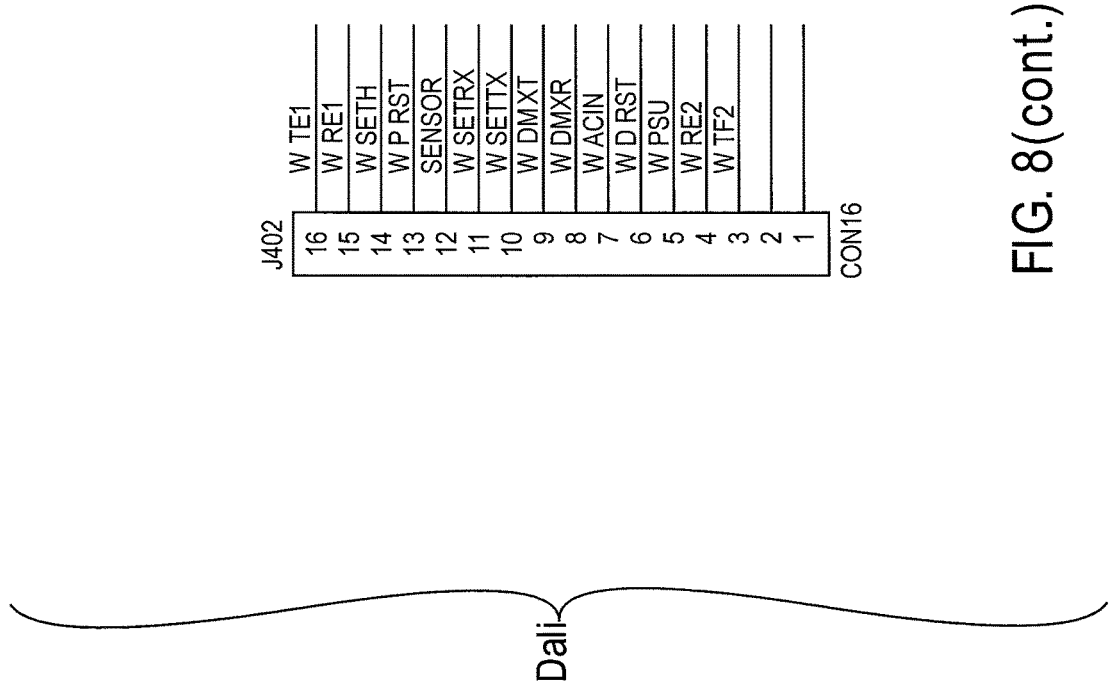

Referring now to FIG. 8, the DALI and DMX circuits are illustrated. As shown in the lower portion of FIG. 8 the DALI circuit operates essentially as follows. Basically the DALI circuit receives the signal from DALI terminal and modifies it and sends it to the wireless MCU GS2011.

As can be seen in the upper portion of FIG. 8, the DMX circuit receives the signal from the DMX terminal, modifies it, and sends it to the wireless MCU GS2011.

Figure 9A:
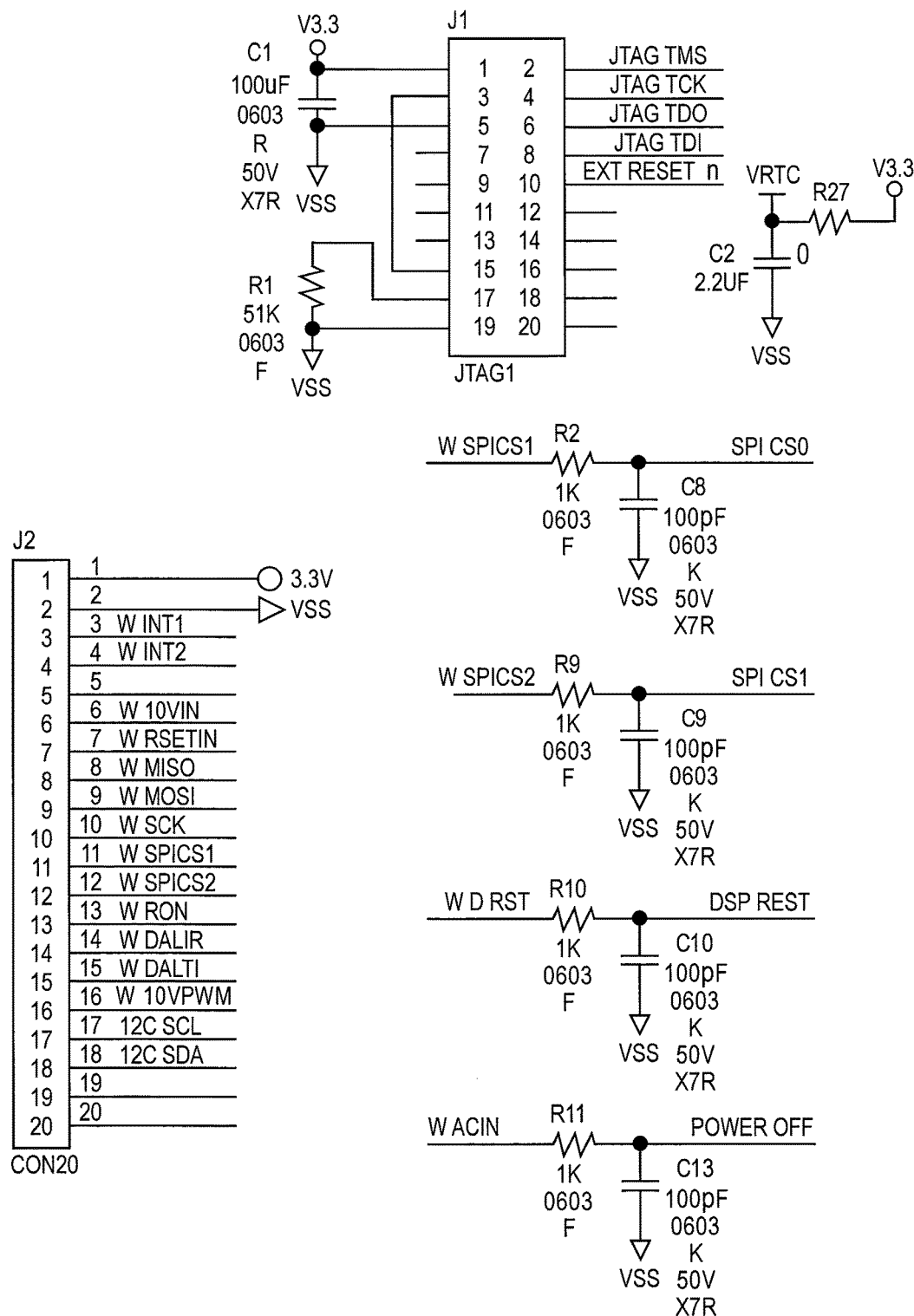
FIG. 9A illustrates an exemplary embodiment of a wireless processor and the various interfaces.
Figure 9A:
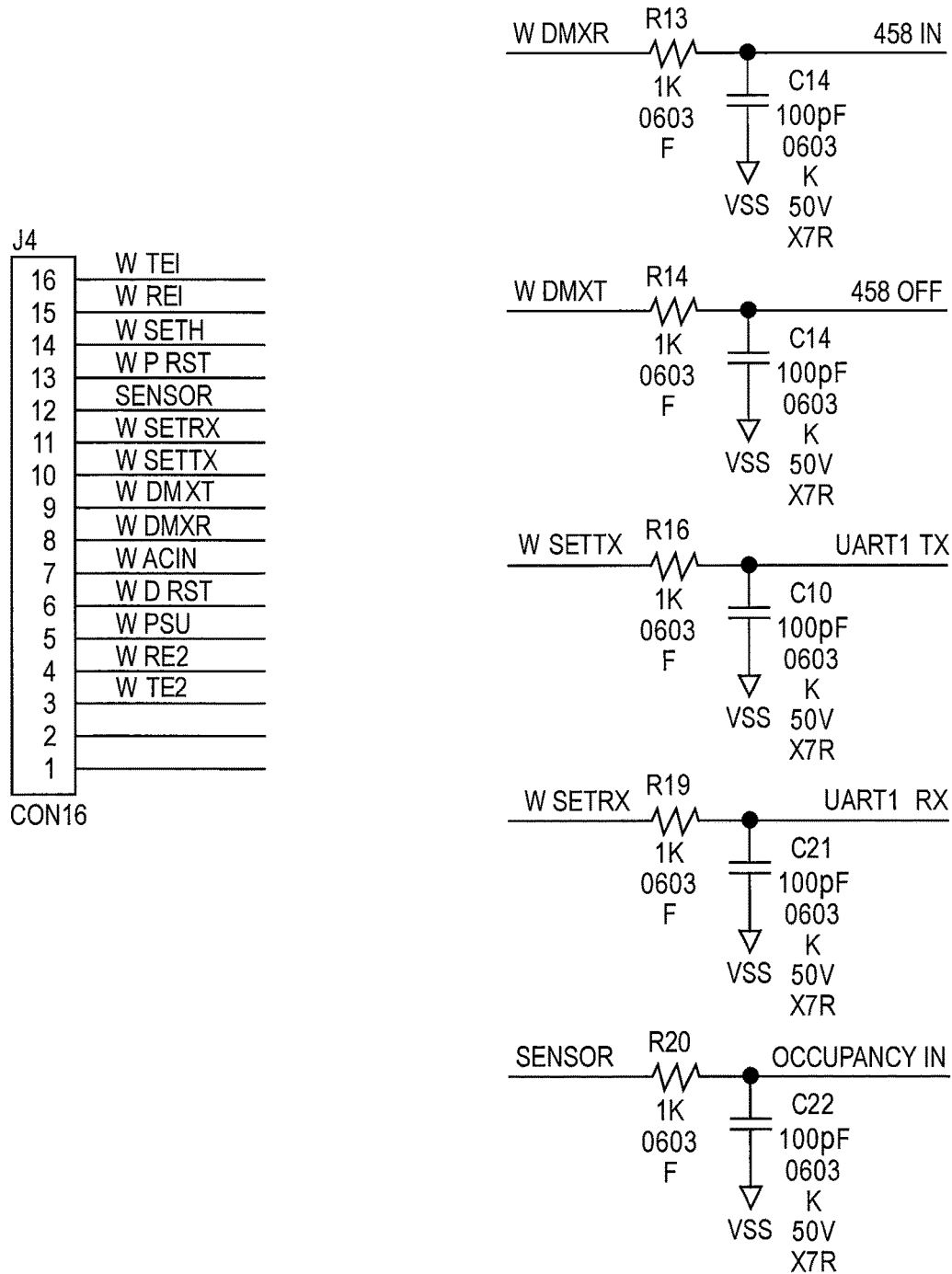
Figure 9A:
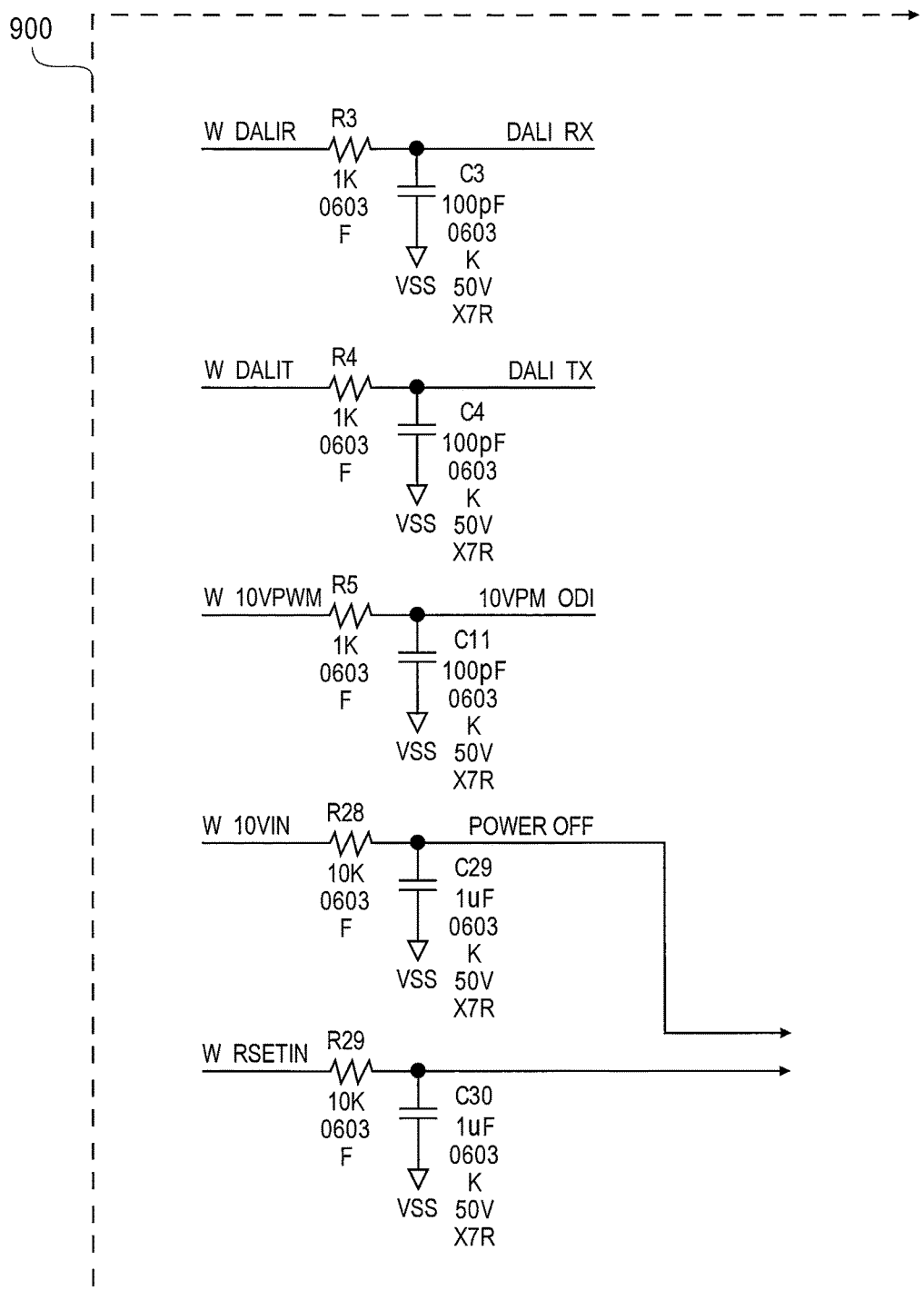
Figure 9A:
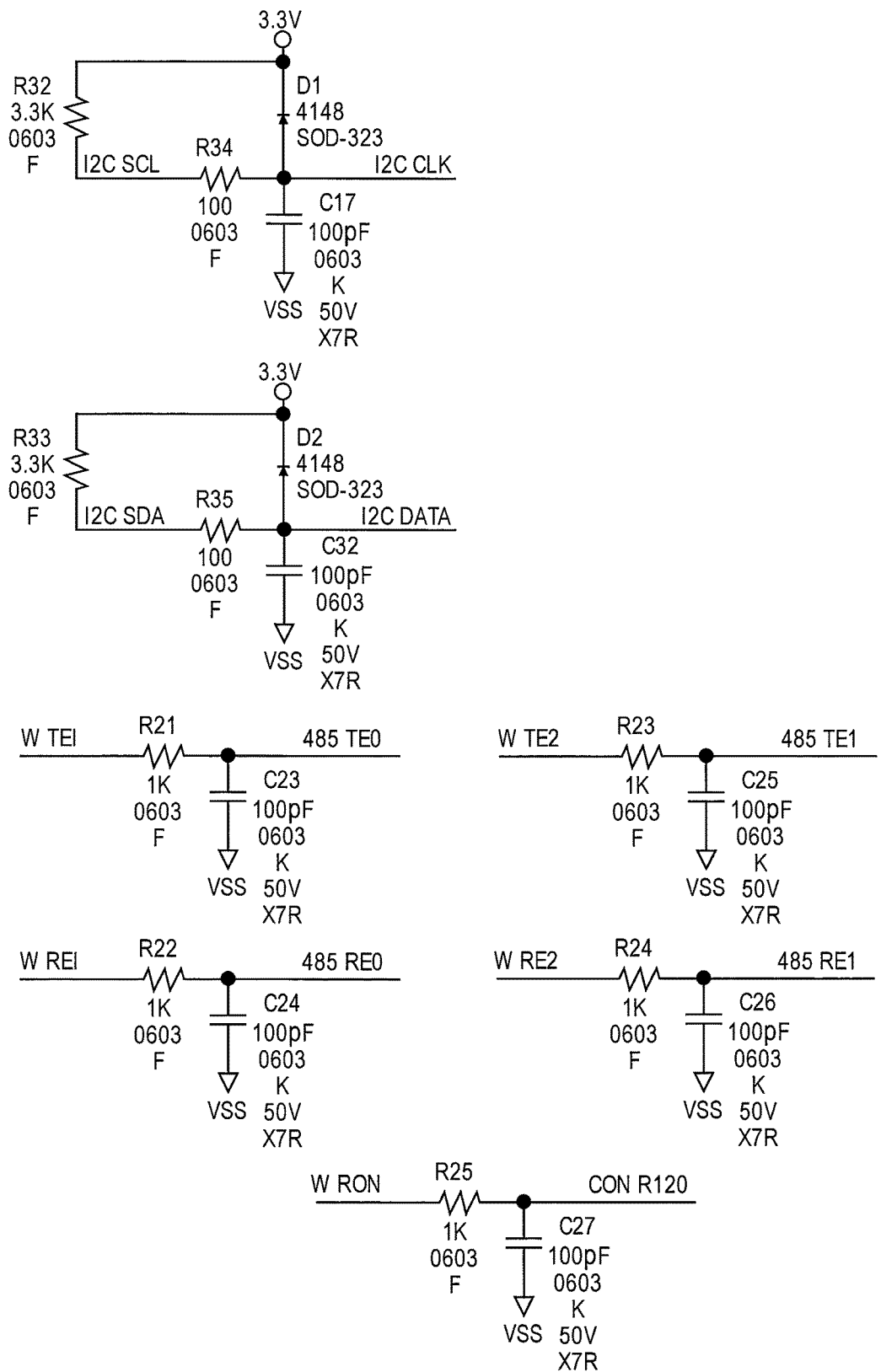
Figure 9A:
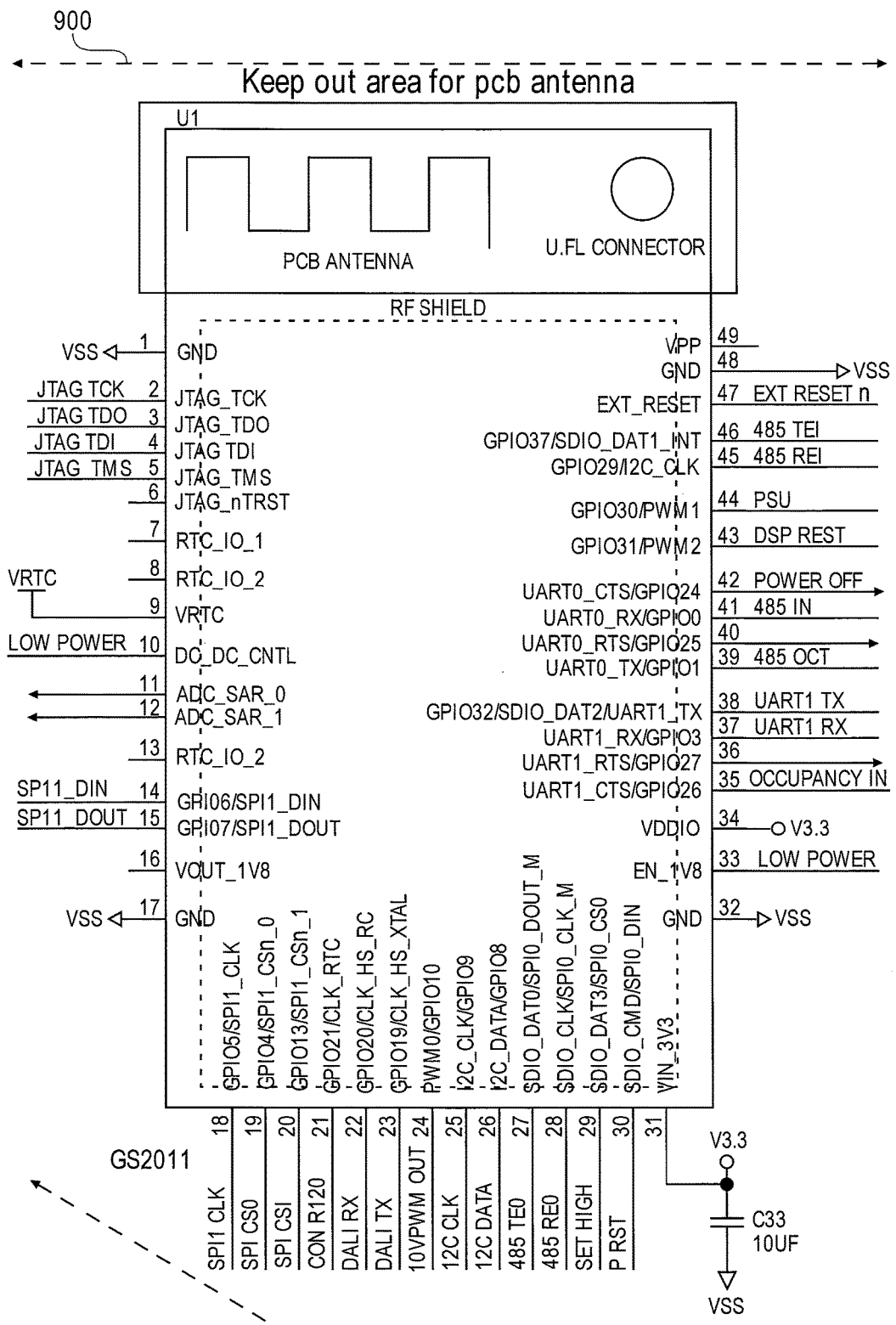
Figure 9A:
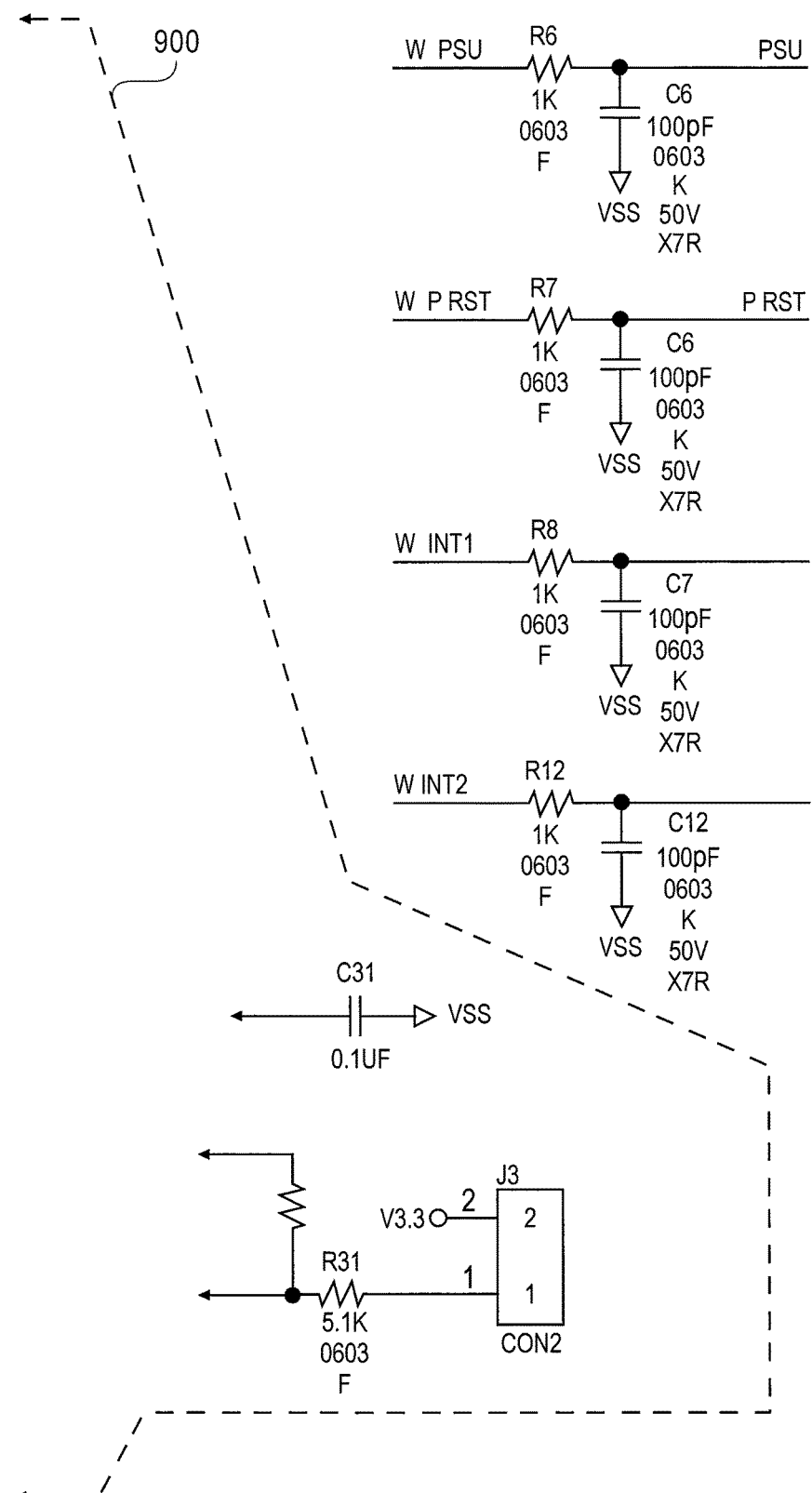
Figure 9A:
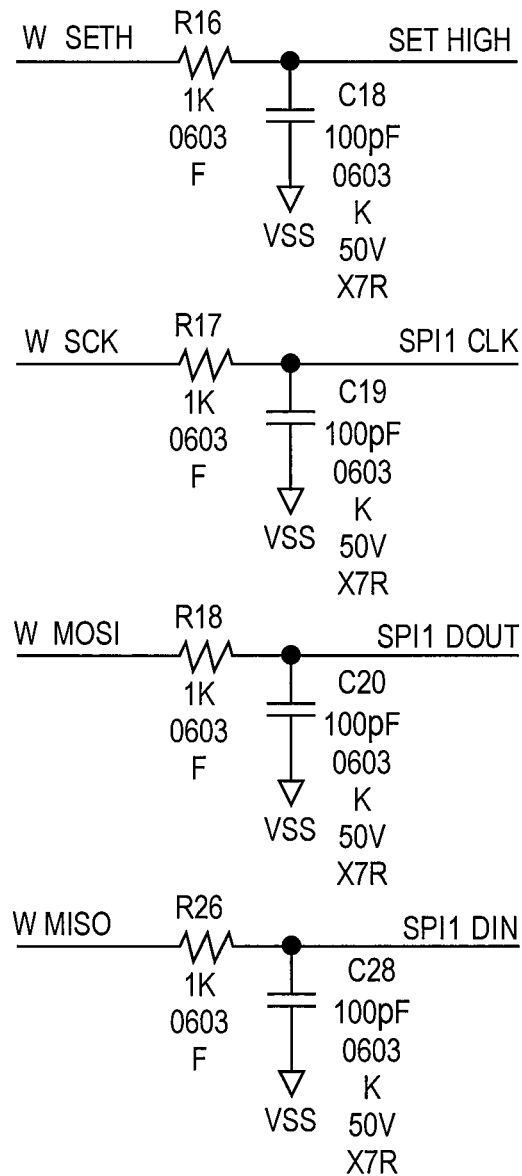

Referring now to FIG. 9A, the wireless MCU GS2011 is illustrated, designated generally as 900, and various interfaces e.g., as shown. The wireless MCU GS2011 provides the following basic functions:
  a) Communicate to wireless network including Wifi or Zigbee;
  b) Talk to energy monitor card through SPI port;
  c) Talk to DSP circuits through SPI0 port;
  d) Dali control;
  e) DMX control;
  f) 0-10V control;
  g) R-set programming for output current;
  h) AC power off detection and turn off output;
  i) Standby command execution—control the power stage to standby mode;
  j) Occupancy sensor control; and,
  k) I2C device control.

Figure 9B:
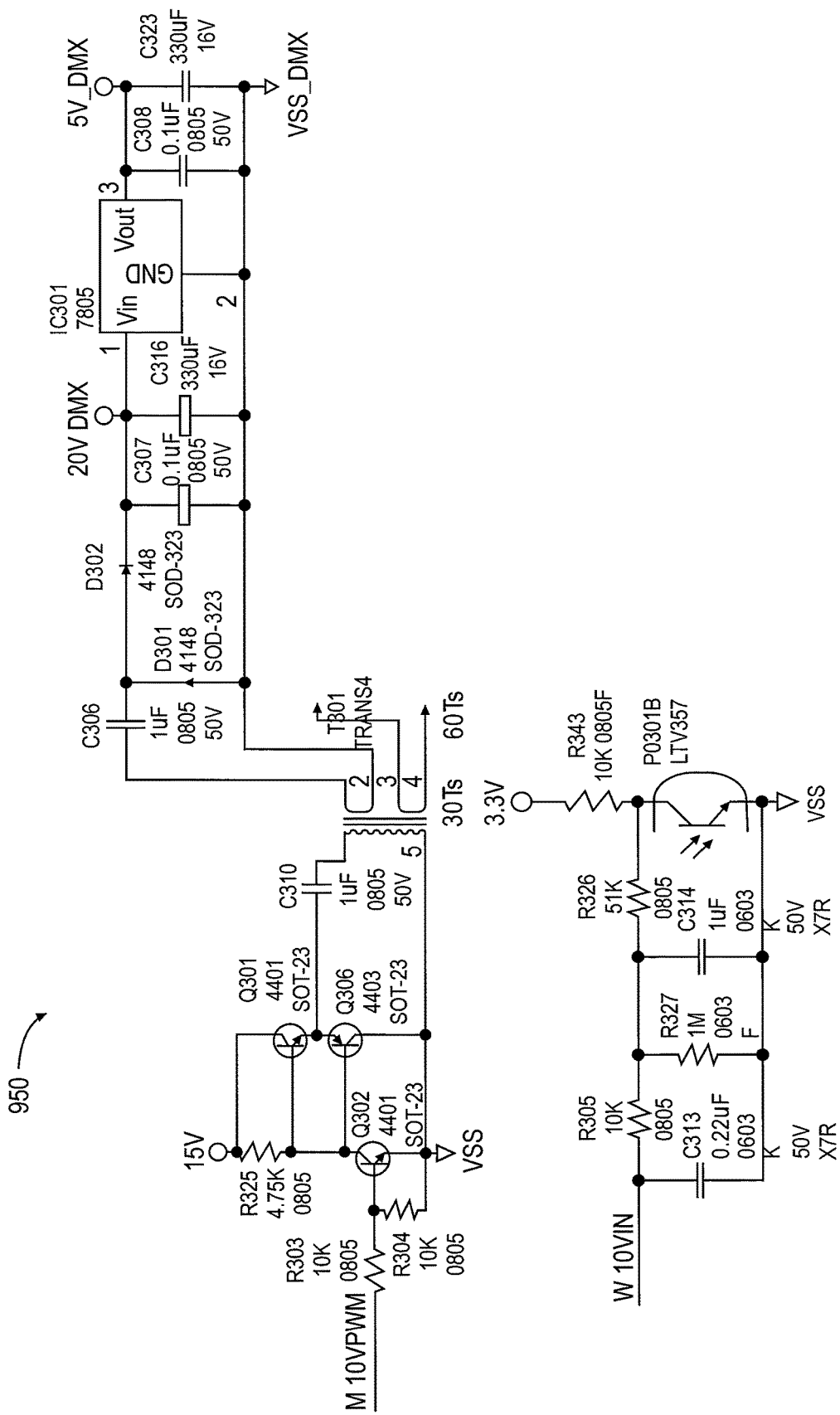
FIG. 9B is a schematic illustration of an LED light.
Figure 9B:
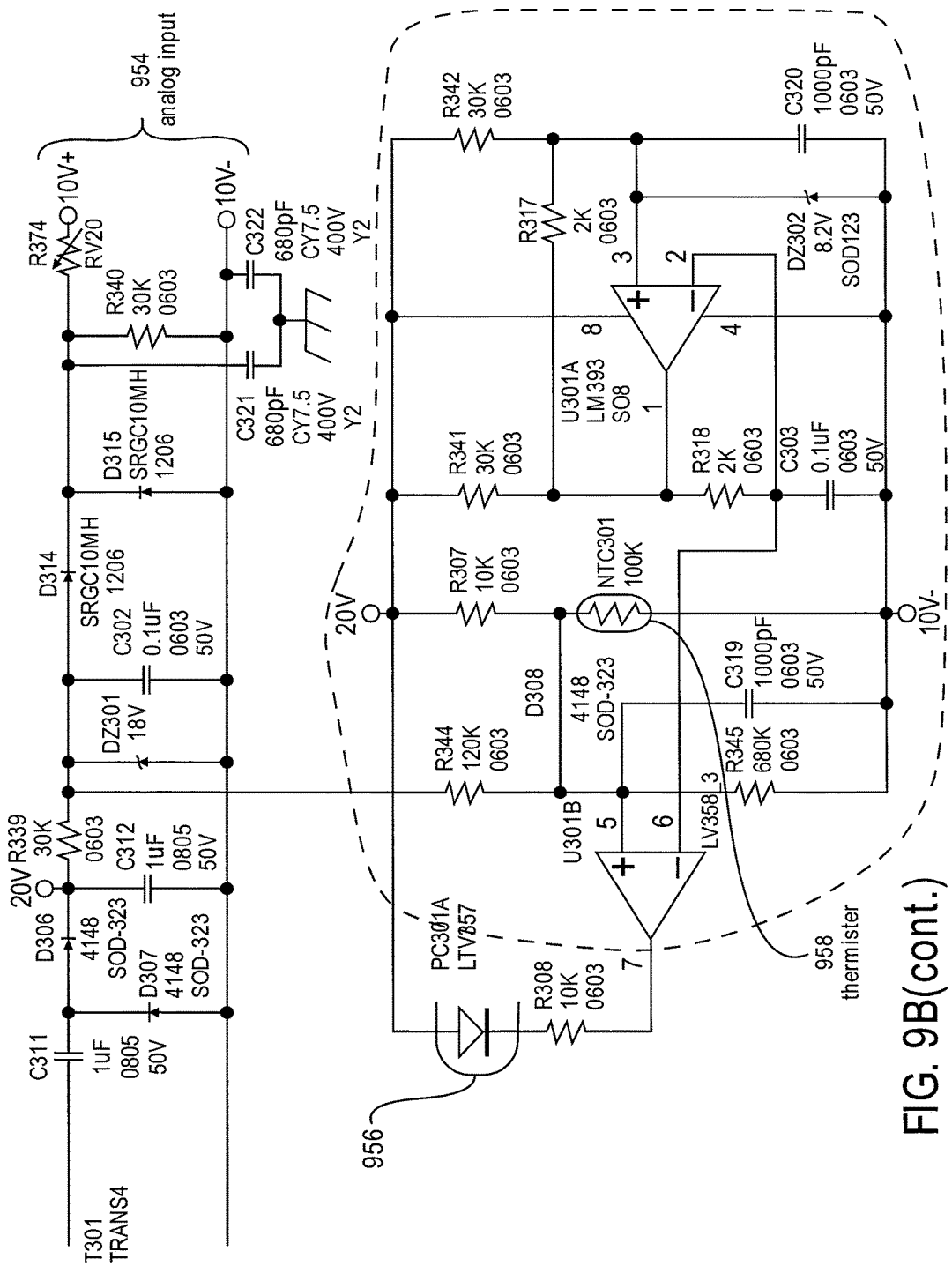
Figure 9B:
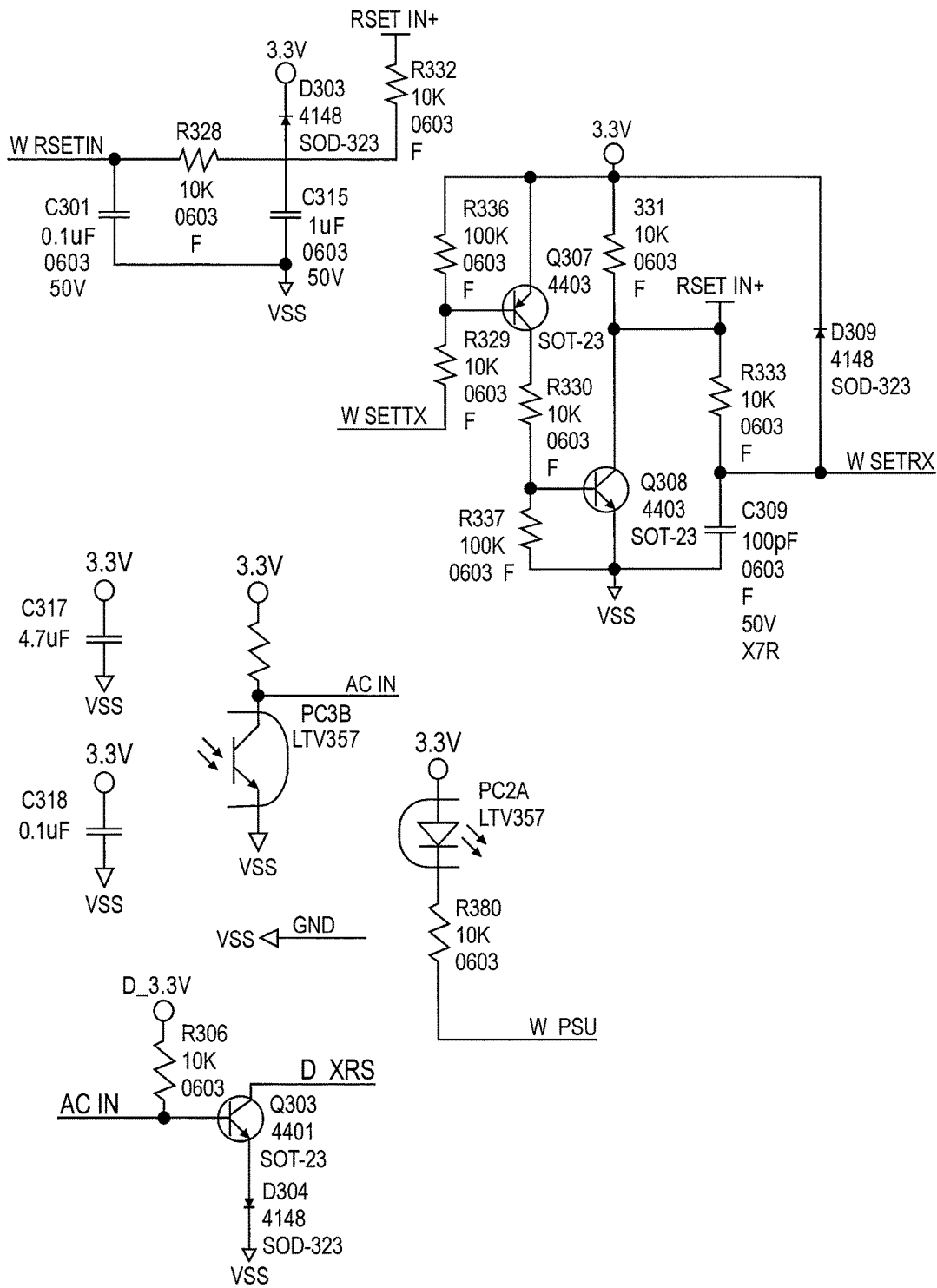
Figure 9B:
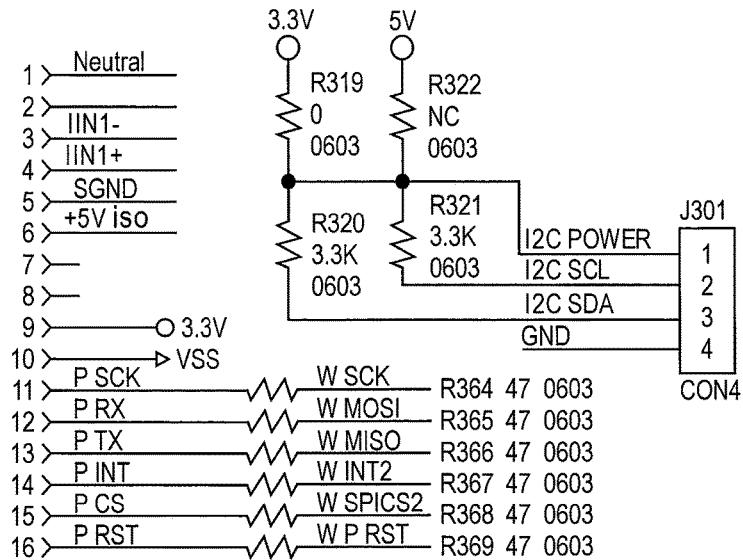
Figure 9B:
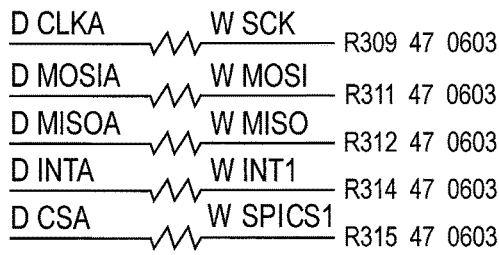
Figure 9B:
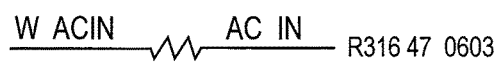
Figure 9B:
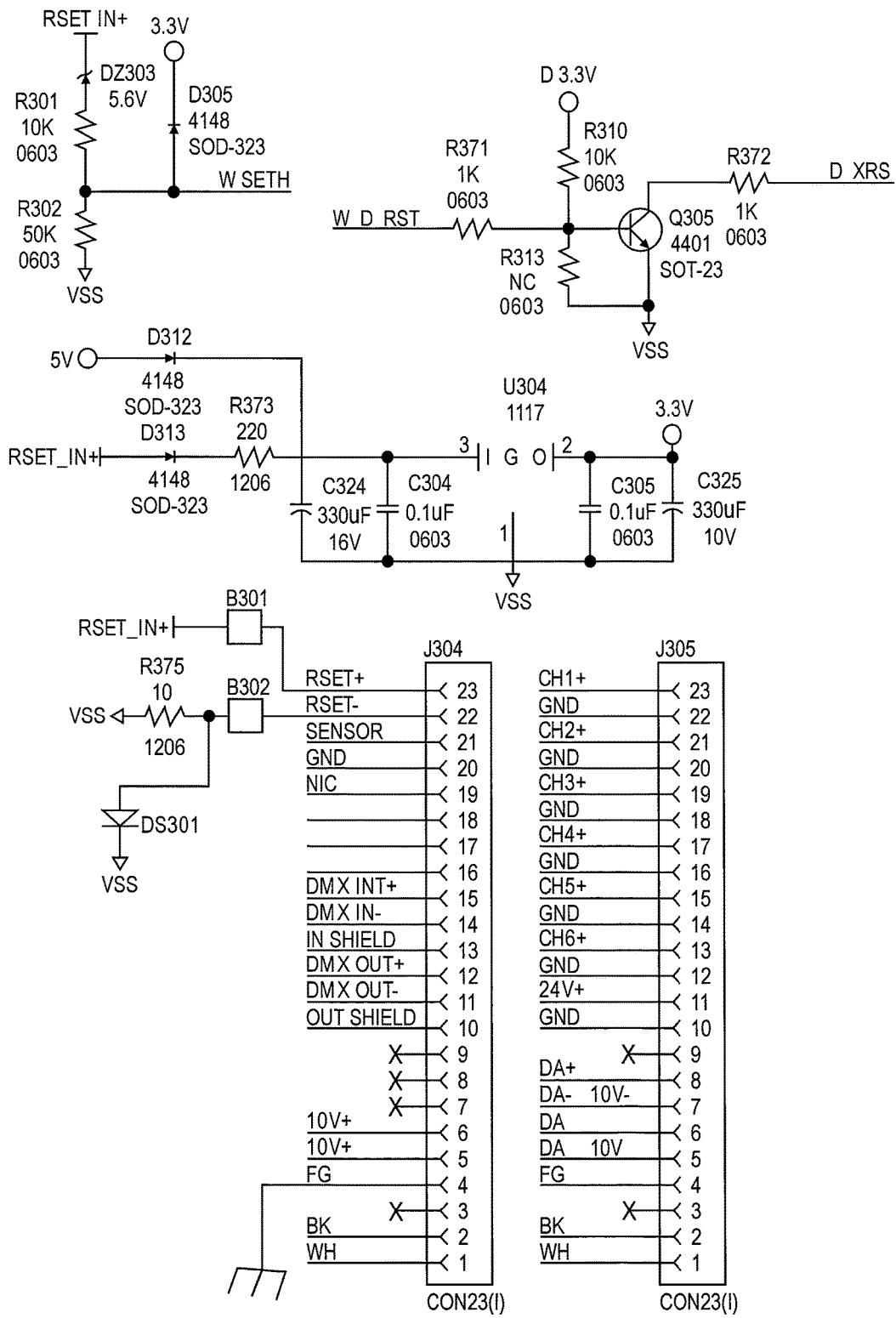

Referring now to FIG. 9B, a circuit is illustrated for galvanically isolating an analog control input, designated generally as 950. Circuit 950 includes a comparator circuit 952 for producing a digitized output from the analog input 954. The digital signal is sent to an optoisolator 956. The comparator circuit 952 includes a thermistor 958. The controller drives a PWM power supply to create an isolated power source for the DMX interface as well as another isolated power source for the 0-10V input. The op-amp circuit consists of a triangle wave generator (U301A) and a comparator (U301B). The 0-10V input is compared to the triangle wave, resulting in an output with a pulse width proportional to the input signal. By running that through an opto-isolator and the processor the input control voltage can be determined based upon the received pulse width. The isolated power supply drives the 0-10v input.

Thus, in an example embodiment, a driver for a lighting device includes: a light emitting diode (LED) driver circuit including interface elements for supporting multiple control connectivity options, the LED driver circuit including (or being configured to utilize) a processor having a plurality of physical layer interfaces coupled to the interface elements and configured to run an operating system that supports a plurality of network protocols, said processor being configured to have a plurality of functions, including a function of providing a bridge (i.e., Gateway) between network protocols of said plurality of network protocols, wherein said processor is configured to perform the functions of:
  detecting available network protocols of said plurality of network protocols;
  selecting, for a physical layer interface, a mode of operation appropriate to ensure interoperability and backward compatibility for said available network protocols, said modes of operation including
    an inactive mode, wherein the network protocol is inactive;
    a monitoring mode, wherein the network protocol is listening, and the processor is configured to receive signals representing the status of a network;
    a gateway mode, wherein the network protocol is active, and the processor takes a role of a master network controller over a subordinate network for the purposes of bridging said network protocol to another higher priority network protocol; and a primary mode, wherein the network protocol is active, and the processor participates as a node on the network; and assigning (one or more of) said available network protocols to said physical layer interface(s).

In example embodiments, the processor is further configured to perform a function(s) of selecting a desired network protocol as a priority (or higher priority) network protocol and placing said (selected) desired network protocol in an active mode. The plurality of network protocols includes, by way of example, network protocols selected from a group (of network protocols) including: WiFi, Zigbee, DALI, DMX, and 0-10V. In example embodiments, WiFi is a highest order network protocol of the plurality of network protocols. In example embodiments, the network protocols are configurable in a desired hierarchy.

In another example embodiment, a driver for a lighting device includes a light emitting diode (LED) driver circuit (including and/or) utilizing interface elements for supporting multiple control connectivity options, the LED driver circuit (including and/or) utilizing a processor having a physical layer interfaces coupled to the interface elements and configured to operatively support a plurality of network protocols, the processor being configured to perform a plurality of functions, including a function of providing a bridge or gateway between network protocols of the plurality of network protocols, the processor being configured to: detect available network protocols of the plurality of network protocols; select, for a physical layer interface, a mode of operation (from modes of operation including, for example, one or more of: an inactive mode, a monitoring mode, a gateway mode, and a primary mode) appropriate to ensure interoperability and backward compatibility for the available network protocols; and assign (one or more of) the available network protocols to the physical layer interface(s).

Multi-Channel LED Driver with Programmable Channel Characteristics

Driver may be programmed for Constant Voltage, Constant Current or a combination on a per-channel basis Digital Signal Processor—based regulation allows complete control of channel parameters Allows operator or fixture designer to select LEDs of varying characteristics Description & Overview Referring additionally to FIGS. 10-13, a LED Driver with multiple independent drive channels is now described. Each channel may be configured to support specific LED light source characteristics (such as voltage, current, gamma, and aging characteristics).

Herein also is described an LED Driver with multiple independent drive channels. Each channel may be configured to support specific LED light source characteristics (such as voltage, current, gamma, and aging characteristics). Each channel incorporates a switch-mode type power supply implemented using a Digital Signal Processor (DSP). This enables the channel circuit to combine the functions of voltage regulation, current regulation, and LED source dimming through an adaptive combination of pulse-width modulation and modifying its drive current. Channel drive characteristics are configurable via firmware, offering full control and adaptation to the LED source on a device by device basis. This eliminates production variance and enabling consistency in optical performance in the luminaire over the light source lifetime.

What is described is a multi-channel LED Driver where each channel has programmable characteristics, including voltage, current, dimming response curve (gamma), and supports hybrid methods of dimming (voltage, current, and/or pulse width modulation). The solution consists of a Digital Signal Processor, responsible for switch mode power supply control and light source parameter management, a high speed power switch (MOSFET transistor and related driver circuitry), LC low pass filter, and a current transducer. In this disclosure, the function of switch mode power supply and light source pulse-width modulation diming are shared, reducing circuit complexity and cost. This hybrid topology enables tight control over all light source characteristics in the firmware domain, allowing for advanced techniques to regulate light output uniformly and extend the source's life.

Figure 11:
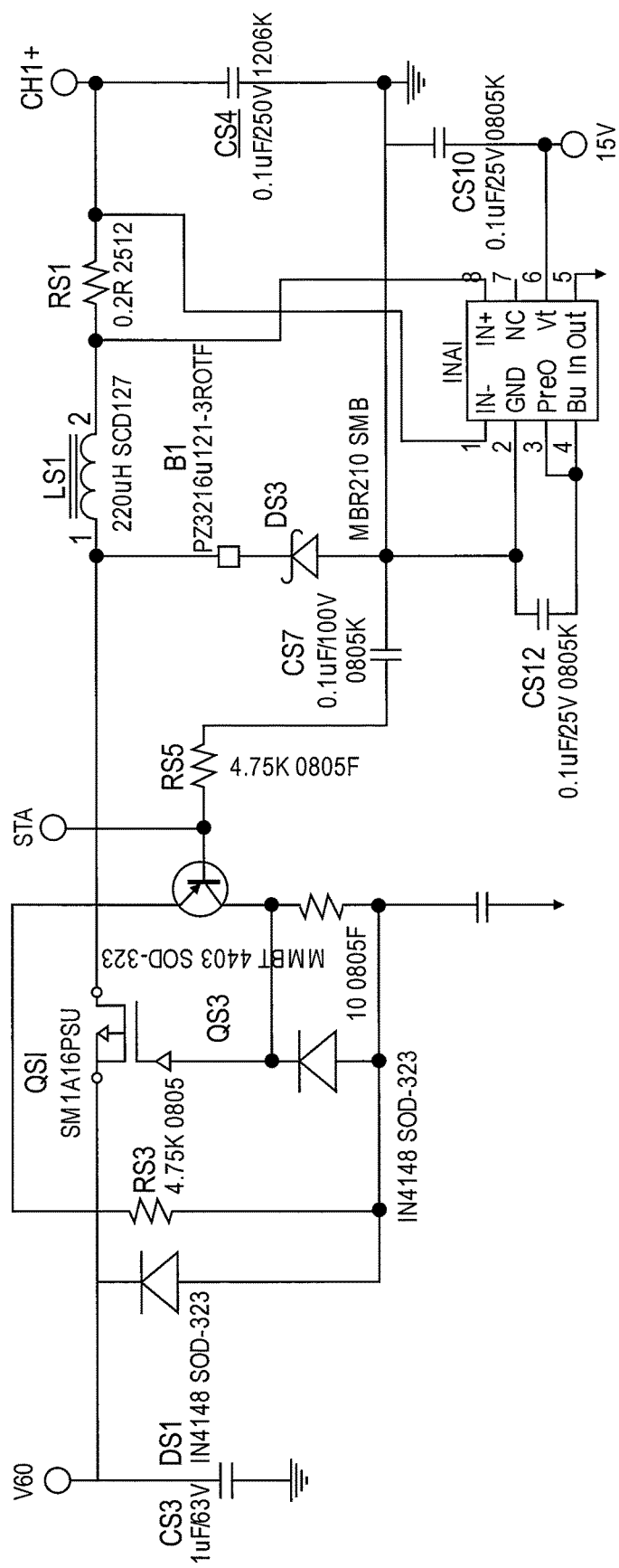
Figure 11:
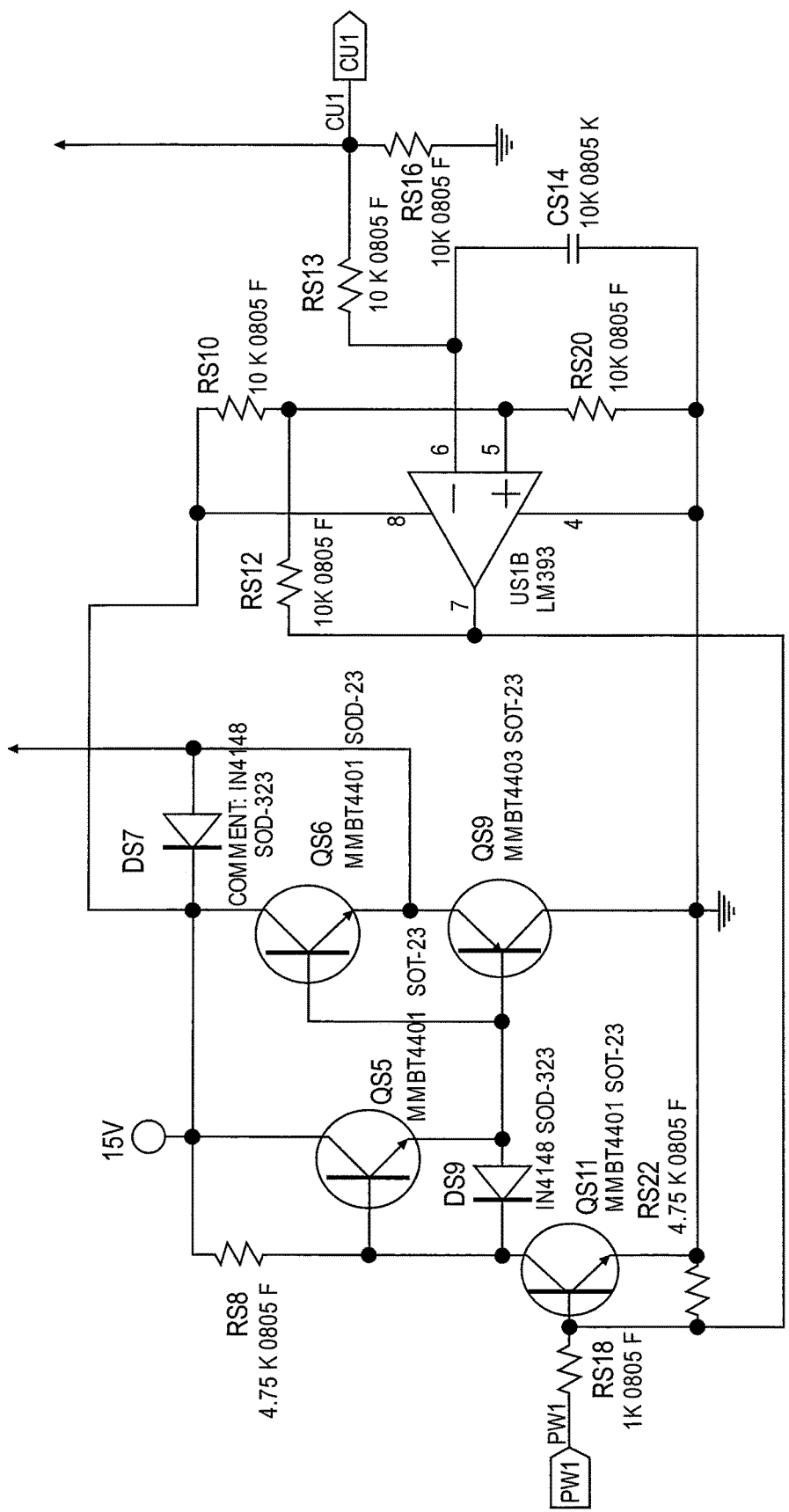
Figure 11:
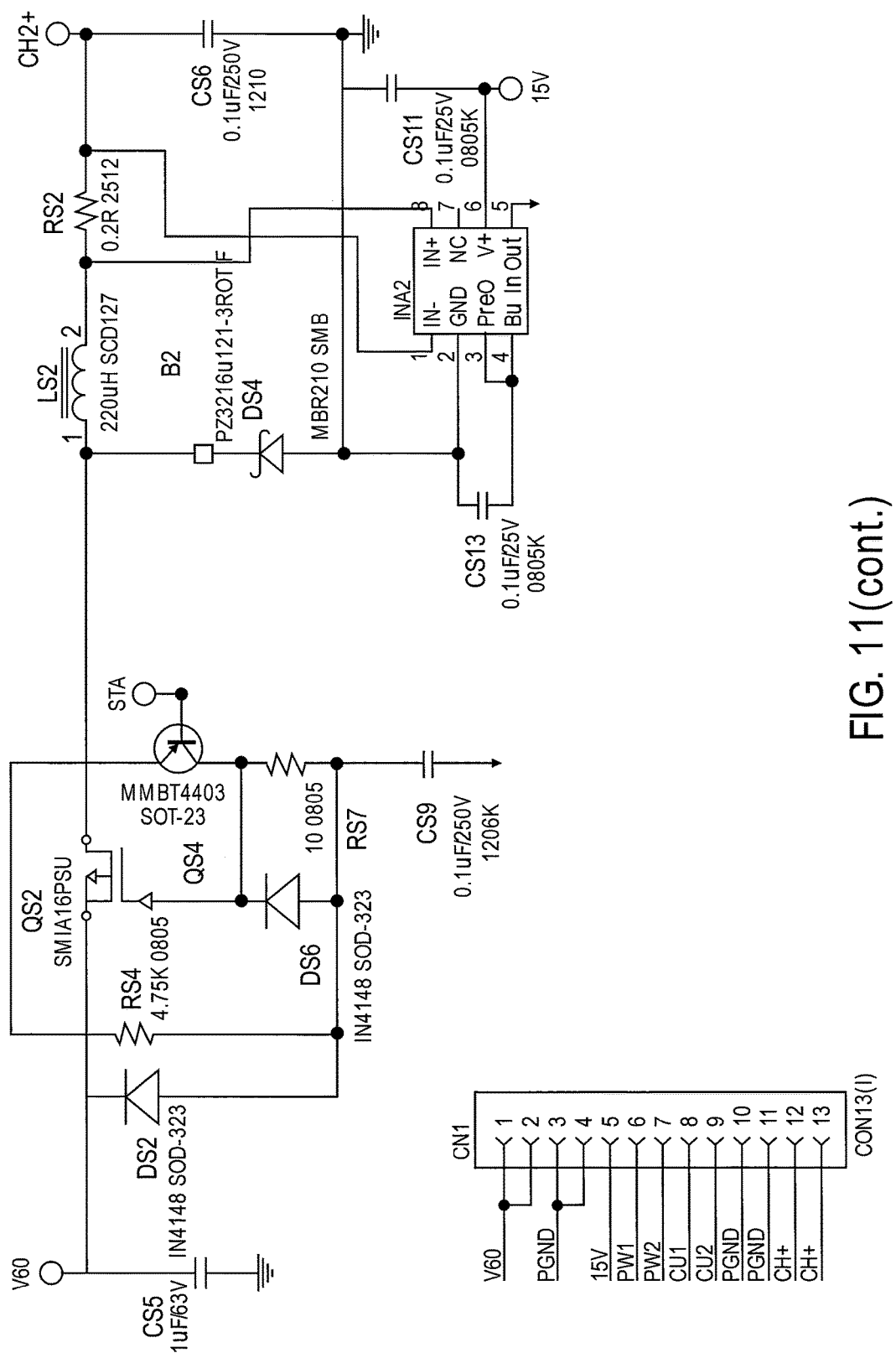
Figure 11:
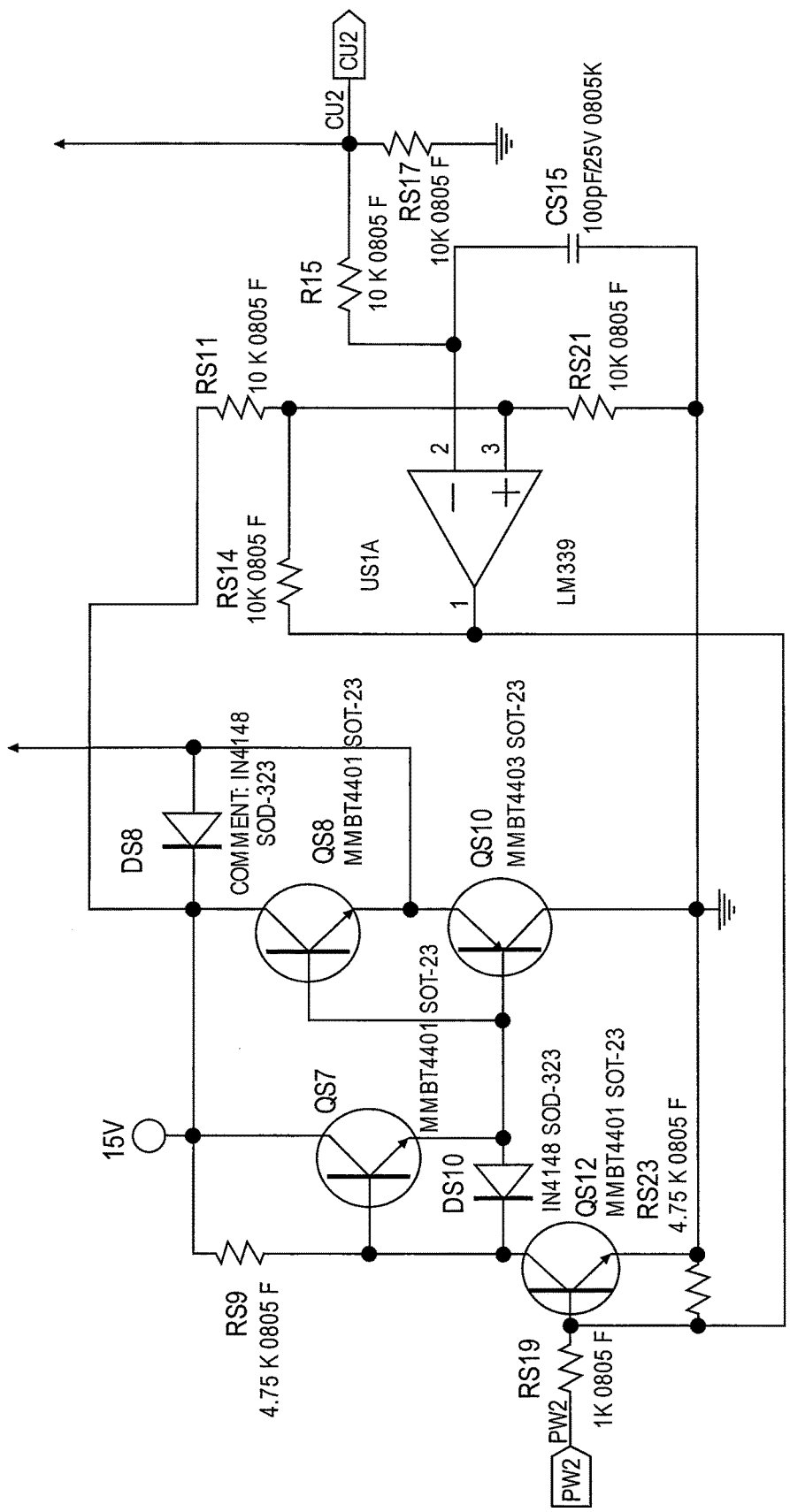
Figure 12:
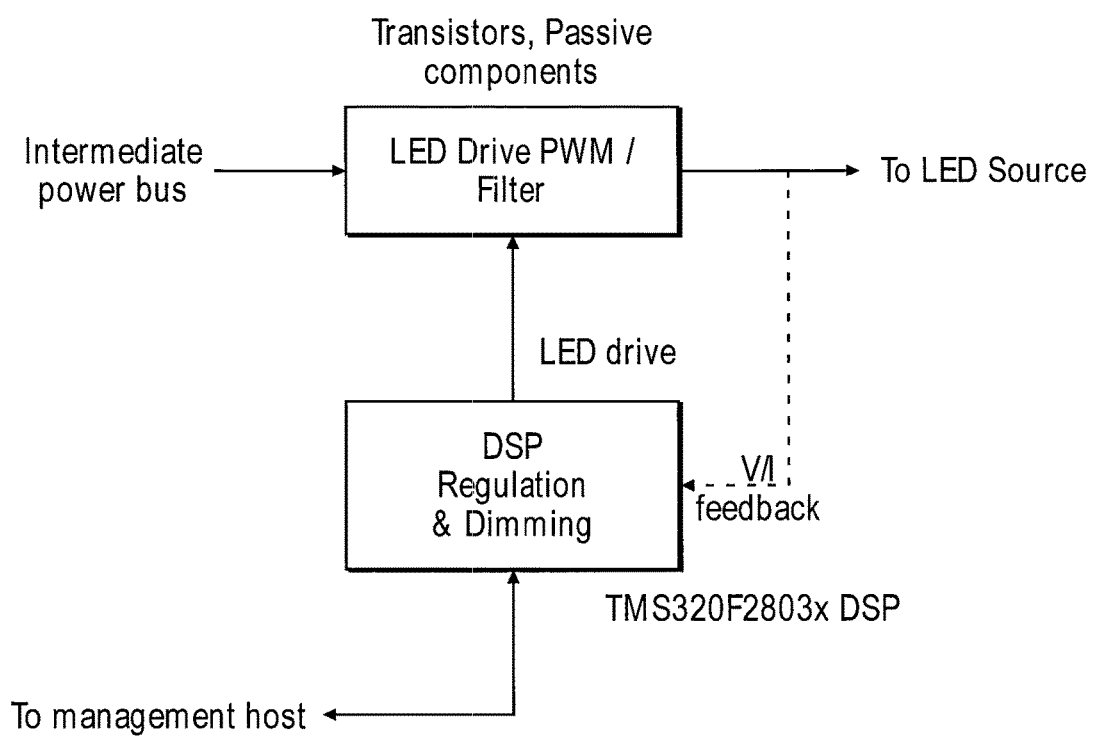
FIGS. 12 and 13 represent a LED drive block diagram.
Figure 13:
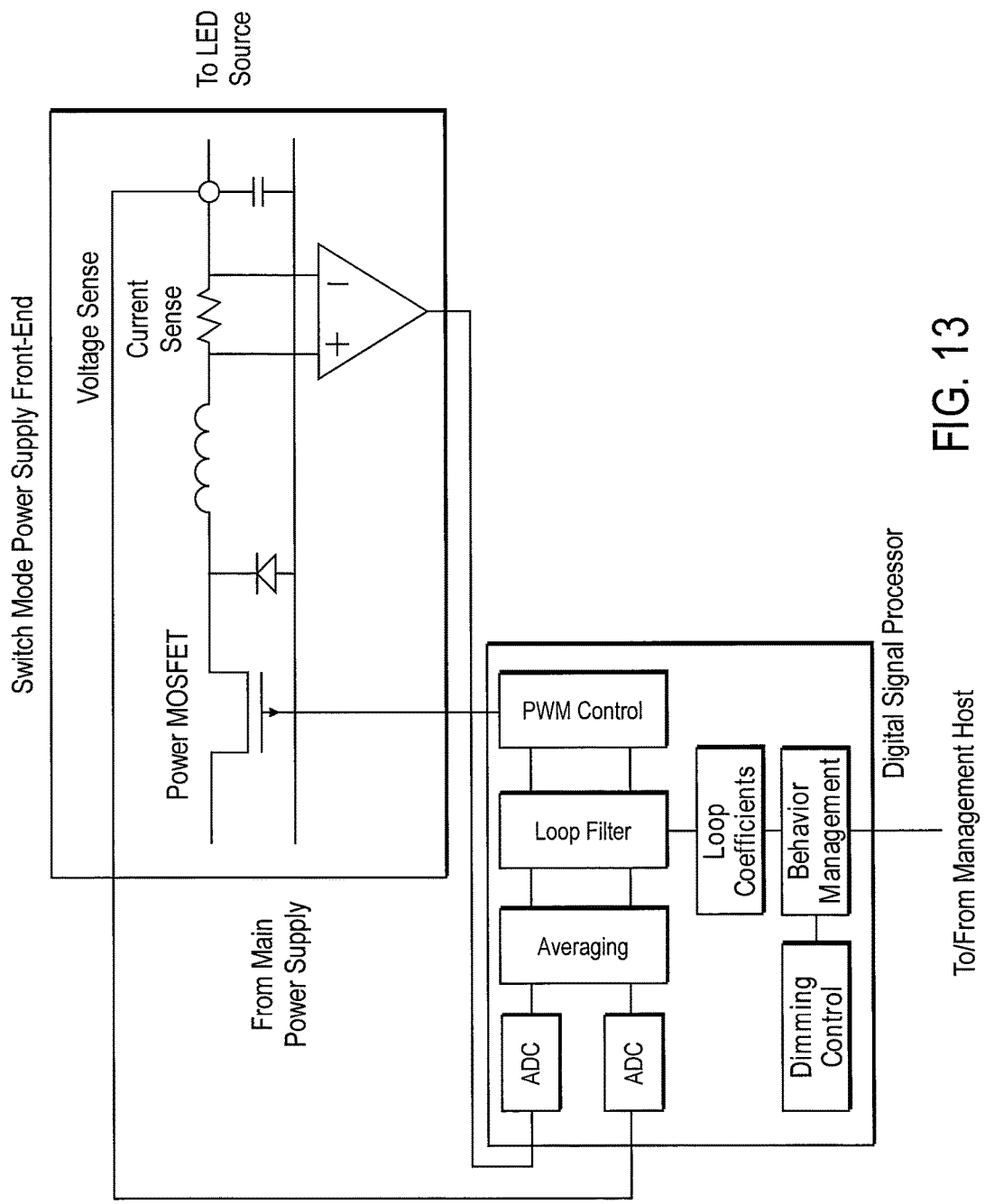

Referring to FIG. 11, in respect to the 2 Channels Buck Convertor, there are 3 daughter cards. Each card has two DC/DC buck convertors. They have the same designs. The output of the flyback stage is fed into node V60. QS1, LS1, RS1, DS3 are the key power components for this buck convertor. The operating theory is as following. When QS1 turns on, the DC power of the flyback output applies to LS1, RS1, and the LED load that connected between CH1+ and the ground. LS1 is energized and behave as a voltage drop on it. DS3 is reverse bias. Then QS1 turns off, and LS1 releases the energy that previously storage to the LED load and DS3. Control the on/off of QS1 the expected output current/voltage can be achieved. This control is realized by DSP. The DSP sense the output current through node CU1 and output voltage through node CH1, and control the QS1 through node PW1. QS5, QS6, QS9, QS11 and their peripheral components form a drive circuits to adjust PW1 to a proper driving signal to QS1. The IC INA1 is high-side current amplifier which amplifies the current signal from RS1. US1B is used to have a over current protection. The current sensing signal is input to negative of US1B and compare to the reference that feed to positive of US1B. If the current signal is greater than reference, US1B goes low and block PW1 to work. Then QS1 remains off to reduce the output current.

Figure 10:
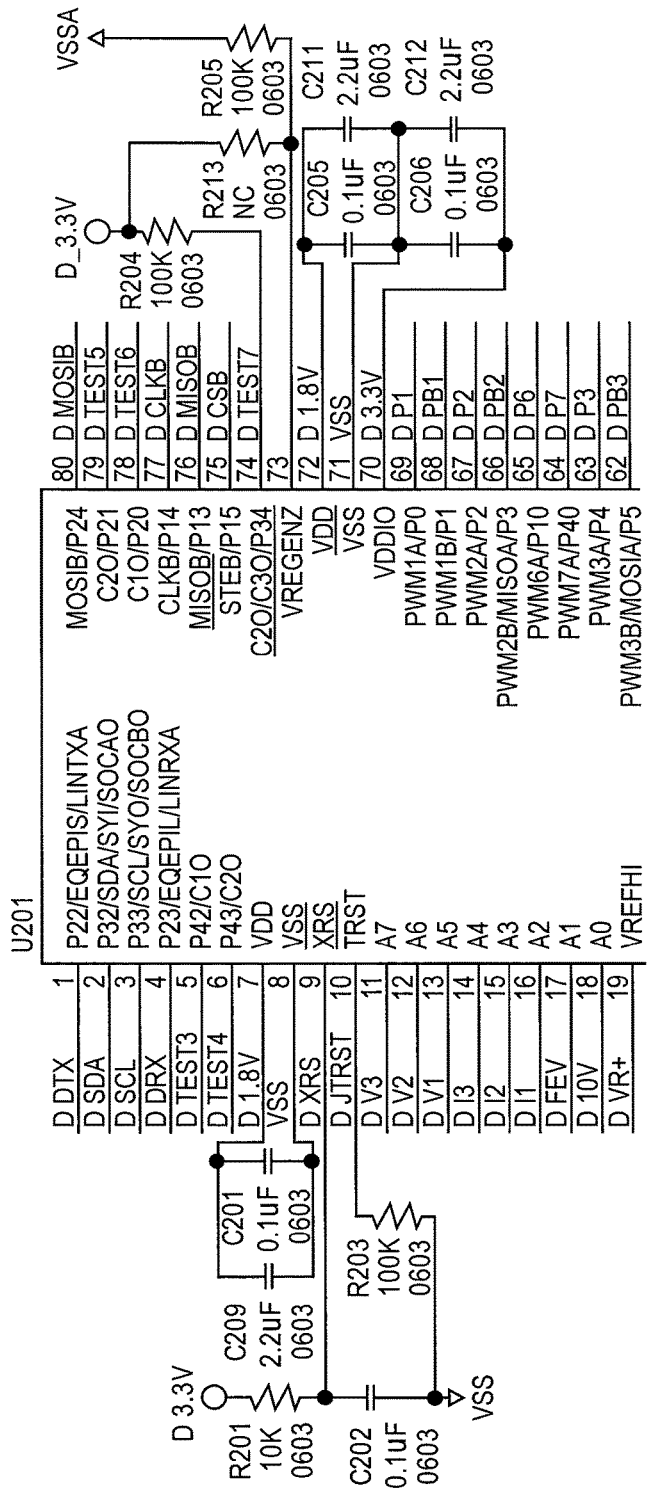
FIGS. 10 and 11 schematically represent the functionality of a LED Driver with multiple independent drive channels.
Figure 10:
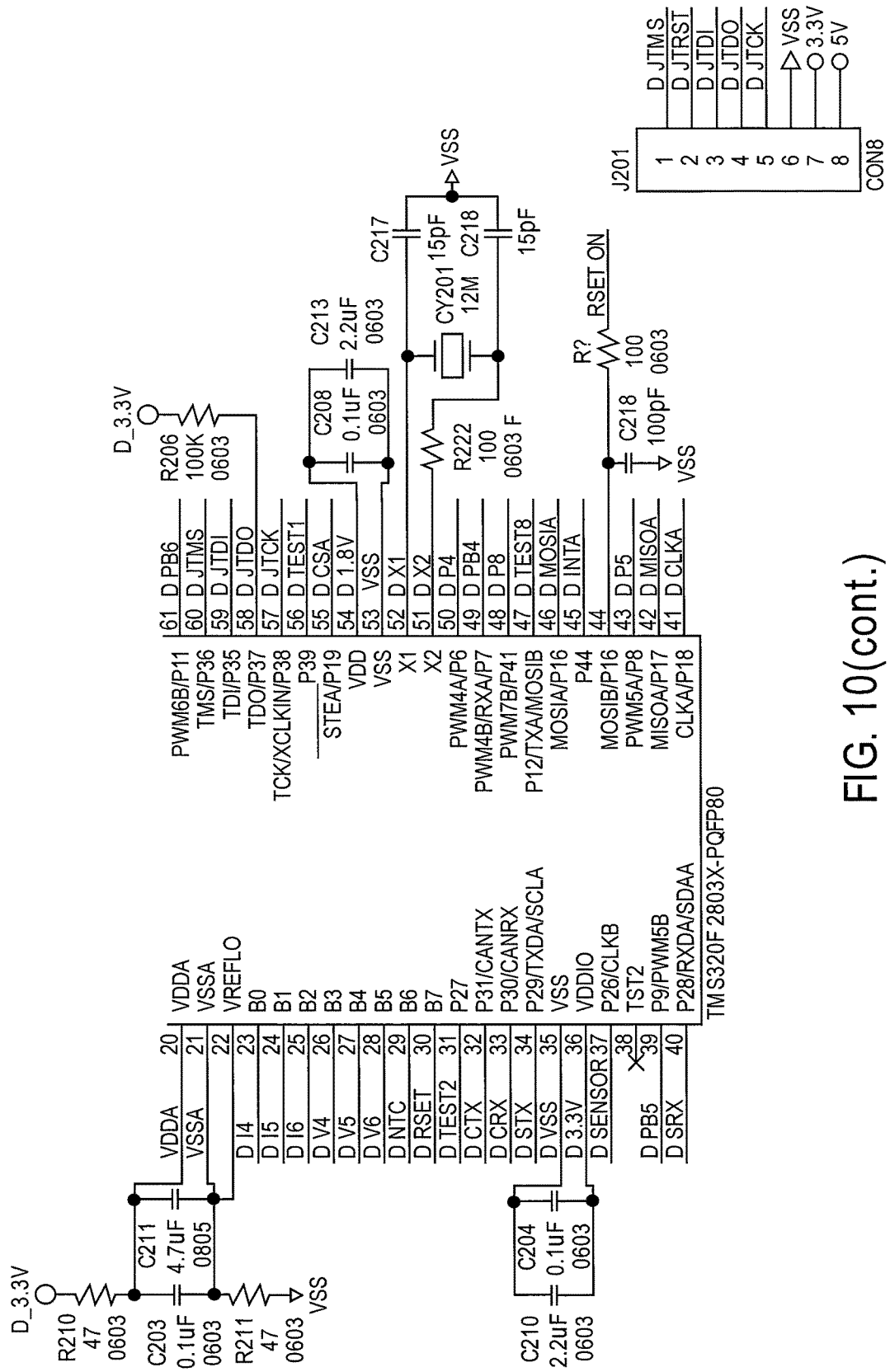
Figure 10:
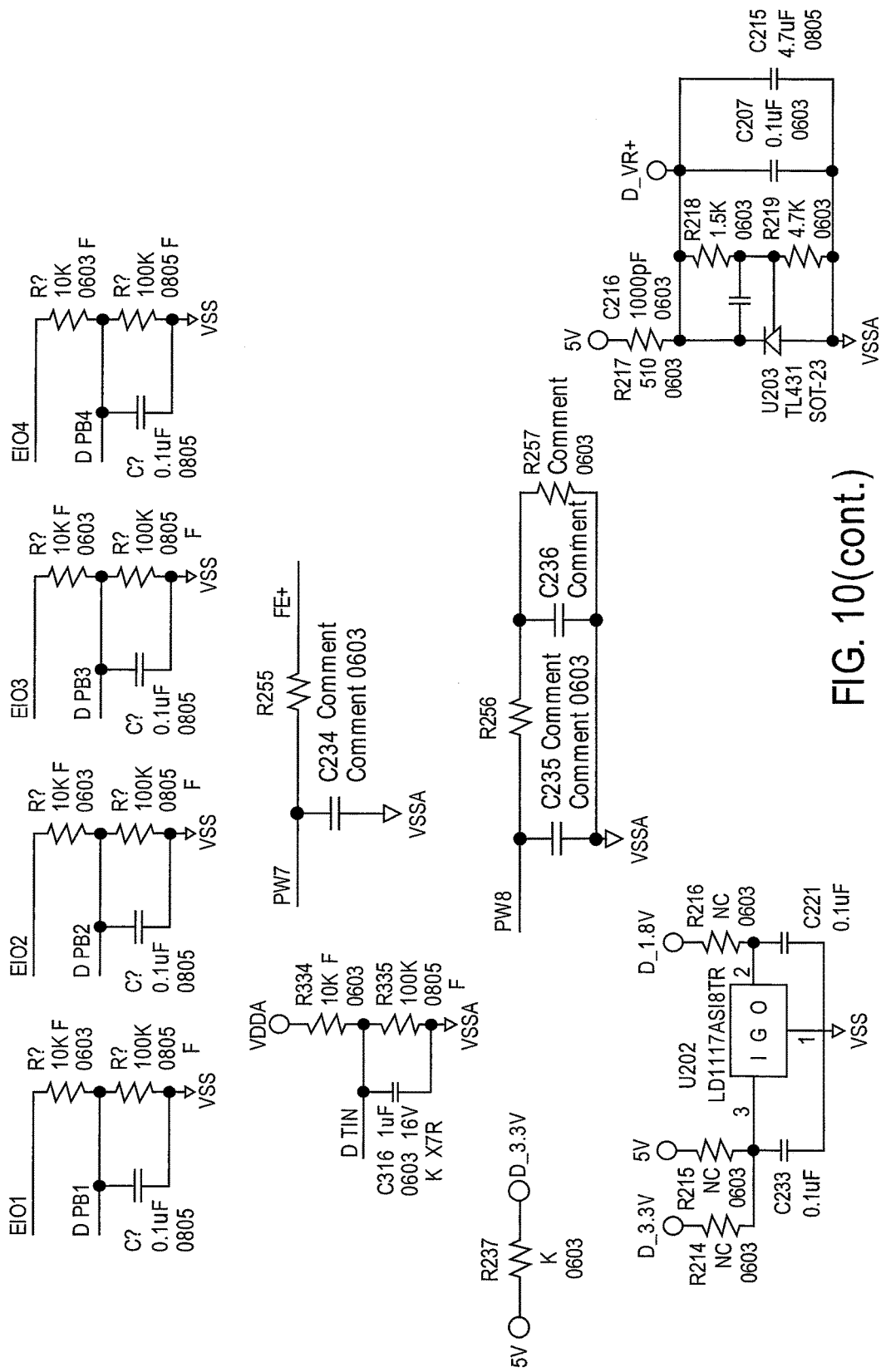
Figure 10:
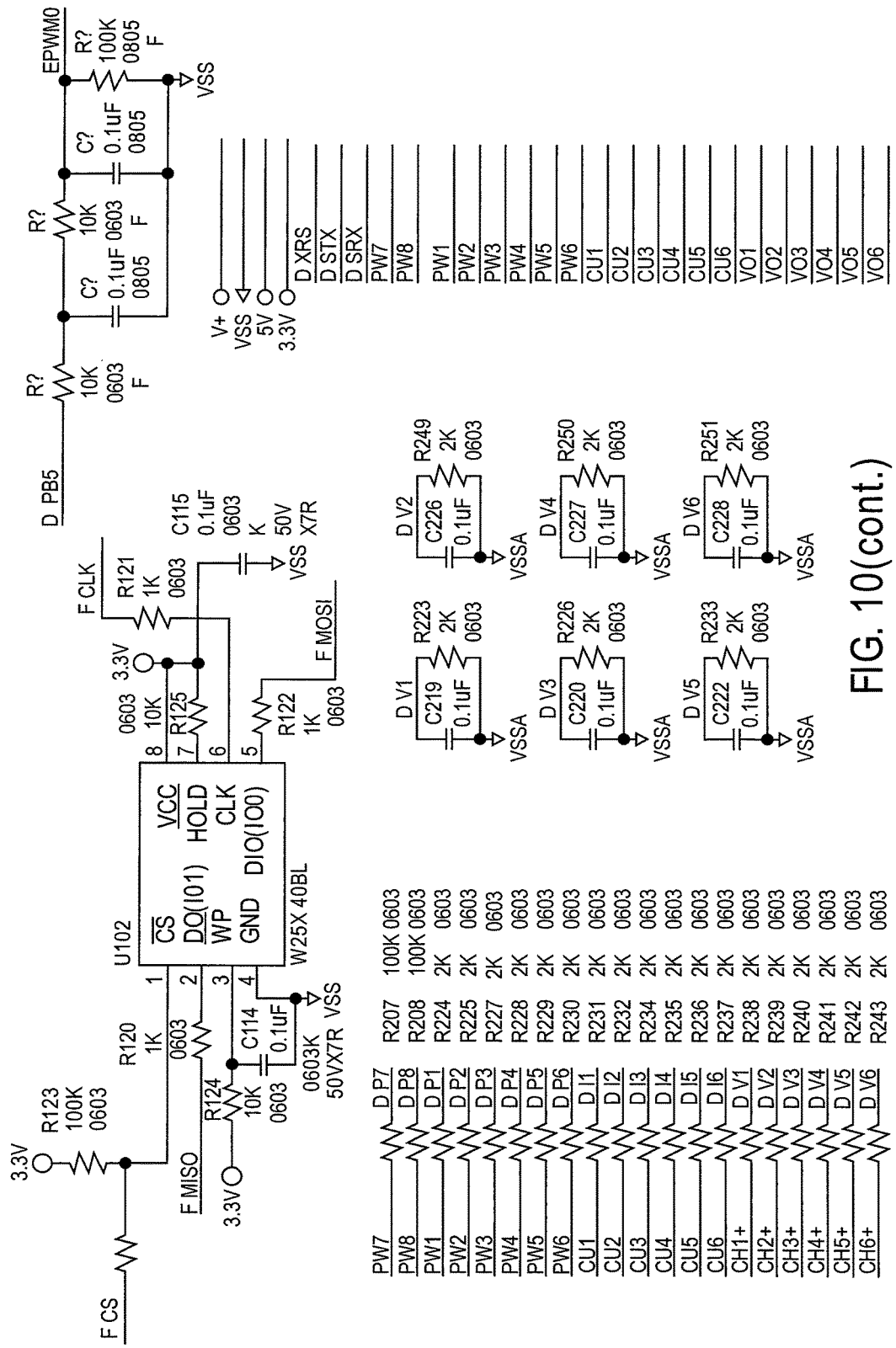
Figure 10:
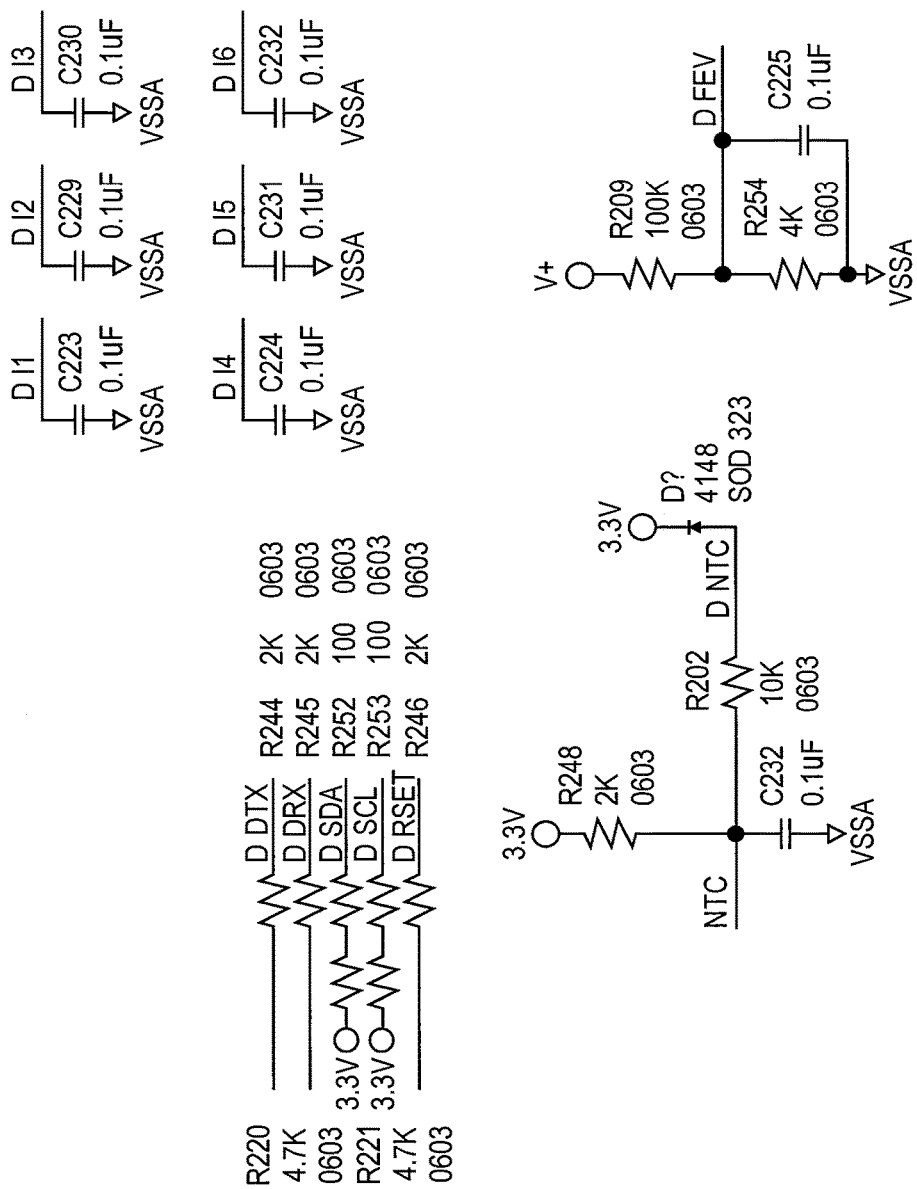

Referring to FIG. 10, in respect to the DSP control, one of the major functions of the DSP circuits is to control the 6 channel DC/DC output to pre-determined voltage (Ch1+~CH6+)/current (CU1~CU6) level. The DSP senses output current and voltage of each DC/DC, calculate the demand PWM signal combining the programming signal for output voltage/current and output the PWM signal (PW1~PW6) to drive each channel.

The DSP can be configured (programmed) to also report the sensing information and operating status through SPI port. Pin D_XRS and D_STX and D_SRX is used for such purpose.

In example embodiments, the DSP circuit also is configured to sense the front end bus voltage (input for buck circuit). V+ is the DC bus voltage. After a divider resistor chain the signal ('D_FEV) is sent to DSP.

DSP circuit can adjust the front end bus voltage according to the load condition. The PWM signal 'PW7' is filtered as 'FE+' and sent to AC/DC main power stage to control the voltage feedback loop.

The selection of 6ch (or any number of channels) is arbitrary. It is 6ch in the present embodiment, but could be more, or as few as 1ch. Each channel is or can be driven to a predetermined voltage and/or current.

In the power management description to follow, the output current is measured by the voltage across RS1, and amplified via OP-AMP INA1, the resulting voltage proportional to current is presented to the DSP U201 by way of its internal analog to digital converter. There is a filter and comparator function present in the DSP that compares the measured current to the predetermined target drive current. Meanwhile, there is another analog to digital converter input that is connected to measure the channel's drive voltage, the result of which is also compared to the predetermined target drive voltage. Results of these comparisons either increase the channel's PWM drive percentage or reduce it, causing the output to closely track the targets. The PWM drive signal ultimately switches a MOSFET transistor QS1 completing the loop by storing energy in inductor LS1 and capacitor CS4.

The SPI port (a serial port) is used between the DSP and the GS2011 module to provision per-channel LED drive characteristics (Voltage, Current, Dimming %, etc.). Generally, the GS2011 will download this information to the DSP. During operation, the DSP will report back the various measurements the DSP has made regarding each of the channels, and other parameters it has the ability to monitor (such as the intermediate power bus V60, its voltage and current, for example) as well as the DSP's operational state. In example embodiments, the DSP does not have access to the external sensors.

Thus, in an example embodiment involving (digital) independent channel control, a driver for a lighting device including at least one light emitting diode (LED) includes: a lighting driver configured to drive LED(s) of the lighting device, the lighting driver being configured to independently control multiple independent drive channels. One or more (or a plurality) of the drive channels is configured to support specific LED light source characteristics inclusive of light source characteristics selected from a group (of light source characteristics) including: voltage, current, gamma, and aging characteristics. In example embodiments, the drive channels (each) include a (digitally implemented) switch-mode type power supply.

The lighting driver is configured, for example, to: combine the functions of voltage regulation, current regulation, and LED source dimming through an adaptive combination of pulse-width modulation and modifying drive current (of the lighting driver); reconfigure channel drive characteristics via utilization of firmware; control and adapt LED sources on a device by device basis; perform the functions of voltage regulation, current regulation, and translating dimming control into the modulation combination of voltage and current to the LED source(s) to effect the change in lighting intensity; electronically change the (effective) characteristics of a LED light source (e.g., utilizing software) (over the light source lifetime); adapt (e.g., functions, control of processes/operations) to changing light source characteristics; implement hybrid methods of dimming (voltage, current, and/or pulse width modulation) in relation/as to multiple independent drive channels (and each channel has programmable characteristics, including one or more of voltage, current, and dimming response curve (gamma)); and/or implement (a shared process/functionality of) switch mode power supply and light source pulse-width modulation diming, e.g., implemented utilizing a Digital Signal Processor (responsible for switch mode power supply control and light source parameter management), a high speed power switch (MOSFET transistor and related driver circuitry), a LC low pass filter, and a current transducer.

The lighting driver can be configured for example to control a six (6) channel DC/DC output to pre-determined voltage (Ch1+~CH6+)/current (CU1~CU6) level.

LED Driver Energy Management and Error Reporting

Referring back to FIG. 2 the driver 104 in one aspect comprises an LED driver with advanced diagnostic and reporting capabilities, as will be discussed below.

Figure 14:
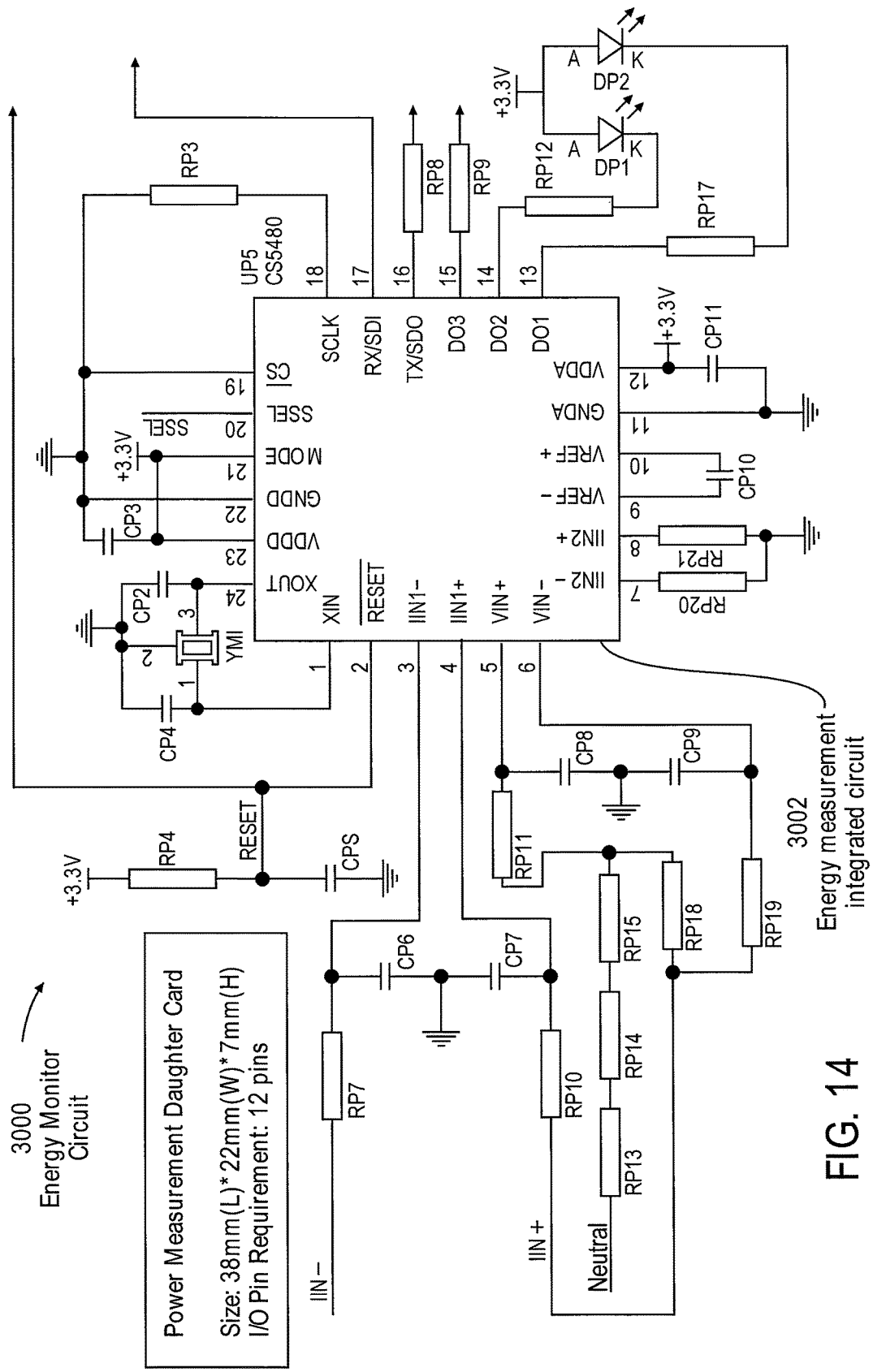
FIG. 14 is a schematic illustration of energy monitor circuit of the present invention.
Figure 14:
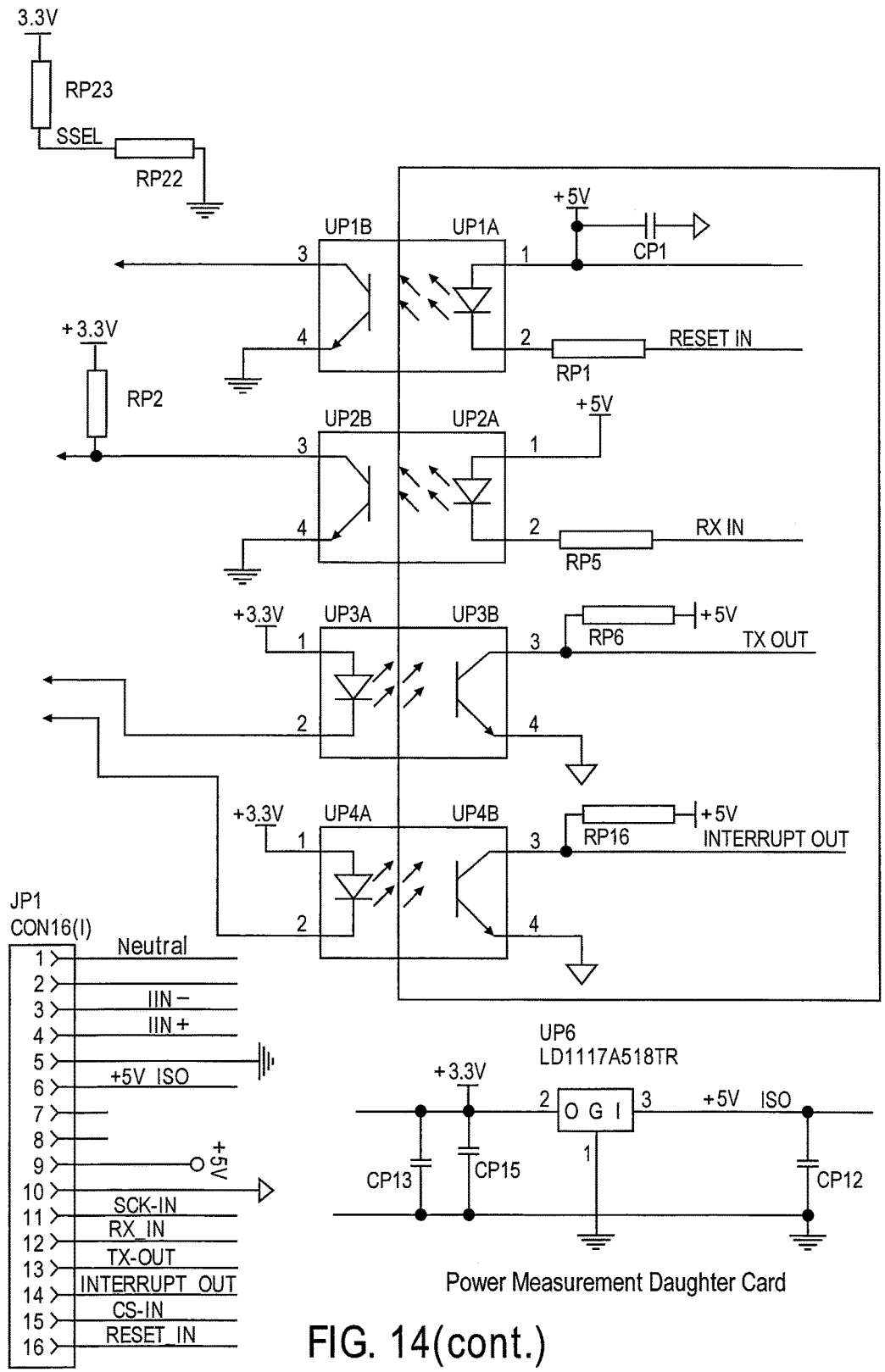

Referring now to FIG. 14, an energy monitor circuit is illustrated, designated generally as 3000. (Also see FIG. 2.) The energy monitor circuit 3000 senses the input current through a sensing resistor and the input voltage through live line and neutral. The energy monitor circuit 3000 then reports the monitored values to upper MCU through the isolated SPI serial communication port.

Figure 15:
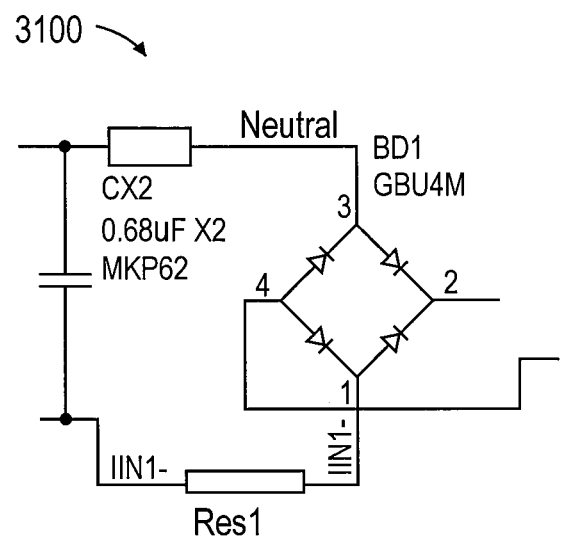
FIG. 15 is a schematic illustration of sensing circuit of the energy monitor circuit.

The energy monitor circuit 3000 includes an energy measurement integrated circuit 3002 (UP5). FIG. 15 illustrates the sensing circuit 3100 of the energy monitor circuit 3000. IIN1− and IIn1+ are the two ends of a sensing resistor Rcs1 which deliver the input current signal to the power monitor dedicate IC (UP5, CS5480) of FIG. 14. And, by the following isolated circuits, the receive line RX_IN and transmit line TX_OUT (see upper right-hand side of 30), it can communicate with the wireless module. There is also interrupt out signal and reset in signal for the processor 202 (or processor 900) to better control the communication function.

Thus, the driver as disclosed in FIG. 2 includes the processor 202, and energy monitor 3000. Collectively, the driver circuit 200 and the energy monitor circuit 3000 define the LED driver with advanced diagnostic and reporting capabilities. The driver circuit 200 further includes LED drive voltage and current monitoring circuits, as discussed above.

Additionally, the driver circuit 200 includes a temperature monitoring circuit which is integral with processor 202. Furthermore, the processor 202 includes means for controlling protocol related statistics and errors. The processor 202 and the energy monitor circuit 3000 cooperate, with other subsystems, to provide power management.

The lighting control and management system 100 of FIG. 1 includes, as an aspect, an LED driver energy management and error reporting system including an LED driver 104 with advanced diagnostic and reporting capabilities; and, a long-term history database 106 operably connected to the LED driver, preferably via a wireless interface. The long-term history database 106 typically includes data from the beginning of service.

The LED driver 104 with advanced diagnostic and reporting capabilities, includes the LED driver circuit 200. The processor 202 of the driver circuit 200 includes a short-term statistical history database (integrated therein) which is typically about 24 hours but may be set for other time periods such as weekly or monthly. Thus, a group of operational characteristics including, for example: energy consumption, voltage and current conditions, drive characteristics, and environmental conditions—are stored in the statistical history database.

Referring again to FIG. 1, the LED driver energy management and error reporting system further includes a remote management entity (i.e. management service) 108 for receiving the resulting data and error conditions.

In one preferred embodiment, operational characteristics are collected and log into 96 15-minute intervals, and reported daily. The most recent (up to the minute) fault and operational statistics are logged into nonvolatile memory to be recovered by the management service. The LED driver energy management and error reporting system compares established operational norms to the prevailing conditions, and notifies the management service so that proactive maintenance may be performed.

A Response and Notification Interface firmware module (not shown) is preferably provided that is responsible for queuing and reporting conditions over the controls network to the remote management entity.

The light emitting diode (LED) driver energy management and error reporting system further may further include external sensors for monitoring environmental conditions such as photometric (source and/or ambient light—see e.g. FIGS. 5A-5D), room occupancy (FIGS. 1 and 2), source and/or ambient temperature.

Figure 16:
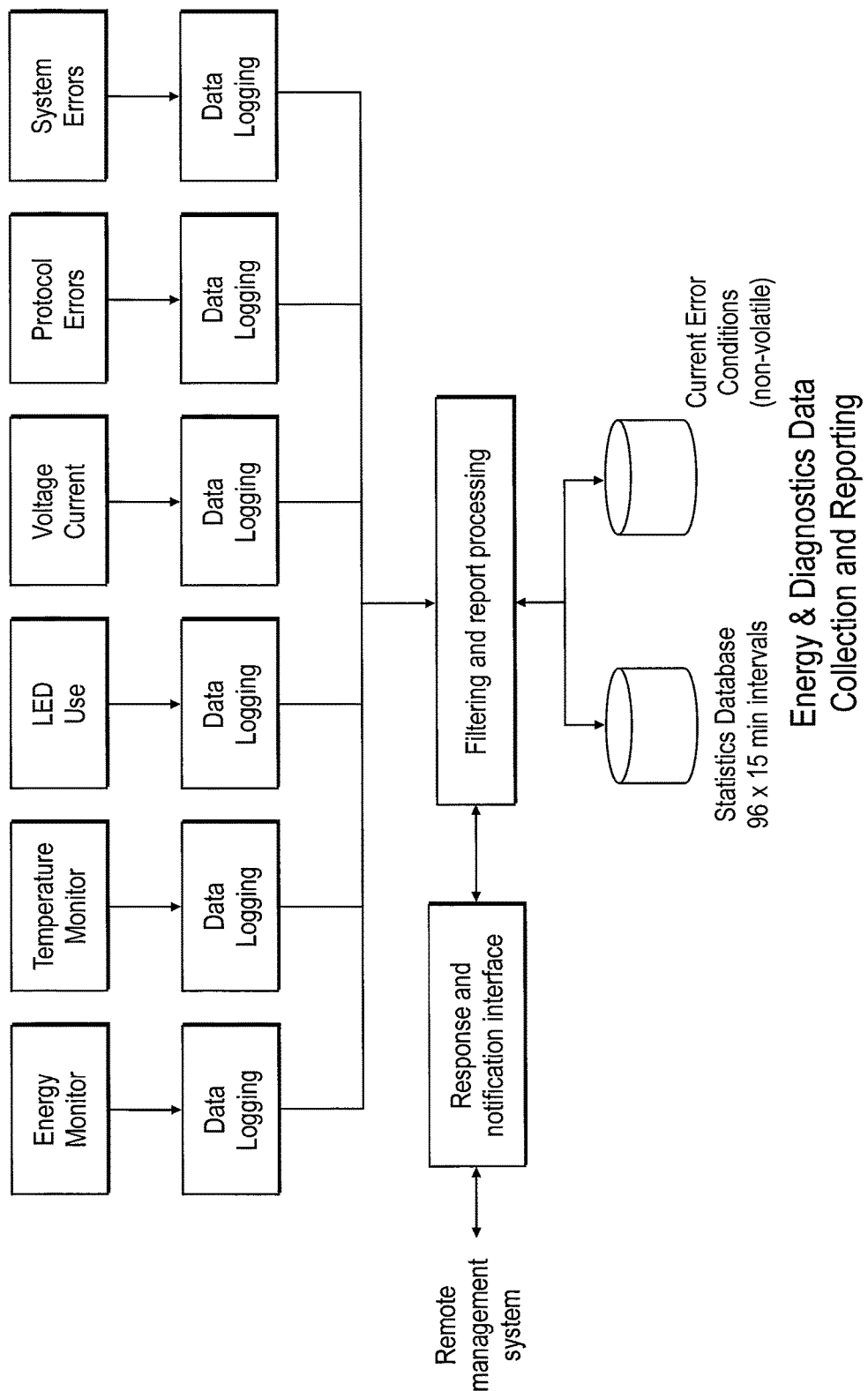
FIG. 16 is a functional block diagram of the LED driver energy management and error reporting system of the present invention.

Referring now to FIG. 16, a functional block diagram of the LED driver energy management and error reporting system is shown including the features discussed above. The functions shown in FIG. 16 are local to the processor 202.

Figure 17:
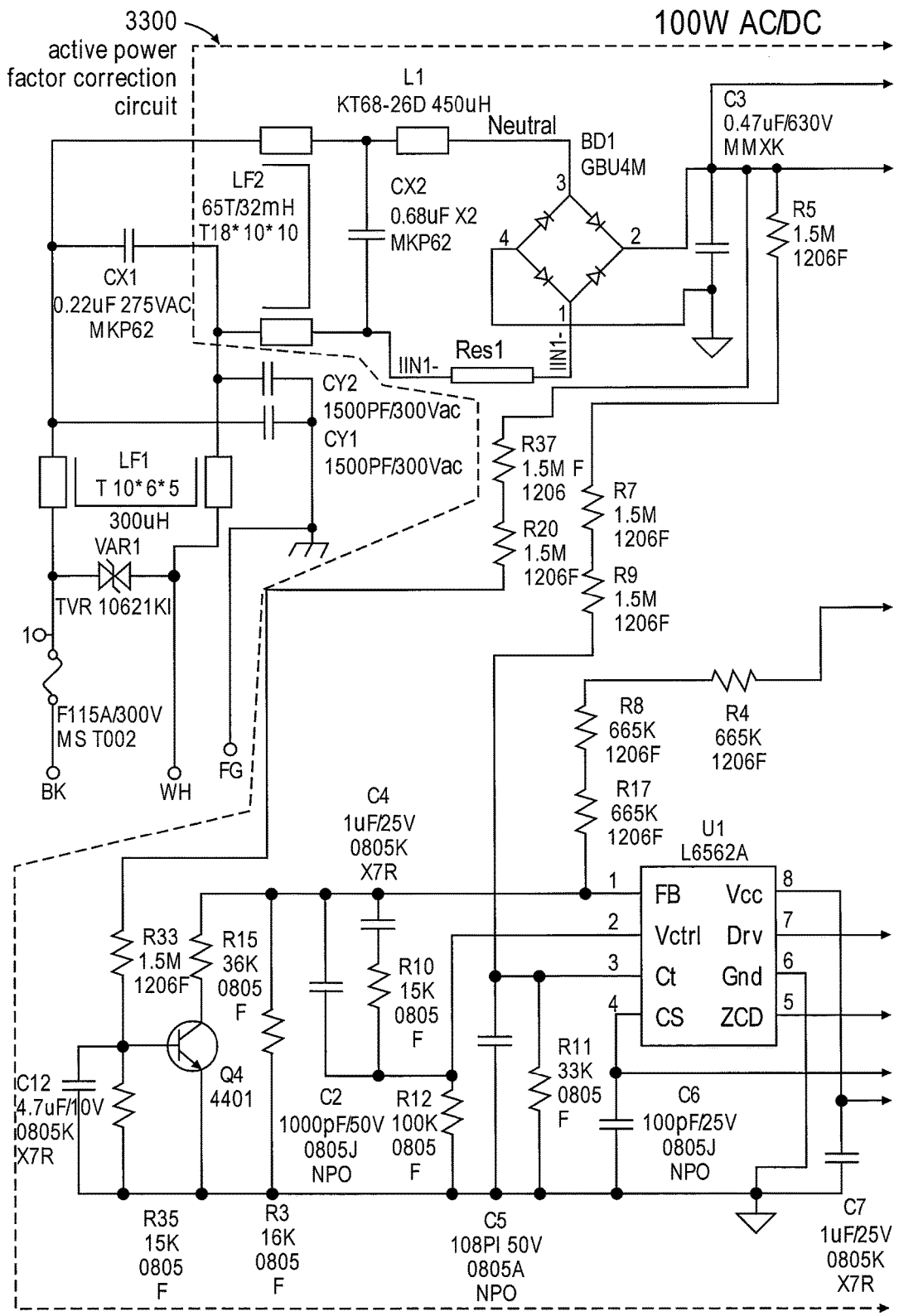
FIG. 17 is an active power factor correction circuit of the 100 W AC/DC circuit of the driver circuit of the present invention.
Figure 17:
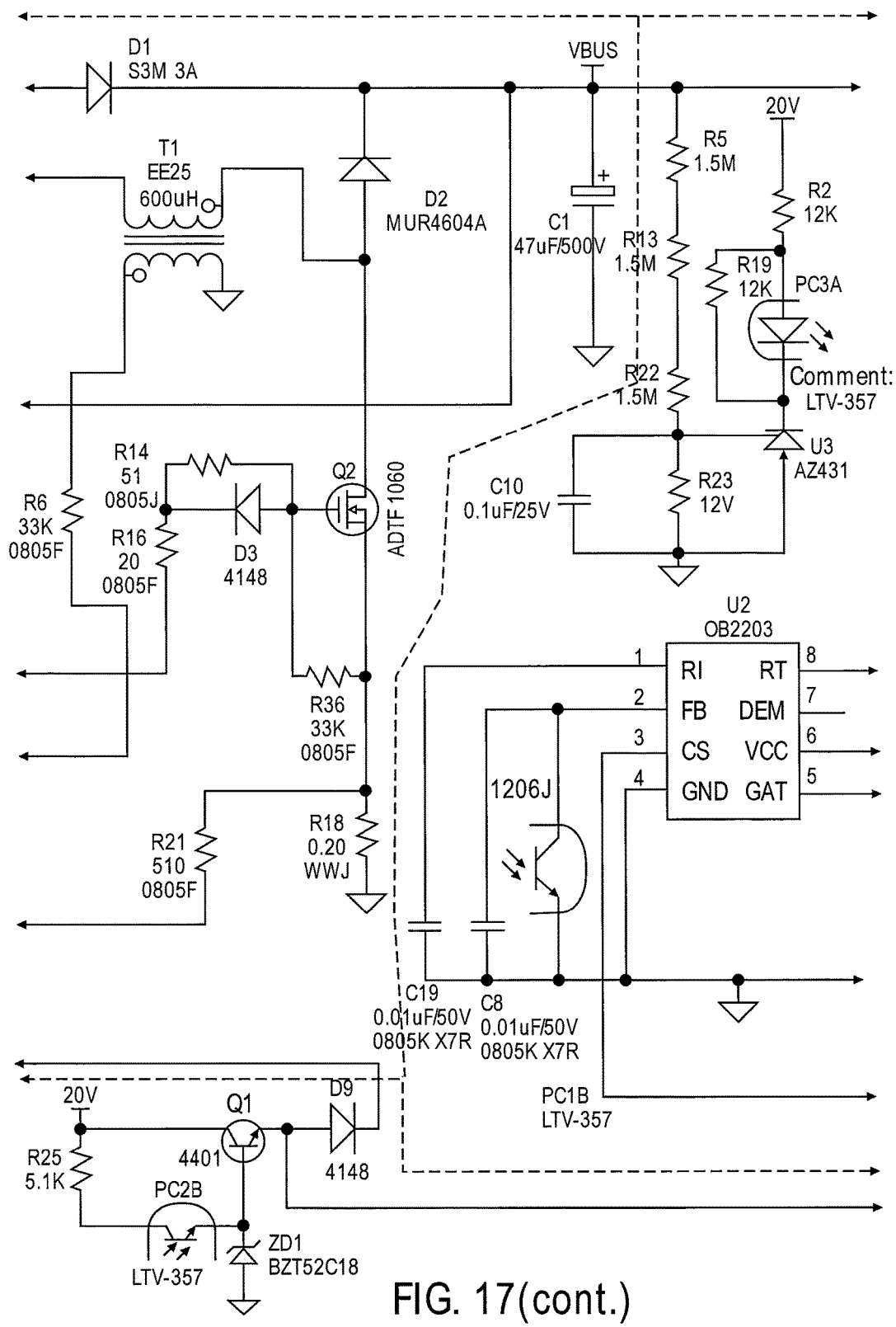
Figure 17:
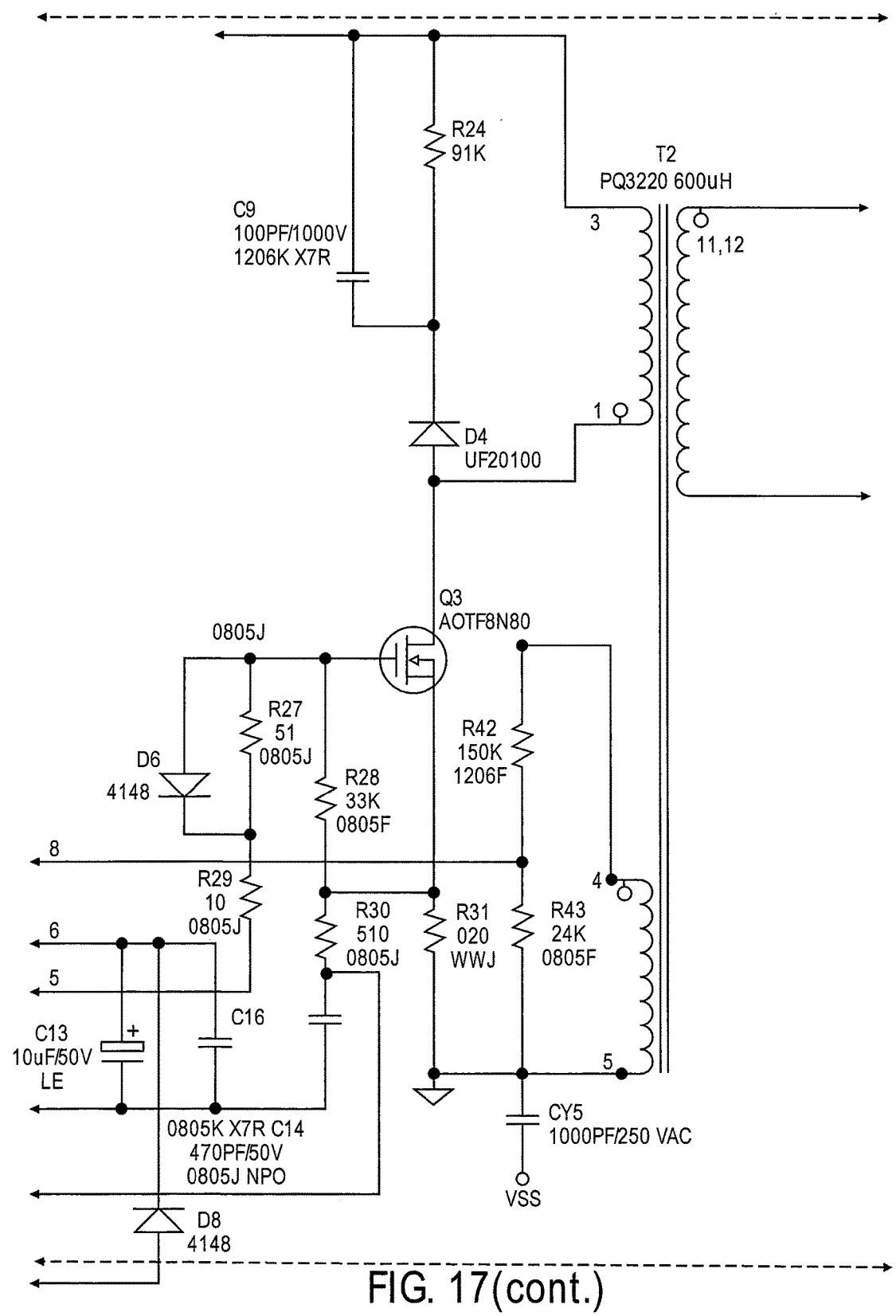
Figure 17:
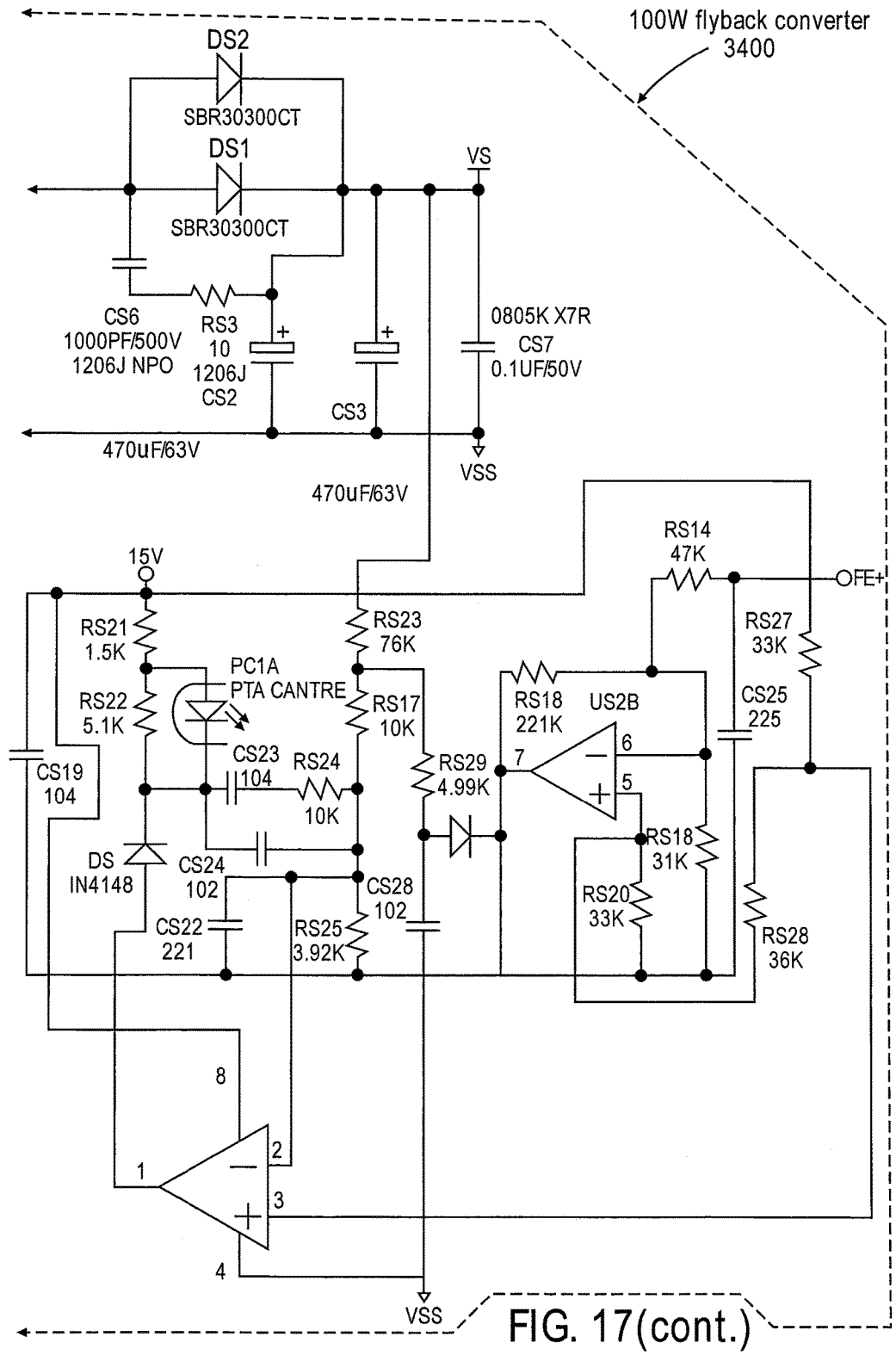
Figure 17:
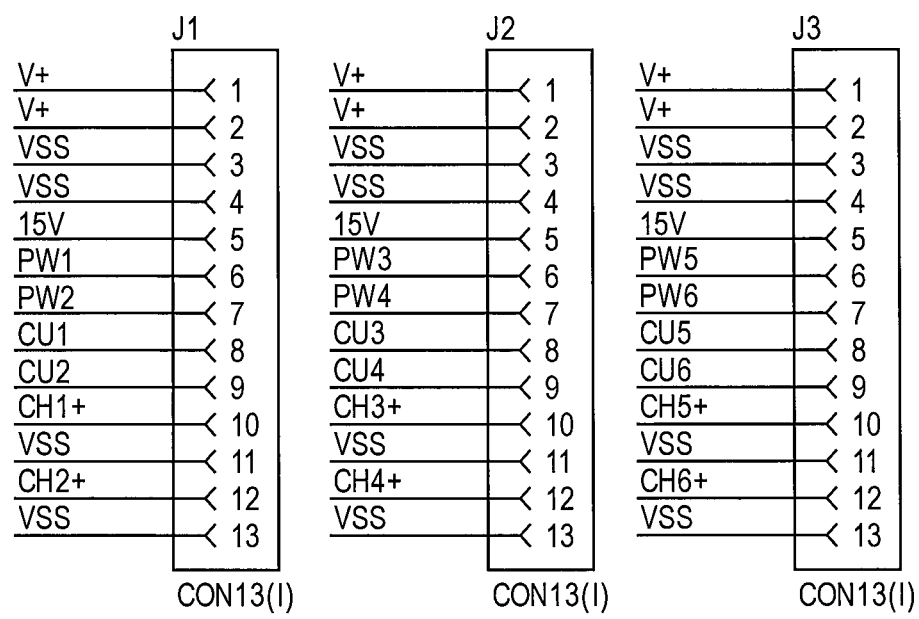

Referring now to FIG. 17, the active power factor correction circuit of the 100 W AC/DC circuit of the driver circuit is illustrated, designated generally as 3300 (on the left side of the figure). The whole circuits of Active Power Factor Correction have two basic functions: 1) force the input current to follow the input voltage change so that the power factor is high; 2) Boost the input to a stable DC voltage which is higher than the peak of the maximum input voltage. BD1 is the rectifier bridge which convert the Sine wave AC input to DC half-sine wave with a doubled line frequency. T1, Q2, D2, C1, U1 are part of boost circuits and has the function of power factor correction. D1 is used for clamping surge voltage. R37, R20, R33, R35 form a voltage divider. If the input voltage is below 210Vac, Q4 will not conduct and the DC bus will be 310Vdc. If the input is greater than 210Vac, Q4 will be conduct and the feedback signal is pull lower than before, which result in higher DC bus voltage—460Vdc. R4, R8, R17, R3 and R15 form a voltage divider to sense the DC bus voltage and then send it into Feedback pin of U1. C2, C4, R10 is the compensation circuits to stabilize the feedback loop. R5, R7, R9, R11, C5 form a divider to provide the sinusoidal signal to U1. The secondary winding of T1 senses the zero crossing point of primary current. When Q2 is conducted this voltage of T1 secondary winding is negative. Once the Q2 is off and the current in T1 primary reduce until zero. Then the voltage of secondary winding of T1 become positive and this signal is provided to U1 to drive the Q2 'on' again. R16, R14, D3, R36 are parts of driving circuits to drive Q2 properly. R18 is the sensing resistor. The voltage drop on this resistor represents the current flowing through Q2. The current sensing signal is provided to U1 through R21 and C6. C7 is used as U1 power supply bypass capacitor.

Still referring to FIG. 17, the 100 W AC/DC circuit of the driver circuit also includes a 100 W flyback converter (on the right side of the figure), designated generally as 3400. This has a secondary feedback voltage loop.

When Q3 is turn on, current flows from C1, through T1 primary winding, Q3, R31 and then return. The energy is storage into the T1 primary winding. R31 is the current sensing resistor. The voltage on R31 is proportional to the primary current. Once this voltage reach to a certain level, Q3 is turn off. T1 secondary winding will release energy to secondary circuits. DS1 and DS2 rectify the output to DC voltage. CS1 and CS2 smooth output to reduce ripple voltage. CS7 filter the noise on the line. D4, C9, R24, R26, R32, R34, R38, R39 form a RCD circuits to clamp the overshot on primary winding when Q3 is turn off.

U2 (OB2203) is a PWM controller which can output a PWM signal to drive Q3 and maintain a constant output voltage on the secondary circuits by voltage close loop control. C19 is a soft-start capacitor connected to Pin 1 (Soft-Start) of U2. When the U2 is powered on and Vcc of U2 reaches the starting threshold, the current source from pin 1 of U2 will charge C19 until 2.2V is reached. Then soft-start process is over. This is to avoid any unstable period during the startup transient. Pin2 (feedback) connected to optical coupler PC1B and the bypass capacitor C8. The optical diode is located in secondary side to sense the output voltage and generate a feedback signal that proportional to output. RS23, RS17 and RS25 form a voltage divider and sense the output voltage. The US2A and DS4 form a open loop amplifier, which sense the flyback output voltage from RS25 to negative input and compare to the reference of positive input. The optical diode PC1A is driven by 15V and then connected to the output of US2A and form a voltage control loop. If the output voltage is high, output of US2A is low and the PC1A is conduct. If the output voltage is low, US2 A output high and block the PC1A to conduct. The current flowing through PC1A will be reflected to its secondary optical transistor PC1B. CS23, CS24, RS24 is the compensation network to US2A. The amplifier US2B and RS14, RS16, RS18, RS20, RS28 process the signal FE+ from DSP. This signal will control the flyback output voltage by sinking current through RS29 and DS3.

Thus, in an example embodiment, a light emitting diode (LED) driver with advanced diagnostic and reporting capabilities includes: a light emitting diode (LED) driver circuit including a processor configured to integrate driver functions and management control functions and monitor a plurality of operational characteristics. Alternatively (or additionally), the LED driver circuit is configured to utilize a processor (or processors) configured as such that is not part of (e.g., separate from or remotely located in relation to) the LED driver circuit. The plurality of operational characteristics can be, for example, a group of operational characteristics including (one or more of): energy consumption, voltage and current conditions, drive characteristics, and environmental conditions.

In example embodiments, the driver circuit further includes an energy monitor circuit (e.g., including an energy measurement integrated circuit). For example, the processor and the energy monitor are configured (e.g., to cooperate, with other subsystems) to cooperatively provide power management. In example embodiments, the driver circuit further includes LED drive voltage and current monitoring circuits. In example embodiments, the processor further includes a temperature monitoring circuit and/or means (e.g., is programmed or otherwise configured) for controlling protocol related statistics and errors.

Thus, in an example embodiment, a light emitting diode (LED) driver energy management and error reporting system includes: a light emitting diode (LED) driver with advanced diagnostic and reporting capabilities, and the LED driver comprises a light emitting diode (LED) driver circuit including (or being configured to utilize) a processor configured to integrate driver functions and management control functions and monitor a plurality of operational characteristics, the LED driver circuit being operatively connected to a short-term statistical history database, and the LED driver being operatively connected to a long-term history database.

In example embodiments and implementations, the light emitting diode (LED) driver energy management and error reporting system further includes a remote management entity configured for receiving data and error conditions from (e.g., determined or obtained by) the LED driver. In systems such as described herein, the processor is configured, for example, to store (e.g., in non-volatile memory of the processor) (the most recent) fault and operational statistics, to be recovered by a remote management entity, compare established operational norms to prevailing conditions, and to provide notifications to the remote management entity regarding proactive maintenance that may (or is recommended/required to) be performed. The system can further include a Response and Notification Interface firmware module (responsible) for queuing and reporting conditions over a controls network to a remote management entity. In example embodiments and implementations, the light emitting diode (LED) driver energy management and error reporting system further includes (external) sensors for monitoring environmental conditions including one or more of photometric, room occupancy, and source and/or ambient temperature.

Cloud-Based Lighting Control and Management System

Referring again to FIG. 1, one or more features or aspects of the technologies/methodologies described herein can be embodied in a cloud-based system, interface or platform, such as for example, a cloud-based lighting control and management system 110 including a plurality of distinct lighting systems 112, wherein each lighting system 112 includes at least one lighting device 102. Each lighting device 102 includes a light emitting diode (LED) driver circuit including interface elements for supporting multiple control connectivity options. The remote management entity 108 receives data from the distinct lighting systems 112. The remote management entity 108 is (or can be) configured to delegate control to one of the distinct lighting systems 112. The remote management entity 108 is (or can be) configured to reclaim control from one of the plurality of distinct lighting systems 112 that currently retains control.

The remote management entity 108 may, for example, be configured to group, control and/or delegate control to the distinct lighting systems as a function of their geographic locations, e.g., daytime versus night. The lighting systems 112 may be grouped in a number of different ways, such as by client, landlord, tenant, user, and geography. Multiple control connectivity options may be applied by control policies based on pre-determined groupings. Maintenance may be dispatched in accordance with pre-selected performance criteria and pre-determined groupings.

In example embodiments and implementations, the signal from Occupancy Sensor, which can be utilized in relation to control and/or management system functionalities herein, is provided by a switch 'high' or 'low' level and is sent to GS2011 module pin 35 'Occupancy_IN' (FIG. 9A).

Thus, in an example embodiment, a cloud-based lighting control and management system includes: a plurality of distinct lighting systems, each of said lighting systems including (or being configured to utilize) a lighting device comprising a light emitting diode (LED) driver circuit including interface elements for supporting multiple control connectivity options (e.g., a plurality of different control connectivity configurations, or controllable modes of connectivity or other operations/functionalities of or involving connectivity or connectivity control); and a remote management entity configured to receive data from said plurality of distinct lighting systems and to delegate (operations/functionalities involving and/or facilitating) control of (one or more of) said lighting systems to one of the lighting systems. The remote management entity is configured to reclaim control from said one of the lighting systems that currently retains control. In example embodiments and implementations, the remote management entity is configured to control lighting systems on a plurality of network protocols including at least protocols selected from the group of: WiFi, Zigbee, DALI, DMX, and 0-10V. The remote management entity can be configured to control said plurality of distinct lighting systems in various ways and/or in consideration of different types, selections or sources of inputs/data/information, for example, as a function of respective geographic locations of said lighting systems.

The lighting control and management system can be configured to control (or facilitate control of) the plurality of distinct lighting systems as a function of one or more groupings of the lighting systems, the grouping(s) of lighting systems including lighting systems of said plurality of distinct lighting systems (selected and) grouped depending on (one or more of) a client, a landlord, a tenant, a user, and a geographic location (respectively/mutually) associated with the lighting systems.

In example embodiments and implementations, the lighting control and management system is configured such that control policies based on pre-determined groupings of (said plurality of distinct) lighting systems are utilized to apply said multiple control connectivity options.

In example embodiments and implementations, the lighting control and management system is configured such that maintenance is dispatched in accordance with pre-selected performance criteria and pre-determined groupings of (said plurality of distinct) lighting systems.

Thus, in an example embodiment, a remote management entity for a cloud-based lighting control and management system including a plurality of distinct lighting systems, each of the lighting systems including (or being configured to utilize) a lighting device comprising a light emitting diode (LED) driver circuit including interface elements for supporting multiple control connectivity options, the remote management entity including: means for receiving data from said plurality of distinct lighting systems, delegating (operations/functionalities involving and/or facilitating) control of (one or more of) said lighting systems to one of the lighting systems, and reclaiming control from said one of the lighting systems that currently retains control.

Figure 18:
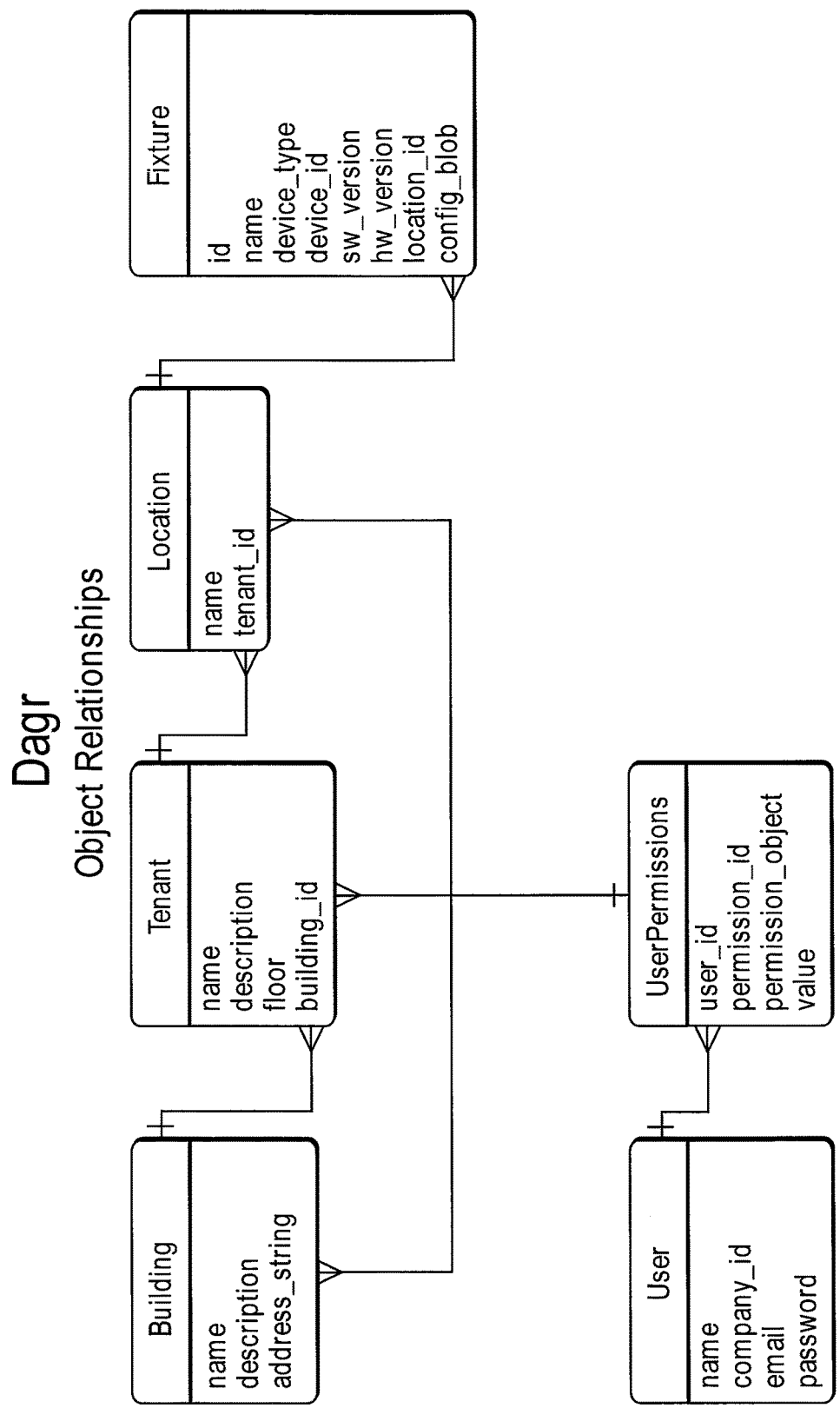
FIG. 18 is a diagram providing an example configuration of object relationships utilized by a lighting control system.

Referring additionally to FIG. 18, examples of User Personas that can be supported include:

| Role | Description |
| --- | --- |
| Company Admin | Company employee or support personnel. Can view multiple buildings, modify records, create other administrators, etc. Can toggle theme/branding for resellers on particular accounts. |
| Installer/Light Engineer | Able to configure lights and join them to customer accounts/buildings. Able to define scenes and receive alarms |
| Maintenance | Able to "replace" a light fixture with a new one (copy provisioning profile). Can receive alarms/status alerts |
| Building Manager | Able to define scenes, view utilization dashboards, and set building-wide limits and standard profiles |
| Office Manager | Able to view status dashboards, override standard lighting profiles, build scenes, implement one-time overrides |
| Employee | Able to control fixtures and set scenes in a single location (such as a private office) |
| Dashboard | Lobby dashboard with automated cycling through building status/reports. No control. |

Examples of specific use cases/scripts that can be supported include:
1. As a building manager, I want to see a dashboard with the status of all the lights in my building, what percentage are on and what percent of total possible power the building is currently using. (Note—must include switches and sensors as well.)
2. As a building manager, I want to see my building's energy usage (by unit) (over time). This has been represented as a bar chart of time (usually 24 hours).

3. As an employee, I want to dim the lights in my office using switch or mobile device.
4. As an employee, I want to set/reset the default 4 dimming settings.
5. As an employee, I want to see what my setting are in "daylight harvesting" mode, and override them if necessary.
6. As an employee, office manager or building manager, I want to know that my building is experiencing an ADR reduction.
7. As an office manager, I want to see my floorplan and my current status—red, green, yellow. (Think a map like Google Maps, then touch an element to go deeper.)
8. As a building manager, I want to be notified of any failures (lamps, fixtures or components (Driver, module or Ballast) via email and/or text message.
9. As a building manager, I want to adjust the 4 scenes (% of light settings) for any room, area, floor, or building.
10. As a building manager, I want to set the specific time of day for lighting operation, as well as set overrides.
11. As an installer, I want to easily know that all components are installed properly.
12. As a building manager, I want to know all components are working properly.
13. As a building manager, I want to add new lighting components and have them automatically configured to operate.
14. As a building manager, I want to be able to look at the detailed status of any component (does Zigbee define what is tracked per component?)
15. As a building manager, I want to know which driver or module has its WiFi functionality turned on, to what gateway it is connected, what security is in place.
16. As Fulham, I want to be able to rebrand all of the screen images with an OEM logo or a service provider logo, as well as change contact numbers.
17. As a lighting engineer, I want to be able to configure the building information—address, passwords and users, forwarding address for outages, etc.
18. As a lighting engineer or building manager, I want to see approved user accounts.
19. As a building manager, I want to see who is currently connected and communicating with the system.
20. As a building manager or light engineer, I'd like to know if a component is responding too slowly to a request. For example, a light is not turning on quickly enough when someone walks in the room.
21. As an installer, I want to not have to know anything about the addressing for the components.
22. As a building manager, I want to be able to see what lights (and where) they were turned on over a 24 hour period for the last 30 days.
23. As a building manager or lighting engineer, I'd like to break one "room" into multiple rooms—reassigning logic for switches, etc.

Thus, in an example embodiment, a (remote) lighting control system includes: one or more of a processor, a controller, a memory and a communications apparatus configured to produce a graphical user interface (GUI) (e.g., a dashboard); wherein the system is configured to facilitate discovery and provisioning of one or more network elements in the system, the network elements including a plurality of distinct (as in multiple different) lighting systems. In example embodiments and implementations, (network) connectivity as to the network elements is facilitated by one or more of IP, Ethernet, WiFi, Zigbee, and DALI.

The lighting control system is configured, for example, to monitor and manage one or more of said network elements through a remotely hosted management entity; and/or implement a device-initiated aboarding and device-initiated status forwarding scheme. In example embodiments and implementations, the lighting control system includes or utilizes a control system server and is configured to implement a distributed control scheme (solution) such that the control system server is responsible only for system configuration and reporting (, making the system responsive and immune to network or server outages).

The lighting control system includes or utilizes a control interface (and/or wireless device) which initially acts as a communications proxy between a control element (e.g., LED Driver) of said network elements and the control system server (e.g., in the cloud). In example embodiments and implementations, the control element (e.g., LED Driver) additionally utilizes the (same) control interface to the server during configuration and/or operation of the control element (, thusly, its complexity is reduced as well). In example embodiments and implementations, the lighting control system includes or utilizes a control system server that provides (all) user configuration and control options to the control interface (and/or wireless device) via a web interface (, enabling the control interface and/or wireless device to operate with minimal configuration or software, reducing complexity).

In example embodiments and implementations, the lighting control system is configured to provide (e.g., via the GUI) visual representation(s) of one or more groupings of said network elements by (or otherwise presented in relation to) client, landlord, tenant, user, and/or geography (e.g., geographic location). The lighting control system is configured such that control policies can (or may) be implemented arbitrarily by (or as to) the above grouping(s). The lighting control system is configured such that maintenance can (or may) be dispatched based upon arbitrary (or other) performance criteria and/or the above grouping(s).

The lighting control system is configured to (for example, to control one or more of the following): enable light fixtures to be remotely controlled via a standard REST API to a known IP endpoint; enable a wide variety of (multiple different) central usecases; generate or provide a list of all connected devices in a building and their status(es); query status of fixtures in a building (brightness, wattage, motion, etc); facilitate or provide a provisioning tool capable of loading scene information into a device for offline execution; support user permissions and roles; collect alarms from devices and surface them via API or email notifications; and/or accommodate multiple different potential user types (e.g., in order of decreasing access).

The device-initiated aboarding refers to when a new device is installed for the first time. The device can communicate with peers and copy the wireless configuration from them, and then use that to get online and communicate with a central server. Once the device is "online" it can receive programming instructions and report status. The purpose of this is to make installation and replacement of fixtures easier on the installers. Device-initiated status forwarding means that the devices can proactively send state-changes (such as when a user manually turns a light on or off, dims, etc, from a local control) as well as periodic usage data up to the server without the server requesting that data. This reduces network traffic and allows for more timely information to be displayed to the central server and web application.

Thus, in an example embodiment, a remote system controller configured to control a plurality of distinct lighting systems, the remote system controller including: a processor, a memory, a communications apparatus and a controller configured to produce a graphical user interface; wherein the system is configured to control a first lighting system, to receive data from the first lighting system, and to control a second lighting system, and wherein the system is configured to assign control of the second lighting system to a second controller in the second lighting system, and to receive data from the second lighting system. The remote system controller is configured to change (/reclaim/reassign) control of the second lighting system from control by the second controller in the second lighting system to control by the remote system controller. In example embodiments and implementations, the remote system controller is configured to control lighting systems on a plurality of network protocols including at least protocols selected from the group of comprising: WiFi, Zigbee, DALI, DMX, and 0-10V. The remote system controller can be configured, for example, to control the first and second lighting systems as a function of their respective geographic locations (daylight vs night).

Thus, in an example embodiment, a cloud-based lighting control and management system includes: a light emitting diode (LED) driver circuit, comprising a processor configured to integrate driver functions and management control functions and monitor a plurality of operational characteristics.

Thus, and by way of concluding remarks and in reference to known lighting systems, the present inventive concepts extend beyond the confines of a single facility and, for example, can be utilized for managing lighting control over multiple campuses or buildings. The control system and logic applies across geographies as they rely on cloud-based management. An example is a property manager with a global footprint of office buildings that can report issues, dispatch maintenance, and apply updated energy management settings across an arbitrary cross-section of properties.

Certain presently known lighting systems use power cycling to override and automated control system. Such methods generally lead to a condition where the automated system can be bypassed indefinitely by an unknown party, resulting in energy management issues with no accountability as to who performed the override. In certain embodiments of the present invention, the web-based interface facilitates automatic and manual controls, allowing for the logging of the individual(s) performing the override function, and a return to automated control based upon conditions such as timeout or the operator logging out of the control system.

Certain presently known lighting systems utilize signal strength schemes to identify control areas. They may rely on a wireless Gateway combined with a control function and are thus limited to management of the group of devices based upon physical topology, such as a home. In large commercial applications, the number of lighting devices and the distances covered are too great to facilitate lighting control. In some embodiments of the present invention, a plurality of wireless gateways are employed that lack any control function. The control function is instead implemented remotely 'in the cloud' allowing for arbitrary physical and wireless topologies. Network registration is handled separately from device registration and subsequent control.

Certain presently known lighting systems utilize wired means of implementing communications in a lighting control system. Aside from the limitations and cost of a wired control infrastructure, the communication methods are limited to specific physical topologies and prevent the management of lighting in multiple buildings across a diverse geography. In some example embodiments of the present invention, a wireless internet control protocol is utilized using IP, WiFi, HTTP, and XML protocol stack. This removes limitations of topology and geography as lighting nodes can be grouped and controlled arbitrarily.

Certain presently known lighting systems utilize a specific system for network or no-network control of a lighting control system (with specific data elements). In some example embodiments of the present invention, there is always a control network. That network may be locally isolated (an island) or it may be connected to a remote wide area network to a configuration server. The configuration server may affect control, but the server is not a deterministic element in the local operation of the control system so there is no need to have 'local' or 'remote' modes of system operation. The response time and automation do not rely on the control system.

Certain presently known lighting systems utilize a Powerline Carrier method of communication for the lighting control system that is specific to certain types of lamps (non-LED). In some example embodiments of the present invention, there is a sole use of IP-based wireless network control communications method for LED (or potentially HID) light sources. The Powerline carrier is ill-suited for deployment across large office and warehouse topologies and does not facilitate grouping devices into arbitrary logical topologies. The present invention enables management across geographically diverse topologies.

With the present invention, lights and controls may be grouped according to function across disparate geographical areas, for example, a campus with multiple buildings may have their respective lobby lights grouped together and create a 'scene' where task and decorative lighting are synchronized to create a specific 'look' when a visitor enters any of the buildings at a certain time. Such functionalities and features may be extended to include offices or buildings in different locations across the globe. For example, retail outlets might want to synchronize the color and intensity of their display cases as part of their corporate identity.

In some embodiments of the present invention, the system may be made secure from hacking and intrusion through the use of encryption.

Certain presently known lighting systems utilize a ballast-specific wireless lighting control system. This results in numerous dependencies specific to the implementation. The dependencies such as reliance on wireless repeaters, the ballast control module, and data processing module add complexity. However, with the approach described herein in relation to the present invention, the repeater, data processing and LED drive may be integrated into a single package, reducing complexity and simplifying configuration. Unlike other presently known lighting systems, in some embodiments of the present invention the driver and management control unit functions are integrated, saving installation complexity. Furthermore, the router in the present invention is generally used solely for machine to machine communications, and the user-interface is provided remotely by a centralized server 'in the cloud'. Since the control is integral to the drive, the complexities of additional relays (or drivers) are unnecessary.

Although the present invention(s) has(have) been described in terms of the example embodiments above, numerous modifications and/or additions to the above-described embodiments would be readily apparent to one skilled in the art. It is intended that the scope of the present invention(s) extend to all such modifications and/or additions.

What is claimed is:

1. A driver for a lighting device including one or more light emitting diodes (LEDs), the driver comprising:
   a lighting driver configured to drive the one or more LED of the lighting device, the lighting driver configured to independently control one or more drive channels;
   wherein a drive channel of the one or more drive channels includes a processor and a switch-mode type power supply, wherein the drive channel outputs a lighting command to a LED light source based on a plurality of driver functions, wherein the driver functions include at least one of a voltage regulation, a current regulation, and an LED source dimming, wherein the processor is configured to control a drive voltage of the LED light source and a drive current of the LED light source;
   a high speed power switch coupled to the processor;
   a LC low pass filter coupled to the processor; and
   a current transducer coupled to the processor.

2. The driver of claim 1, wherein the one or more of the drive channels is configured to implement a plurality of LED light source characteristics, the plurality of LED light source characteristics including at least one of a voltage parameter, a current parameter, a gamma parameter, and an aging parameter.

3. The driver of claim 1, wherein the drive channels further include at least one of a light source parameter management component, a high-speed power switch, a low pass filter, and a current transducer.

4. The driver of claim 1, wherein the lighting driver is configured to:
   combine the functions of the voltage regulation, the current regulation, and the LED source dimming through an adaptive combination of pulse-width modulation and modifying drive current of the lighting driver;
   reconfigure channel drive characteristics via the processor;
   control and adapt LED sources on a device by device basis;
   perform the functions of voltage regulation, current regulation, and translating dimming control into a modulation combination of voltage and current to the LED source or the LED sources to effect the change in lighting intensity;
   electronically change the LED light source based on the plurality of driver functions;
   adapt to changing light source characteristics;
   implement hybrid methods of dimming in relation to multiple independent drive channels, wherein the hybrid methods of diming are based on at least one of a voltage, a current, and a pulse-width modulation; and/or
   implement switch mode power supply control and light source pulse-width modulation diming.

5. The driver of claim 1, the lighting driver is configured to control a six (6) channel DC/DC output to a pre-determined voltage level.

6. The driver of claim 1, wherein the processor is configured to provide programmable characteristics of the LED light source including a drive voltage, a drive current, and a dimming parameter and an aging parameter.

7. The driver of claim 1, wherein the processor is configured to provide the voltage regulation, the current regulation, and the LED source dimming through a pulse-width modulation and modifying the drive current of the lighting driver.

8. The driver of claim 1, wherein the processor is configured to
   (a) compare the drive current to a predetermined drive current;
   (b) to compare the drive voltage to a predetermined drive voltage; and
   to adjust the channel's PWM drive percentage based on operations (a) and (b).

* * * * *